United States Patent
Larson

(10) Patent No.: US 8,407,528 B2
(45) Date of Patent: Mar. 26, 2013

(54) CIRCUITS, SYSTEMS, APPARATUS AND PROCESSES FOR MONITORING ACTIVITY IN MULTI-PROCESSING SYSTEMS

(75) Inventor: Lee Alan Larson, Katy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/549,941

(22) Filed: Aug. 28, 2009

(65) Prior Publication Data

US 2010/0332909 A1 Dec. 30, 2010

Related U.S. Application Data

(60) Provisional application No. 61/221,760, filed on Jun. 30, 2009.

(51) Int. Cl.
*G06F 11/00* (2006.01)
(52) U.S. Cl. .......................................................... 714/45
(58) Field of Classification Search .................. None
See application file for complete search history.

(56) References Cited

U.S. PATENT DOCUMENTS

| | | | |
|---|---|---|---|
| 6,009,539 A | 12/1999 | Ranson | |
| 6,732,307 B1 * | 5/2004 | Edwards | 714/724 |
| 6,775,826 B1 * | 8/2004 | Zahavi et al. | 717/128 |
| 6,778,454 B2 * | 8/2004 | Duh et al. | 365/221 |
| 6,978,408 B1 * | 12/2005 | Huott et al. | 714/723 |
| 7,043,418 B2 | 5/2006 | Swoboda et al. | |
| 7,069,176 B2 * | 6/2006 | Swaine et al. | 702/176 |
| 7,099,817 B2 | 8/2006 | Agarwala et al. | |
| 7,159,083 B2 | 1/2007 | Samuel et al. | |
| 7,162,411 B2 | 1/2007 | Agarwala et al. | |
| 7,171,497 B2 | 1/2007 | Nardini et al. | |
| 7,185,234 B1 * | 2/2007 | Thekkath | 714/45 |
| 7,228,472 B2 | 6/2007 | Johnson et al. | |
| 7,299,386 B2 | 11/2007 | Swoboda et al. | |
| 7,315,808 B2 | 1/2008 | Swoboda et al. | |
| 7,325,169 B2 | 1/2008 | Swoboda et al. | |
| 7,332,929 B1 | 2/2008 | Normoyle et al. | |
| 7,348,799 B2 | 3/2008 | Benavides et al. | |
| 7,418,629 B2 | 8/2008 | Al-Omari et al. | |
| 7,463,653 B2 | 12/2008 | Swoboda et al. | |
| 7,464,301 B1 * | 12/2008 | Entezari et al. | 714/45 |
| 7,496,818 B1 * | 2/2009 | Azimi et al. | 714/733 |
| 7,548,842 B2 * | 6/2009 | Ganesan et al. | 703/14 |
| 7,752,608 B1 * | 7/2010 | Hinchey et al. | 717/136 |
| 7,886,195 B2 * | 2/2011 | Mayer | 714/38.1 |
| 7,904,888 B2 * | 3/2011 | Berry et al. | 717/128 |

(Continued)

*Primary Examiner* — Christopher McCarthy
(74) *Attorney, Agent, or Firm* — Wade J. Brady, III; Frederick J. Telecky, Jr.

(57) ABSTRACT

An electronic circuit includes a first processor (100) operable to perform processing operations, a first trace buffer (230) coupled to the first processor (100), a first triggering circuit (210) coupled to the first processor (100), the first triggering circuit (210) operable to detect a specified sequence of particular processing operations in the first processor (100); a second processor (101), a second trace buffer (231) coupled to the second processor (101), a second triggering circuit (211) coupled to the second processor (101), the second triggering circuit (211) operable to detect at least one other processing operation in the second processor (101); and a cross trace circuit (330) having a trace output and having inputs coupled to the first triggering circuit (210) and to the second triggering circuit (211), the cross trace circuit (330) configurably operable to respond to a sequence including both a detection of the sequence of particular processing operations of the first processor (100) by the first triggering circuit (210) and a detection of the at least one other processing operation of the second processor (101) by the second triggering circuit (211), to couple at least one of the first trace buffer (230) and the second trace buffer (231) to the trace output. Various circuits, devices, telecommunications products, wireless handsets, systems and processes of operation and manufacture are disclosed.

53 Claims, 29 Drawing Sheets

U.S. PATENT DOCUMENTS

| | | | |
|---|---|---|---|
| 7,913,123 B2 * | 3/2011 | Al-Omari et al. ............... | 714/45 |
| 7,984,336 B2 * | 7/2011 | Deleris ........................... | 714/45 |
| 2004/0064763 A1 * | 4/2004 | Swoboda ......................... | 714/45 |
| 2004/0117487 A1 | 6/2004 | Swoboda | |
| 2004/0133388 A1 | 7/2004 | Swoboda | |
| 2004/0133389 A1 | 7/2004 | Swoboda | |
| 2004/0153813 A1 * | 8/2004 | Swoboda ......................... | 714/36 |
| 2004/0177288 A1 * | 9/2004 | Swoboda ......................... | 714/39 |
| 2004/0199902 A1 | 10/2004 | Dodson et al. | |
| 2005/0034017 A1 * | 2/2005 | Airaud et al. ................... | 714/25 |
| 2005/0041450 A1 * | 2/2005 | Duh et al. ........................ | 365/1 |
| 2006/0010264 A1 | 1/2006 | Rader et al. | |
| 2006/0059286 A1 | 3/2006 | Bertone et al. | |
| 2006/0117229 A1 * | 6/2006 | Swaine et al. ................... | 714/45 |
| 2006/0155516 A1 | 7/2006 | Johnson et al. | |
| 2006/0156290 A1 * | 7/2006 | Johnson et al. ............... | 717/127 |
| 2006/0248395 A1 | 11/2006 | McGowan | |
| 2006/0255981 A1 | 11/2006 | Swoboda | |
| 2006/0259831 A1 * | 11/2006 | Sohm et al. ..................... | 714/45 |
| 2006/0288254 A1 | 12/2006 | Agarwala et al. | |
| 2007/0006174 A1 | 1/2007 | Sohm et al. | |
| 2007/0094645 A1 | 4/2007 | Nardini et al. | |
| 2007/0226795 A1 | 9/2007 | Conti et al. | |
| 2007/0300115 A1 | 12/2007 | Datta et al. | |
| 2008/0052561 A1 * | 2/2008 | Hopkins et al. ................. | 714/39 |
| 2008/0155356 A1 * | 6/2008 | Boskovic et al. ............... | 714/45 |
| 2008/0183931 A1 | 7/2008 | Verm et al. | |
| 2008/0216098 A1 | 9/2008 | Agarwal et al. | |
| 2008/0228974 A1 | 9/2008 | Johns et al. | |
| 2008/0229166 A1 * | 9/2008 | Datta et al. ..................... | 714/735 |
| 2009/0119548 A1 * | 5/2009 | Kollmann et al. ............... | 714/45 |
| 2009/0125756 A1 * | 5/2009 | Swaine et al. ................... | 714/45 |
| 2009/0164682 A1 | 6/2009 | Johns et al. | |
| 2009/0183034 A1 * | 7/2009 | Houlihane et al. .............. | 714/45 |
| 2010/0077259 A1 * | 3/2010 | Inoue et al. ..................... | 714/45 |
| 2010/0218051 A1 * | 8/2010 | Walker et al. ................... | 714/45 |
| 2010/0275067 A1 * | 10/2010 | Boskovic et al. ............... | 714/45 |
| 2011/0029823 A1 * | 2/2011 | Horley et al. ................... | 714/45 |

* cited by examiner

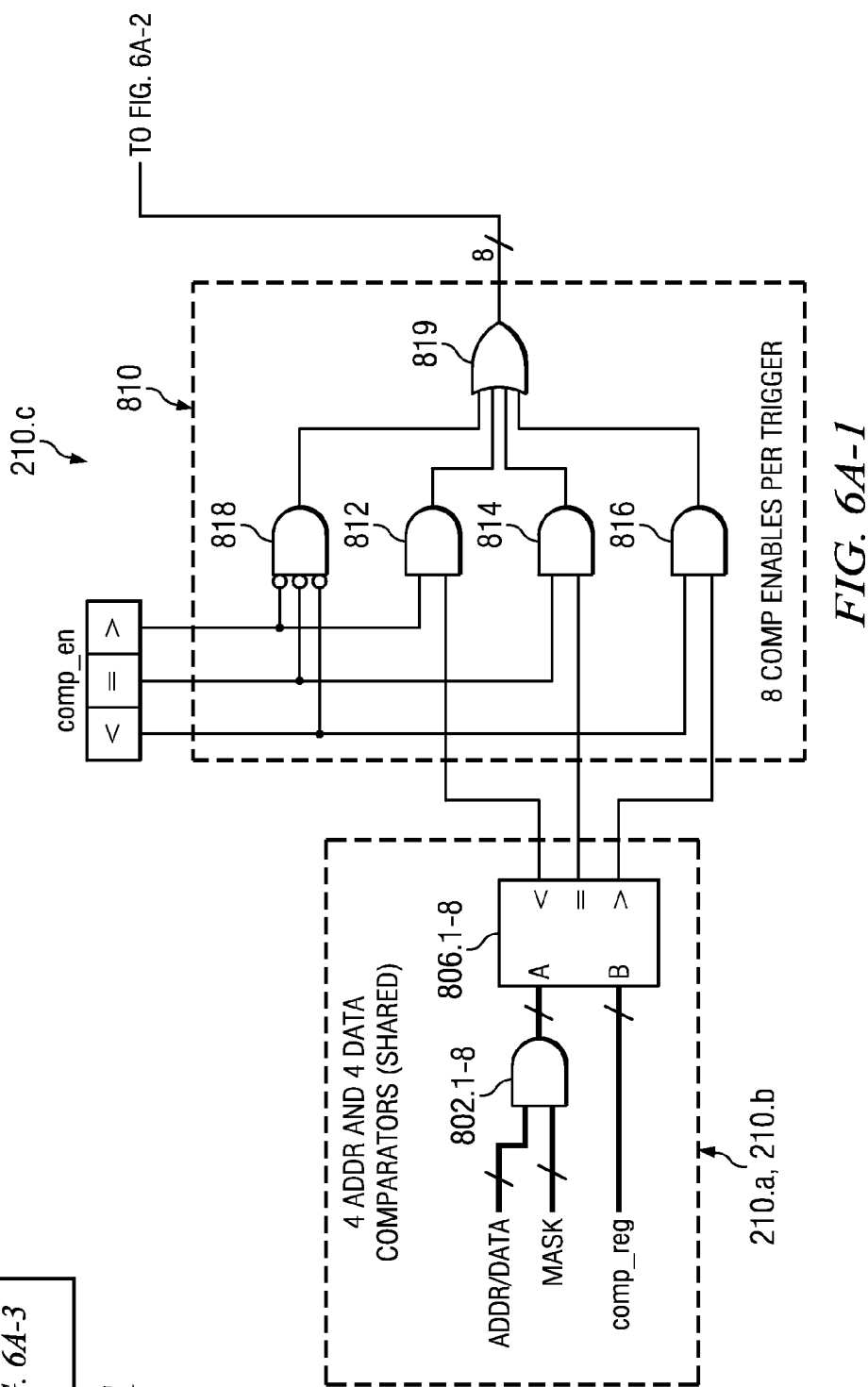

FIG. 7

| | addr0 | | | addr1 | | | addr2 | | | addr3 | | | data0 | | | data1 | | | data2 | | | data3 | | |
|---|---|---|---|---|---|---|---|---|---|---|---|---|---|---|---|---|---|---|---|---|---|---|---|---|---|
Trig0_cfg0 | < | = | > | < | = | > | < | = | > | < | = | > | < | = | > | < | = | > | < | = | > | < | = | > |
Trig0_cfg1 | AND enables | | | | | | | | | | | | OR enables | | | | | | ctl sel | | | event sel | | |

| | addr0 | | | addr1 | | | addr2 | | | addr3 | | | data0 | | | data1 | | | data2 | | | data3 | | |
|---|---|---|---|---|---|---|---|---|---|---|---|---|---|---|---|---|---|---|---|---|---|---|---|---|---|
Trig1_cfg0 | < | = | > | < | = | > | < | = | > | < | = | > | < | = | > | < | = | > | < | = | > | < | = | > |
Trig1_cfg1 | AND enables | | | | | | | | | | | | OR enables | | | | | | ctl sel | | | event sel | | |

| | addr0 | | | addr1 | | | addr2 | | | addr3 | | | data0 | | | data1 | | | data2 | | | data3 | | |
|---|---|---|---|---|---|---|---|---|---|---|---|---|---|---|---|---|---|---|---|---|---|---|---|---|---|
Trig2_cfg0 | < | = | > | < | = | > | < | = | > | < | = | > | < | = | > | < | = | > | < | = | > | < | = | > |
Trig2_cfg1 | AND enables | | | | | | | | | | | | OR enables | | | | | | ctl sel | | | event sel | | |

| | addr0 | | | addr1 | | | addr2 | | | addr3 | | | data0 | | | data1 | | | data2 | | | data3 | | |
|---|---|---|---|---|---|---|---|---|---|---|---|---|---|---|---|---|---|---|---|---|---|---|---|---|---|
Trig3_cfg0 | < | = | > | < | = | > | < | = | > | < | = | > | < | = | > | < | = | > | < | = | > | < | = | > |
Trig3_cfg1 | AND enables | | | | | | | | | | | | OR enables | | | | | | ctl sel | | | event sel | | |

CIRCUITS, SYSTEMS, APPARATUS AND PROCESSES FOR MONITORING ACTIVITY IN MULTI-PROCESSING SYSTEMS

CROSS-REFERENCE TO RELATED APPLICATIONS

This application claims the benefit under 35 U.S.C. 119(e) of U.S. Provisional Application No. 61/221,760 (TI-64749PS) entitled "Circuits, Systems, Apparatus and Processes for Coordinating Trace Activity in Multi-Processing Systems" filed on Jun. 30, 2009, and which is incorporated herein by reference in its entirety.

U.S. non-provisional published patent application 20070226795 (published Sep. 27, 2007, TI-61985) "Virtual Cores and Hardware-Supported Hypervisor Integrated Circuits, Systems, Methods and Processes of Manufacture" U.S. Ser. No. 11/671,752, is hereby incorporated herein by reference.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

FIELD OF TECHNOLOGY

The technology relates to circuits, systems, apparatus and processes with multiple processing units generally, and to system on a chip (SoC) integrated circuits, and with trace circuits for debug of multi-processor systems. Hardware and processes initiate and coordinate trace activity for multiple processors, and can record or export the resulting data.

BACKGROUND OF THE INVENTION

In the past, most processing systems had only a single processor. Recent processors have added trace capability where Program Counter (PC) activity can be traced. Some systems also provide Data Trace and timing information. The trace output stream can impose very high bandwidth requirements, and such streams of trace data can overwhelm an attempt to capture them. A VLIW DSP (very long instruction word digital signal processor), such as a TMS64xx™ processor from Texas Instruments Incorporated with eight data paths running at 600 MHz, can execute 4.8 BOPS (billion operations per second), i.e. the product of 8 instructions/clock-cycle×600 MHz. Capturing four-byte or 32-bit PC (program counter) values from even a single processor CPU running at 600 MHz would generate 2.4 GByte/sec of PC data (4 bytes/cycle×600 MHz). Serial output of the data would involve a clock rate of 19.2 GHz (8 bits/byte×2.4 GByte/sec), which would be impractical or at least uneconomical for most current systems. Even if on-chip compression were used to reduce this enormous bandwidth requirement by, e.g. a factor of 10 depending upon the program activity, the resulting average trace bandwidth would be 240 MB/sec.

Moreover, combining trace streams for multiple processors would effectively multiply the clock rate specification imposed on a serial port for them. Conversely, given an available serial clock, combining trace streams for multiple processors effectively reduces the bandwidth available for each of the processors being traced by the number of trace data streams. Exporting larger and larger amounts of data at higher and higher data rates becomes very expensive and indeed impractical, especially when the recent devices now have four (4), eight (8), and more processors.

Merely acquiring and combining independent free-running trace streams from multiple processors is likely to be wasteful of the trace bandwidth. Even if the trace streams for an individual processor were somehow qualified to try to only capture data of interest, it would fail to address the needs of multi-processing systems. In a multi-processing system, the interaction between the processors is important as well, or even more important. Some architectures have been proposed in the past, see for instance:

U.S. Pat. No. 6,009,539 "Cross-Triggering CPUS for Enhanced Test Operations in a Multi-CPU Computer System,"

U.S. Pat. No. 7,332,929 "Wide-Scan On-Chip Logic Analyzer with Global Trigger and Interleaved SRAM Capture Buffers,"

U.S. Pat. No. 7,348,799 "System and Method for Generating a Trigger Signal."

However, trace and debug circuits, methods and systems that can more effectively address the needs of multi-processing systems would be very desirable in the art.

SUMMARY OF THE INVENTION

Generally and in one form of the invention, an electronic circuit includes a first processor operable to perform processing operations, a first trace buffer coupled to the first processor, a first triggering circuit coupled to the first processor, the first triggering circuit operable to detect a specified sequence of particular processing operations in the first processor; a second processor, a second trace buffer coupled to the second processor, a second triggering circuit coupled to the second processor, the second triggering circuit operable to detect at least one other processing operation in the second processor; and a cross trace circuit having a trace output and having inputs coupled to the first triggering circuit and to the second triggering circuit, the cross trace circuit configurably operable to respond to a sequence including both a detection of the sequence of particular processing operations of the first processor by the first triggering circuit and a detection of the at least one other processing operation of the second processor by the second triggering circuit, to couple at least one of the first trace buffer and the second trace buffer to the trace output.

Generally and in another form of the invention, an electronic circuit includes a processing circuit including a plurality of processor cores and operable to perform processing operations and generate addresses and data, a first storing circuit having a first configuration field for holding a reference value, a comparing circuit responsive to the first storing circuit and to the processing circuit to generate a trigger signal depending on a comparison of an address from the processing circuit with the reference value, a first state machine circuit operable in a given state among a plurality of possible states, and operable to transition from the given state to a new state among the plurality of possible states in response to the trigger signal, a second storing circuit having a second configuration field corresponding to the given state and the trigger signal, the second configuration field for holding a representation of the new state to which the first state machine circuit can transition from the given state in response to the trigger signal, and the first and second storing circuits, the comparing circuit, and the first state machine circuit each have circuit portions corresponding to the processor cores respectively, and a trace circuit that includes mask logic circuits respectively coupled to the first state machine circuit portions and further includes a second state machine circuit coupled to the mask logic circuits and operable to generate a trace capture signal upon an occurrence of a configurably-specified sequence of operations by at least two of the processor cores.

Generally and in a further form of the invention, a trace circuit includes a plurality of trace buffers, a plurality of trace trigger circuits, a merge circuit that includes a sum-threshold circuit having a configurable threshold, and the merge circuit having inputs coupled to the plurality of trace trigger circuits and operable to form event signals in response to any subset of the plurality of the trigger circuits wherein the subset includes a number of the trigger circuits specified by the configurable threshold, and a sequencer circuit operable to deliver a trace output from a selected one or more of the trace buffers in response to a configurable sequence of the event signals from the merge circuit.

Generally and in an additional form of the invention, a buffer circuit includes a dual port memory having a write clock input and a read clock input, a read circuit including a counter circuit coupled to read selected information from the dual port memory, the read circuit having an input and responsive to a signal at the input for actuating a read, an offset register field coupled to the read circuit to configure a read of information from the dual port memory written over an interval prior to the signal actuating the read, and a post count register field coupled to the read circuit to configure a read of information from the dual port memory over an interval subsequent to the signal actuating the read.

Generally and in still another form of the invention, a trace combiner circuit is provided for handling a cross trace event of multiple processors that produce signals, The trace combiner circuit includes plural buffers to hold at least some of the signals, a capture state machine coupled to sequentially drain the buffers when actuated, a cross trace circuit that includes a cross trace sequencer state machine operable to actuate the capture state machine in case of a cross trace event, and a multiplexing circuit having a trace output and responsive to the capture state machine to sequentially couple the buffers to the trace output in coordination with the sequential draining of the buffers.

Generally and in another further form of the invention, a processor debug circuit includes plural electronic processors for performing operations, and an electronic circuit operable to monitor the operations of the plural electronic processors, the electronic circuit configurable for multiple modes including at least one mode to detect a configurably-specified sequence pertaining to operations across at least two of the plural electronic processors and initiate a debug-related response wherein the electronic circuit in that at least one mode is operable on such detection to output information from any selected subset of one or more of the plural processors.

Generally and in a further additional form of the invention, a processor debug circuit includes plural electronic processors for performing operations, and an electronic circuit operable to detect an instance when any processor in a configurably-specified subset of processors among the plurality is executing configurably-specified operations in excess of a configurably-specified amount of time, and further operable to initiate a debug-related response.

Generally and in a yet further form of the invention, a processor debug circuit includes plural electronic processors for performing operations, and an electronic circuit operable to monitor the operations of the plural electronic processors, the electronic circuit operable to detect an occurrence including a configurably-specified sequence of operations by one of the processors and then to capture information from at least one of only the other processors among the plural electronic processors.

Generally and in an another additional form of the invention, a telecommunications apparatus includes a printed wiring board, a modem, an applications integrated circuit including plural electronic processors coupled to the modem, and the applications integrated circuit attached to the printed wiring board for performing operations, and the applications integrated circuit including an electronic circuit operable to monitor the operations of at least the plural electronic processors, the electronic circuit configurable for multiple modes including at least one mode to detect a configurably-specified sequence pertaining to operations across at least two of the plural electronic processors and initiate a debug-related response.

Generally and in a method form of the invention, a processor debug method is for use with plural electronic processors for performing operations. The method includes monitoring the operations of the plural electronic processors, detecting a specified sequence pertaining to operations across at least two of the plural electronic processors, and initiating a debug-related response including outputting information from any selected subset of one or more of the plural processors, upon such detection.

Generally and in a still further form of the invention, an electronic circuit is for use with three or more processors having busses and operations. The circuit includes a first circuit coupled to take and derive triggers and state information from processor busses and operations and discrete events, a second circuit operable to combine the triggers and having logic to detect an interprocessor sequence of the triggers that indicates a debug condition, and a third circuit operable to cause capture of trace data based on the interprocessor sequence of the triggers that indicates the debug condition, wherein the captured trace data includes data from only those processors involved in the interprocessor sequence causing the capture of the trace data.

Various forms of the invention involving processes of manufacture, processes of operation, circuits, devices, telecommunications products, wireless handsets and systems are disclosed and claimed.

BRIEF DESCRIPTION OF THE DRAWINGS

FIG. 6A is composed of FIGS. 6A-1, 6A-2, and 6A-3.

FIG. 7 is a block diagram of trigger configuration registers for the trigger unit of FIG. 5.

Figure 1:
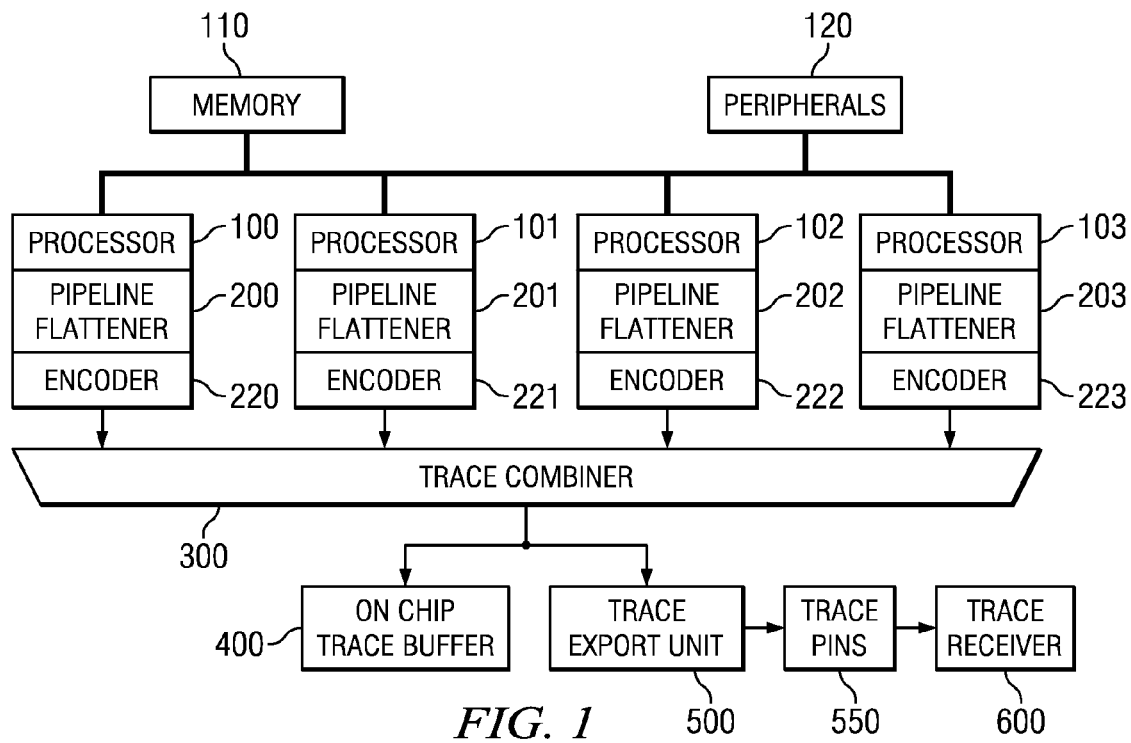
FIG. 1 is a block diagram of a multi-processor system with trace.

Corresponding numerals indicate corresponding parts throughout the Figures of drawing, except where the context indicates otherwise. If a signal name or register field designation is expressed in all caps, title case, or lower case in different places in the drawing and description, the same signal or register field is signified unless the context indicates otherwise. The letter "x" or "X" or "Y" in a register designator refers to any digit to identify elements in an applicable set.

DETAILED DESCRIPTION OF EMBODIMENTS

Various embodiments not only take into account not only the activity of one CPU, but the interaction and activity of some or all of the CPUs in relation to each other. "CPU" refers to a processor generally, such as any of processors 100-103 or a processor central processing unit CPU thereof. Embodiments of apparatus and method are provided to coordinate trace activity of multiple CPUs to qualify what data gets exported to maximize trace bandwidth and provide better debug information. Multiple modes for gathering activity of simultaneous CPU provide different benefits and ways the user can debug the activity in a multiprocessing system. Trace bandwidth is more efficiently utilized.

Some cross trace embodiments are configured to trace activity of the CPUs as they access shared data structures. This provides the ability to determine which CPUs are reading or modifying semaphores, handles, buffers and other shared data structures. Data trace of multiple CPUs is thus provided.

Some cross trace embodiments are programmed to trace CPU activity when an event occurs. This may be a single PC value or a series of PC values. This has a very high instantaneous bandwidth, but is triggered by an event which would not occur very often. The event may be an error detection, a message or semaphore change or any other significant activity.

Some cross trace embodiments trace activity of the CPU when they are interacting. The cross tracing is set up to trace activity of CPUs when executing communication and/or synchronization code, when two or more processors are engaged. Cross tracing is qualified to trace a given CPU, such as by another CPU simultaneously accessing the same communication and/or synchronization code, to capture the given CPU executing this code. A CPU executing this communications and/or synchronization code is captured within a time window established or qualified on the basis of another CPU executing the same or similar code.

Each CPU can also be independently traced to provide a very good debug tool for single threaded applications such as to debug software at less than real time speed or piece-by-piece but with each piece tested at real-time speed. In multi-processor systems running many threads to provide the processing power necessary to execute the algorithms in a product, the interaction of the threads and CPUs is very important to be able to capture and debug.

Some cross trace embodiments can periodically sample the PC values of all of the CPUs to take snapshots of where each CPU is executing and provide profiling information about each CPU's activity without having to record all of the activity of every CPU.

Among various other features and benefits of one or another embodiment, 1) a cross trace unit provides ability to capture trace data based on interprocessor activity, 2) a cross trace unit provides simultaneous samples of multiple CPU program counter values, 3) a cross trace unit can significantly reduce trace export bandwidth requirements in debugging multi-processor systems by only capturing data when processors interact, or 4) capture of trace data can be based on time, triggers and/or activity of one or more CPUs.

In FIG. 1, in one multi-processor embodiment, processors 100-103 have a shared memory 110 and peripherals 120. Each of the processors 100-103 has a pipeline flattener 200-203, triggering unit 210-213 and an encoder 220-223. These are separate units or combined into a single module, depending upon the processor type. The pipeline flattener is used to align the address and data activity since these can occur several clock cycles apart due to pipelining in the CPU. With some CPUs the pipeline flatteners are omitted if the address, data and control signals are already aligned. The pipeline flattener 20x output is then fed to the triggering unit 21x and an encoder 22x. When the trigger conditions are met, the data from the pipeline flattener is compressed and encoded to produce the trace data stream. The encoding process removes redundant information, adds time tags, sync markers and encodes the packets according to a trace protocol. For some background, see U.S. Pat. No. 7,519,497 filed as U.S. patent application Ser. No. 10/729,239 (TI-34656) and also published as published U.S. patent application 20040133388; U.S. patent application Ser. No. 10/256,373 (TI-34653) published as published U.S. patent application 20040064763, and U.S. patent application Ser. No. 11/383,600 (TI-60668) published as published U.S. patent application 20060255981, each hereby incorporated herein by reference. The trace data output is suitably one or more packets of trace data in any appropriate packet size, such as 8, 10, 16 or 20 bits long. An example of trace compression counts and records the number of sequential instructions executed and outputs a single packet that includes the count number. For some background, see U.S. Pat. No. 7,463,653 (TI-34670) which is hereby incorporated herein by reference. In one example, the trace system captures and records parallel trace data at about a 300 MHz data rate for exporting serial data from the chip. For some background, see U.S. patent application Ser. No. 11/383,469 (TI-60580) published as published U.S. patent application 20060259831, each hereby incorporated herein by reference. High speed serializing-deserializing such as SERDES rapid I/O, running at 3+ GHz, trades data width for clock rate. A 3 Gbit/sec serial port using 8/10 encoding of a 300 MByte/sec stream would export the same amount of data as an 8-bit wide (byte-wide) parallel trace port running at 300 MHz. A decoder uses the program listing and a start point to then trace program activity. Discontinuities in program flow, sync points, timing information, and data trace may use multiple packets to represent the traced activity.

Trace data from the CPUs 100-103 are combined by a Trace Combiner 300, which includes or acts as a selector or multiplexer. This logic tags the source of the trace data and then outputs the trace data unmodified. Trace data can be stored in an on chip buffer 400 or exported off chip via trace pins 550 to an external trace receiver by the trace export unit 500. For some background on trace export, see U.S. Pat. No. 7,315,808 (TI-30481), which is hereby incorporated herein by reference.

Figure 2:
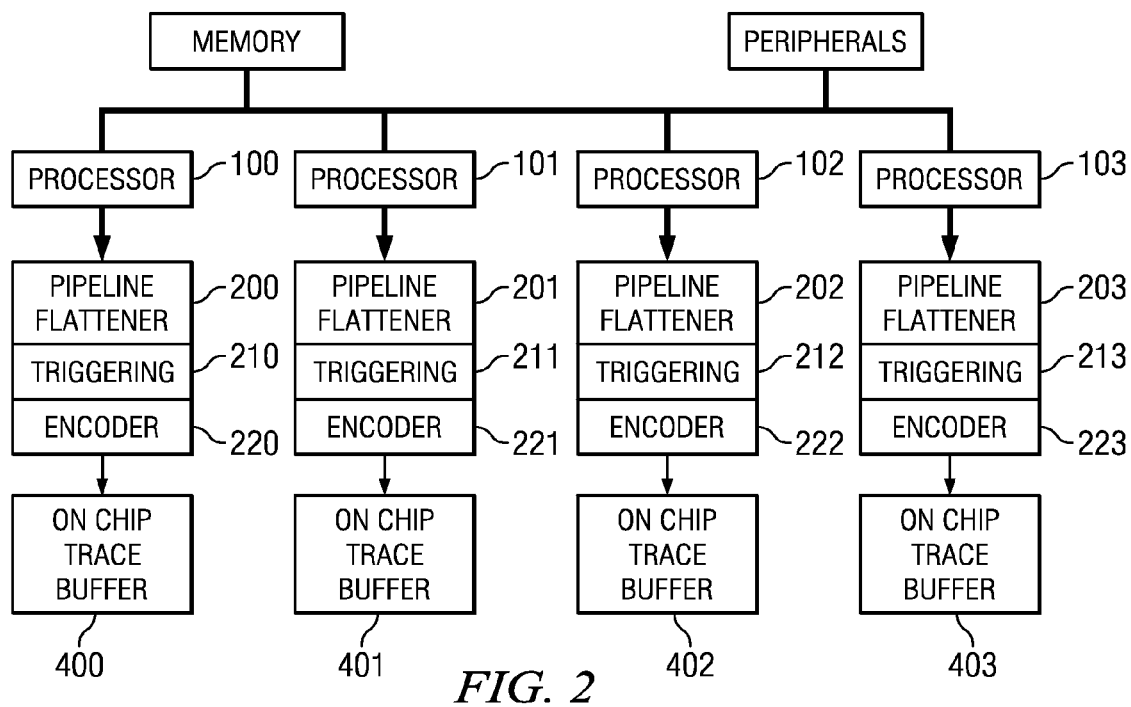
FIG. 2 is a block diagram of a multi-processor system with trace captured for each processor CPU.

In FIG. 2, in a multi-processor embodiment, each of the CPUs has an on-chip trace buffer 400-403. This embodiment allows simultaneous capture of all the CPU trace data. The system of FIG. 2 has one or more trace export units 500 to deliver CPU trace data from the trace buffers 400-403 via trace pins 550 to a trace receiver 600, but these latter items are omitted from the diagram of FIG. 2 for brevity.

Figure 3:
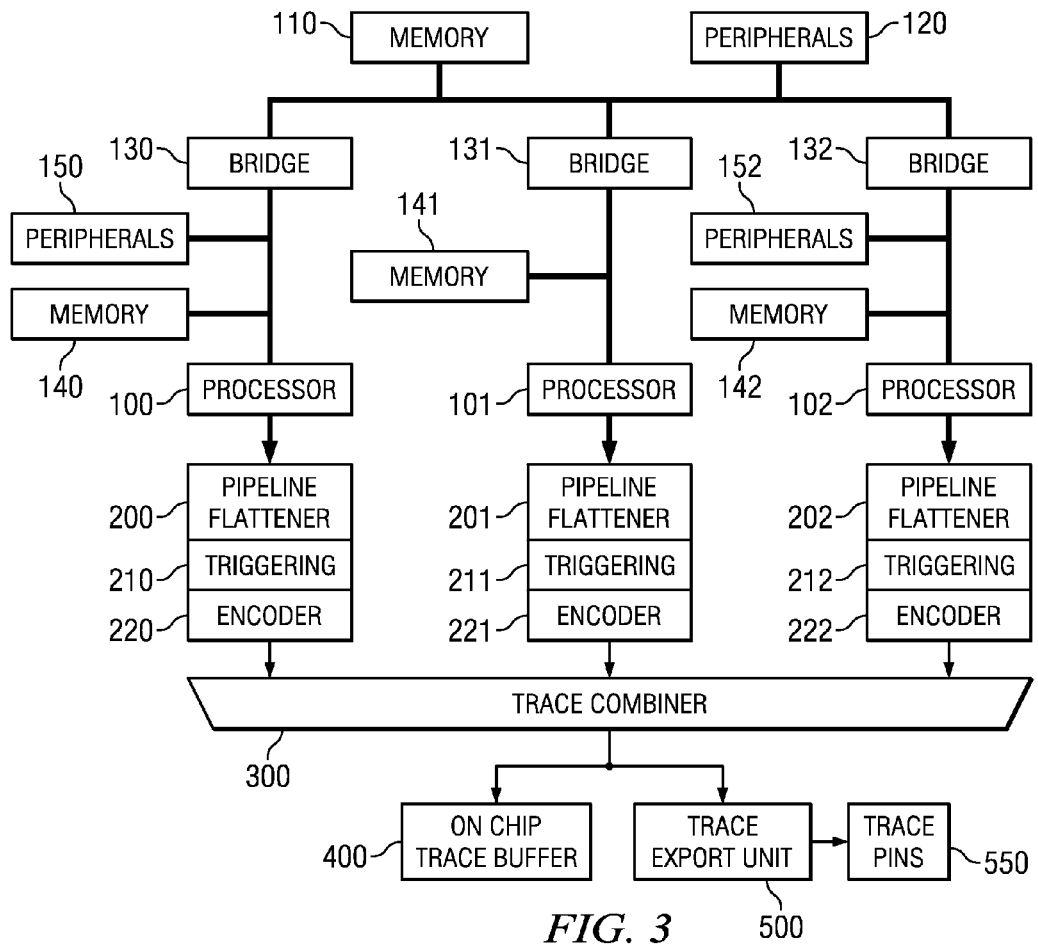
FIG. 3 is a block diagram of a multi-processor system partitioned with separate memory and/or peripheral space, in addition to shared memory and peripherals.

In FIG. 3, a multi-processor embodiment has different types of processors 100, 101, 102 utilized to perform different types of data processing in a heterogeneous SOC. A general purpose processor 100 executes user interface and control tasks and a DSP 101 processes image data and/or modem data, for instance. In FIG. 3, system memory 110 and peripherals 120 are coupled via bridges 130, 131, 132 to the processors 100, 101, 102. Local memory 140 and peripherals 150 coupled to processor 100. Local memory 141 is coupled to processor 101. Local memory 142 and peripherals 152 are coupled to processor 102. Processors 100, 101, and 102 respectively have a pipeline flattener 200, 201, 202; a triggering block 210, 211, 212; and an encoder 220, 221, 222. A Trace Combiner 300 has inputs for encoders 220, 221, and 222 and an output to an on-chip trace buffer 400 and a trace export unit 500. Trace export unit 500 communicates with trace pins 550. FIGS. 1, 2 and 3 in this way show three example embodiments of multi-processor systems, and other possible combinations are also supported by embodiments herein. For some background on comparators and triggering, see U.S. Pat. No. 7,299,386 (TI-34662), published U.S. patent application 2006/0288254 (Ser. No. 11/467,735, TI-35341), and published U.S. patent application 2007/0094645 (Ser. No. 11/566,766, TI-34953.2), which are hereby incorporated herein by reference.

Figure 4:
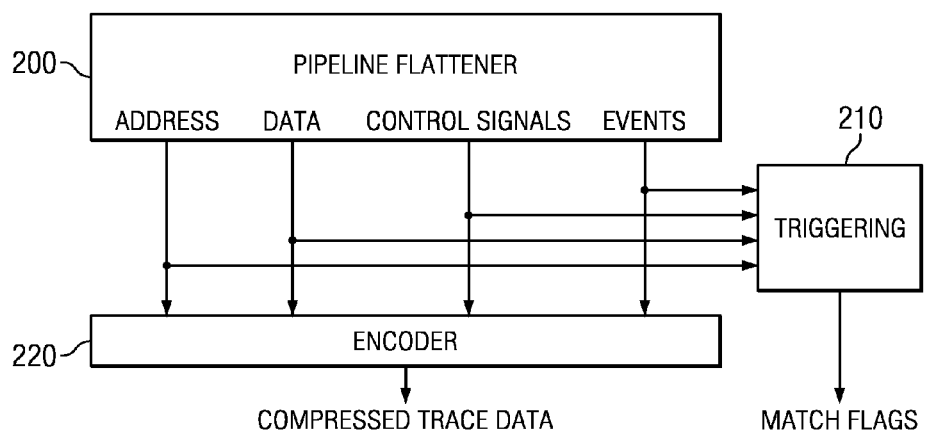
FIG. 4 is a block diagram of debug logic used for trace depicted in more detail, such as for FIGS. 2 and 3.

FIG. 4 shows a more detailed diagram of the interconnections and interaction between the pipeline flattener 200, triggering unit 210 and encoding unit 220. Signals feeding into the triggering unit 210 are address and data bus(es), control signals such as memory read and write, and discrete events such as DMA activity, interrupts, or signals from peripherals, any one or more of which are designated as EVENTS. Triggering unit 210 provides controls such as one or more comparison match flags, and each such comparison match signal or flag is suitably used by other trace logic to control the capture of the trace data. Encoder 220 delivers selected, specific information as Compressed Trace Data from encoder 220 derived from pipeline flattener 200.

Figure 5:
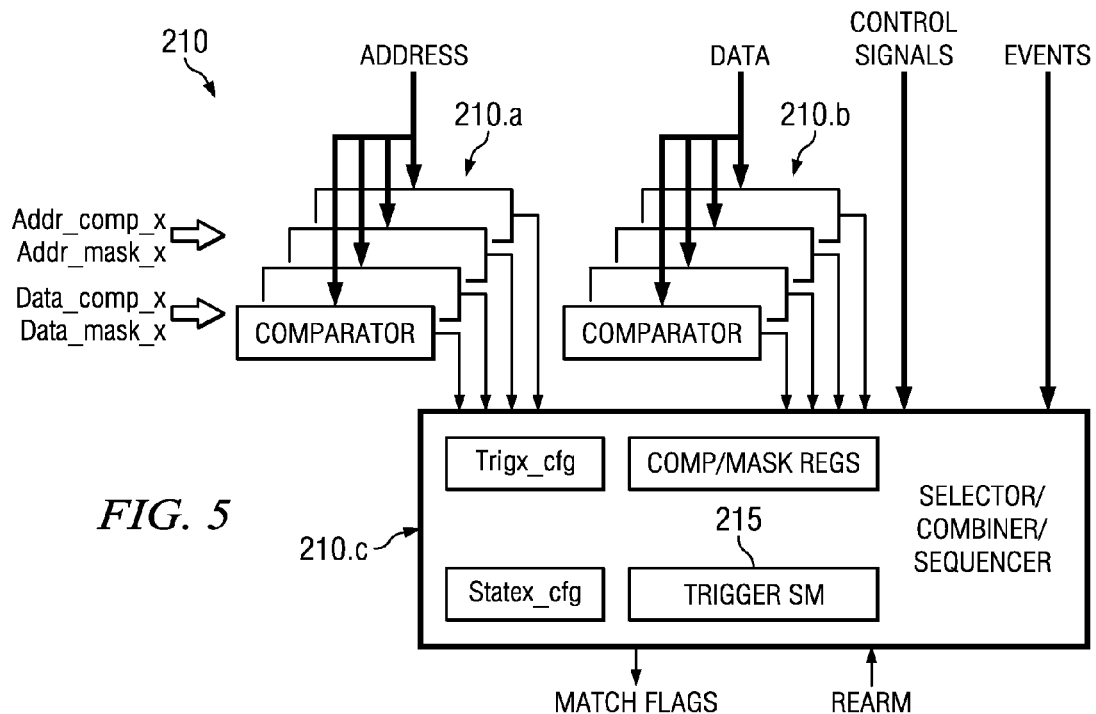
FIG. 5 is a block diagram of a trigger unit shown in more detail, such as for use in FIG. 4.
Figure 6:
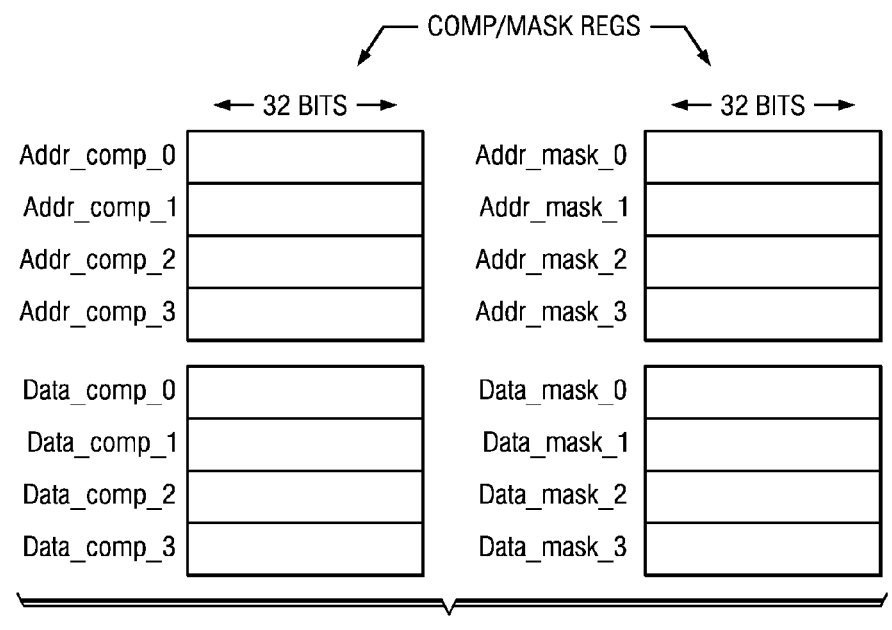
FIG. 6 is a block diagram of registers associated with setting comparator and mask values for the trigger unit of FIG. 5.

In FIG. 5, an example of the triggering unit 210 of FIG. 4 has Compare/Mask registers COMP/MASK REGS of FIG. 6, including four address comparators 210.a and four data comparators 210.b for each of an address and data. A selector/combiner/sequencer 210.c of FIG. 5 is described further in connection with FIG. 8. Alternate implementations may have more or fewer comparators and may have triggering capabilities as described FIG. 8 with varying degrees of sophistication. Triggering unit 210 includes trigger configuration registers TrigX_cfg of FIG. 7, a state machine 215 of FIG. 8, and state configuration registers StateY_cfg of FIG. 9 for the state machine 215. The triggering unit is also operative to generate halt requests (breakpoints) to stop one or more of the processors 100-103. For Cross Tracing, a REARM signal is introduced to the trigger unit, as described in reference to FIG. 8.

In FIGS. 6 and 5, the triggering unit 210 has registers that are programmed by debug software according to user-specified criteria for trace. The example trigger unit 210 in FIG. 5 has four address comparators 210.a and four data comparators 210.b. The comparators 210.a and 210.b are coupled to the registers of FIG. 6 to receive respective signals from address/data mask registers Addr_mask_x and Data_mask_x. Four each of further registers Addr_comp_x and Data_comp_x provide respective comparison values or reference values for each of the four address comparators 210.a and the four data comparators 210.b. In FIG. 5, incoming addresses from the pipeline flatteners get masked, then compared in parallel by address comparators 210.a. Incoming data from the pipeline flatteners is compared bit by bit by comparators 210.b, and then are masked off. Alternatively, the incoming data from the pipeline flatteners is masked off and then compared by comparators 210.b.

Figures 2, 6A:
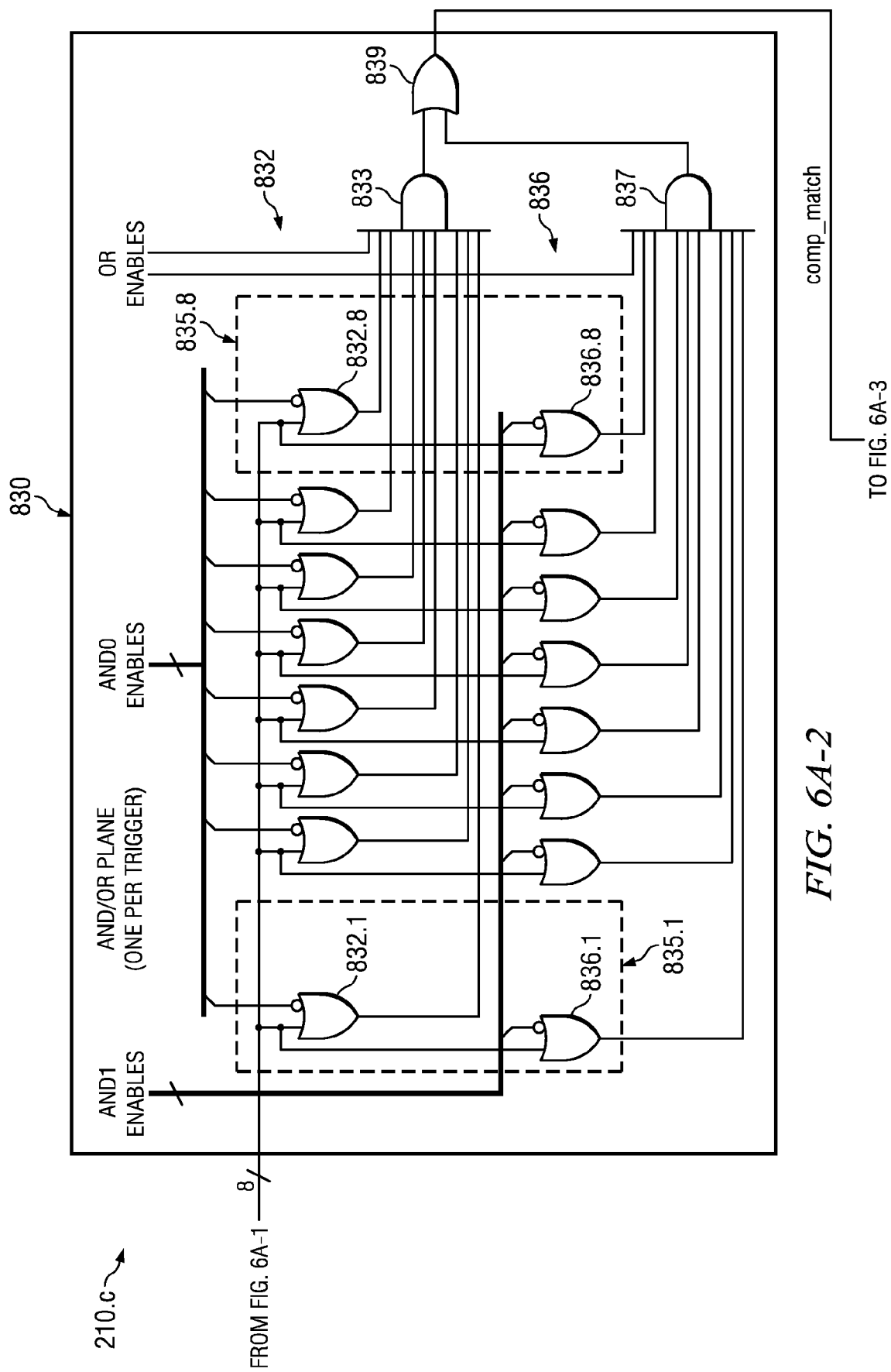
FIG. 6A is a composite schematic diagram of circuitry for use in the trigger unit of FIG. 5.
Figures 3, 6A:
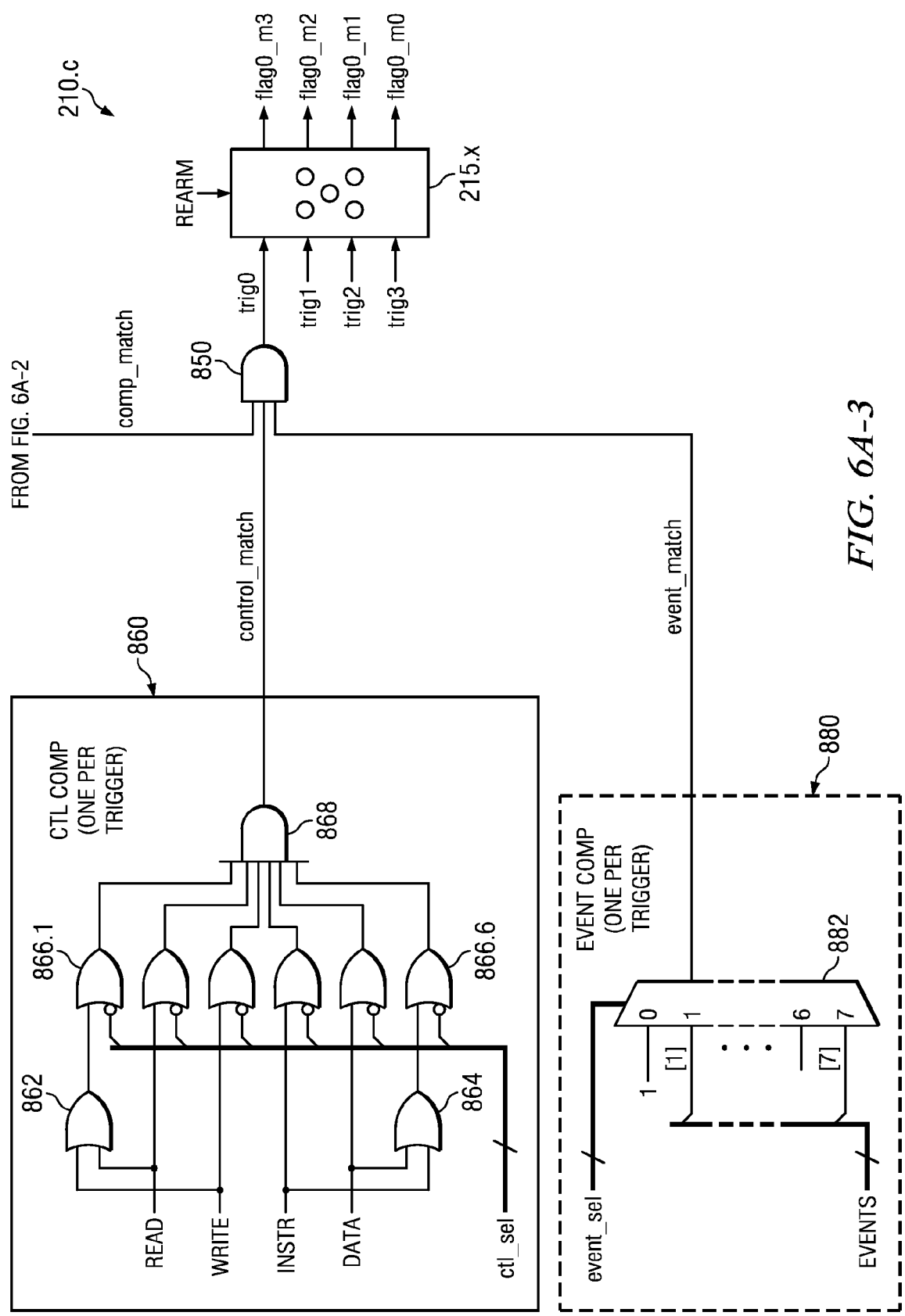

In FIG. 6A, an example trigger logic diagram is shown and is composed of FIGS. 6A-1, 6A-2, and 6A-3. Other variations are possible including more or less sophistication in the way trigger values are selected and combined. The 8xx numbered trigger logic described next is replicated for each trigger output trig0, trig1, trig, 2, trig 3 and the trigger outputs are fed to a state machine 215 for a trigger unit 210 for a given processor 100. That circuitry, including state machine 215 is further replicated as trigger units 210, 211, 212, 213 for each corresponding processor 100, 101, 102, 103 shown in various Figures herein. More or fewer trigger outputs trig and more or fewer trigger units like 210 are suitably provided.

In FIG. 6A-1, this example shows four each of address and data comparators 806.1-806.8 in blocks 210.a, 210.b of FIG. 5 and masking logic indicated by AND-gate logic circuits 802.1-802.8. Each AND-gate logic circuit 802.x has a FIG. 5 multi-bit ADDRESS or DATA input from a processor or bus, and a multi-bit masking input (mask) in FIG. 6A from one of the registers Addr_mask_x or Data_mask_x of FIG. 6. Each AND-gate logic circuit 802.x has a multi-bit output in FIG. 6A-1 to provide a comparison value A to an A input of a corresponding comparator 806.x. Each comparator 806.x also has a multi-bit reference or comparison value input B fed by multi-bit lines comp_reg in FIG. 6A-1 from registers Addr_comp_x or Data_comp_x of FIG. 6.

In FIG. 6A-1, the outputs of the comparators 806.1-806.8 are fed to eight (8) corresponding comparison enable blocks 810.x. Each comparison enable block 810.x has a three-bit (<, =, >) comparison enable configuration (comp_en). The control signals for them are discussed in FIG. 7. Each three-bit (<, =, >) comp_en is fed to an input of a corresponding one of three AND gates 812, 814, 816 that are also respectively fed by three one-bit comparator 806.x outputs legended <, =, >. AND gates 812, 814, 816 supply their outputs to OR-gate 819. Each three-bit (<, =, >) comp_en is also fed to three low active inputs of an AND-gate 818. The output of AND-gate 818 goes to an additional input of the OR-gate 819. In this way the output of the OR-gate 819 is active if all the (<, =, >) comp_en bits are inactive, or if any one or more comp_en bits are active and a corresponding comparator 806.x output legended <, =, > is active.

The respective eight (8) outputs of the eight (8) comp enable blocks 810.x of FIG. 6A-1 are routed through an AND-OR plane 830 of FIG. 6A-2 to allow various Boolean logic combinations of the comparators or comparisons to be selected. An upper set of eight OR-gates 832.1-832.8 and a lower set of eight OR-gates 836.1-836.8 all have low-active inputs. Enable bits from FIG. 7 AND enables fields including eight AND0 enable bits and eight AND1 enable bits go to those low-active inputs. The respective eight (8) outputs of the eight (8) comp enable blocks 810.x go to high-active inputs of a corresponding pair 835.x of the OR-gates, so that e.g. pair 835.1 includes OR-gates 832.1 and 836.1 that have a high-active input connected to each other and to the output of OR-gate 819 in block 810.1. The eight outputs of the eight OR-gates 832.1-832.8 are fed to eight inputs of an upper AND-gate 833, and the eight outputs of the eight OR-gates 836.1-836.8 are fed to eight inputs of a lower AND-gate 837.

In FIG. 6A-2, an example of operation of the AND-OR plane 830, for instance, activates the first two of the eight AND0 enables (e.g., AND0=11000000) that in turn activate a first pair of address comparators. Activating the fifth of eight AND1 enables (e.g., AND1=00001000) activates a first data comparator. Activating the OR-enable input to upper AND-gate 833 delivers the result of ANDing the first address comparison with the second address comparison to a first input of an OR-gate 839. Activating the OR-enable input to lower AND-gate 837 passes the output of the lower AND-gate 837 (first data comparison in this example) to a second input of OR-gate 839 and produces as OR-output the logic function (($1^{st}$ Addr comp AND $2^{nd}$ Addr comp) OR $1^{st}$ data comp).

Notice in FIG. 6A-2 that each of the outputs of OR-gates 832.x and 836.x default high and thereby qualify the inputs of AND-gates 833 and 837 when the corresponding AND0 or AND1 enable for an OR-gate 832.x or 836.x is low or when the AND-gate 818 in circuit 810.x is high. The remaining OR-gates 832.x and 836.x are enabled by enable bits that are high among AND0 or AND1 at the low-active OR-gate enable inputs. Then these OR-gates pass comparison results 806.x, those that have been enabled by comp_en register bits in circuits 810x, on through the AND-OR plane 830 so that OR-gate 839 only produces an active high logic function result comp_match if particular enabled comparisons occur according to a particular enabled or configured logic function. That logic function is enabled or configured by the AND0 enables, the AND1 enables, and the OR enables.

The diagram of FIG. 6A-2 for the block 830 shows two (2) planes 832-833 and 836-837, and can be increased to 3 or 4 planes or more, or reduced to a single plane or a fixed combination, rather than a programmable solution.

In FIG. 6A-3, four control signals (read, write, instruction and data) are shown and monitored in a circuit block 860, as well as seven (7) peripheral or other external FIG. 5 EVENTS that are monitored in a circuit block event comp 880 having a multiplexer 882. The outputs of circuit blocks 830, 860 and 880 are designated comp_match, control_match, and event_match respectively and fed to an AND-gate 850 having output trig0. These various comparisons and events are selected and combined into one x-indexed final output trigx, e.g., trig0, and the comparisons and events are differently or variously selected and combined into each additional x-indexed final output, trig1, trig2, trig3. The trigger outputs trigx (trig0-3) are fed to the trigger state machine 215 of FIG. 8. Pipelining is suitably used to meet timing requirements. The AND—OR plane allows triggering logic expressions or equations to be constructed such as trig=(addr0 <=addr <addr1) AND (data=data0 OR data=data1), for a couple of examples.

In FIG. 6A-3, the control matching circuit block 860 has inputs read, write instr, data derived from processor 100 or from bus(es) coupled to processor 100. Six programmable control selection configuration bits ctl_sel are fed to six corresponding low-active first inputs of six OR-gates 866.1-866.6. AND-gate 868 ANDs and supplies output control_match in response to the outputs of the six OR-gates 866.1-866.6. OR-gates 866.1-866.6 respectively monitor for active control conditions read, write, read or write (using OR-gate 862), instruction instr, data, or either instr or data (using OR-gate 864). Control block 860 is replicated for each trigger0, 1, 2, 3.

In FIG. 6A-3, note that any of the three inputs to AND-gate 850 can be defaulted high (disabled in effect). In circuit block 830 of FIG. 6A-2, setting all AND0 and AND1 enables low and both OR enables high produces a default comp_match high at AND-gate 850. In circuit block 860 of FIG. 6A-3, setting all control selection ctl_sel bits low produces a default control_match high. In circuit block 880, setting all event selection event_sel bits low to select the hardwired one (1) at mux 882 input zero (0) produces a default event_match high. In operation, any one, two or all of circuit blocks 830, 860, 880 can be variously activated (or defaulted high instead) by configuration bits specifying AND enables AND0, AND1, and specifying OR enables, ctl_sel, and event_sel as desired to conveniently establish and monitor desired logic functions encompassing the variously masked address/data comparisons, the control conditions, and peripheral events or other events.

In FIG. 7, in addition to the address and data comparator 210.a and 210.b, and mask registers Addr_mask_x and Data_mask_x, the triggering unit 210 has four pairs of trigger configuration registers TrigX_cfg0 and TrigX_cfg1 associated with block 210.c to qualify what comparator values are of interest. In each register TrigX_cfg0, the outputs of the eight comparators 210.a and 210.b of FIG. 5 are selected using eight groups of three enable bits comp_en in FIG. 6A-1 each signifying (<, =, >) from the TrigX_cfg0 register in FIG. 7. In each register TrigX_cfg1 has fields AND0, AND1, as well as an OR field, and, Ctl_Sel, and Event_sel that specify which comparators outputs will be ANDed and ORed together to determine a comp match, as well as to select control signals and external events. Address comparators 210.a are each configured by register TrigX_cfg to operate and deliver an output for a specified relation such as less than "<", equal "=" or greater than ">" or combination "<=" or ">=" or not-equal "<>." If nothing is selected the output of the comp_enable block is forced high. Data comparators 210.b are each also configured to operate and deliver an output for a specified relation such as such as less than "<", equal "=" or greater than ">" or combination "<=" or ">=". (In some other embodiments, the data comparators 210.b are each configured instead to operate and deliver an output for a specified relation such as equal "=" or not equal "!=".)

Each FIG. 7 trigger configuration register TrigX_cfg1 is also configured with Sel bit(s) in the bit fields Ctl_sel and Event_sel to allow a selection of one Control Signal and one discrete Event (e.g., external interrupt, peripheral event, etc.) from the correspondingly-named CONTROL SIGNALS input lines and EVENTS input lines to FIG. 5 block 210.c. If no control or external signal is selected, their outputs, control_match and event_match are forced high. Other implementations of programmable combinational logic are possible, but these serve to illustrate the functionality of the trigger unit 210.

To capture trace data, in one example when the processor 100 executes a certain function, two address comparators 210.a are programmed for the start (lower) and stop (upper) addresses Addr_comp_0 and Addr_comp_1 of the function. The trigger configuration Trig0_cfg is set up for Greater or equal ">=" to the lower address Addr_comp_0 and less than or equal "<=" to the upper address Addr_comp_1. The trigger configuration Trig0_cfg is set up for addr comp 0 AND addr comp 1. When processor 100 executes an instruction within the programmed address range, the trigger unit 210 outputs a signal and the circuits including the encoder 220 of FIG. 4 cooperate to capture, compress and export trace data.

Figure 8:
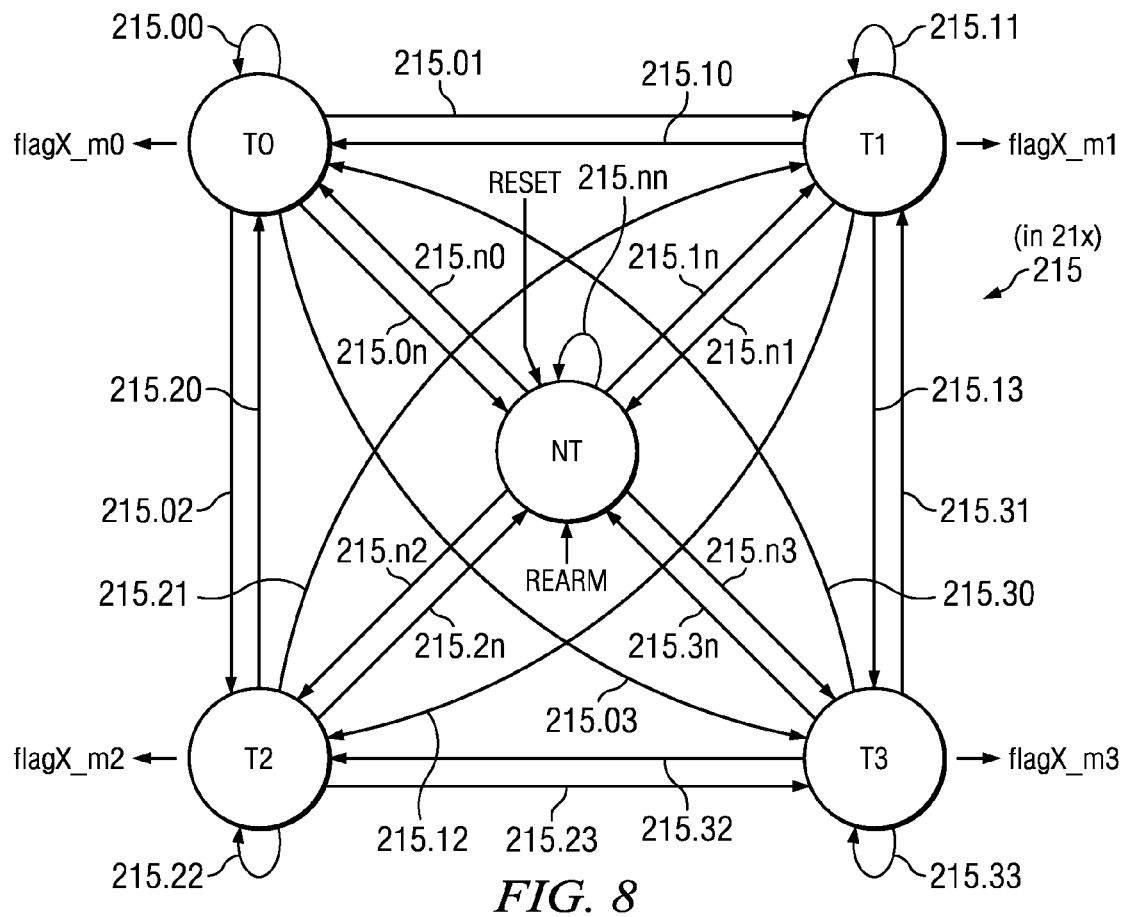
FIG. 8 is a state transition diagram of the trigger unit of FIG. 5.
Figure 26:
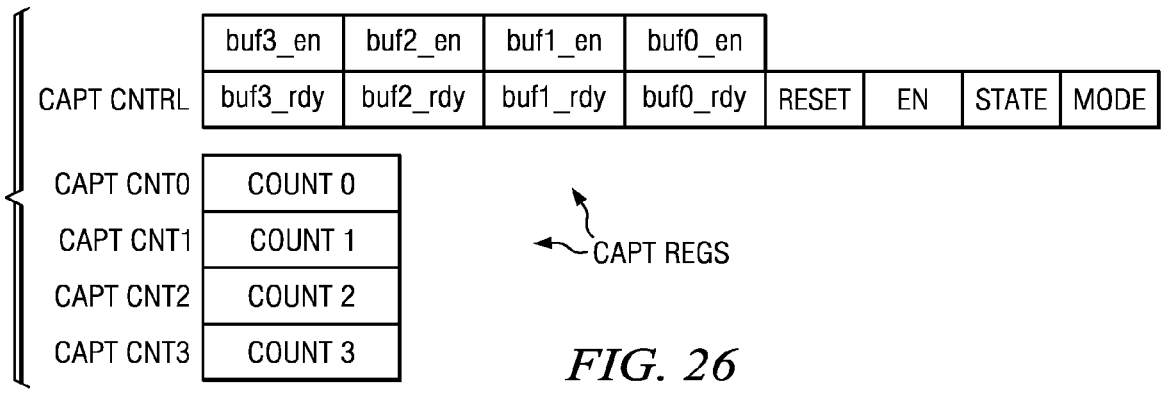
FIG. 26 is a block diagram of registers for the capture control block of FIGS. 20 and 25.
Figure 26A:
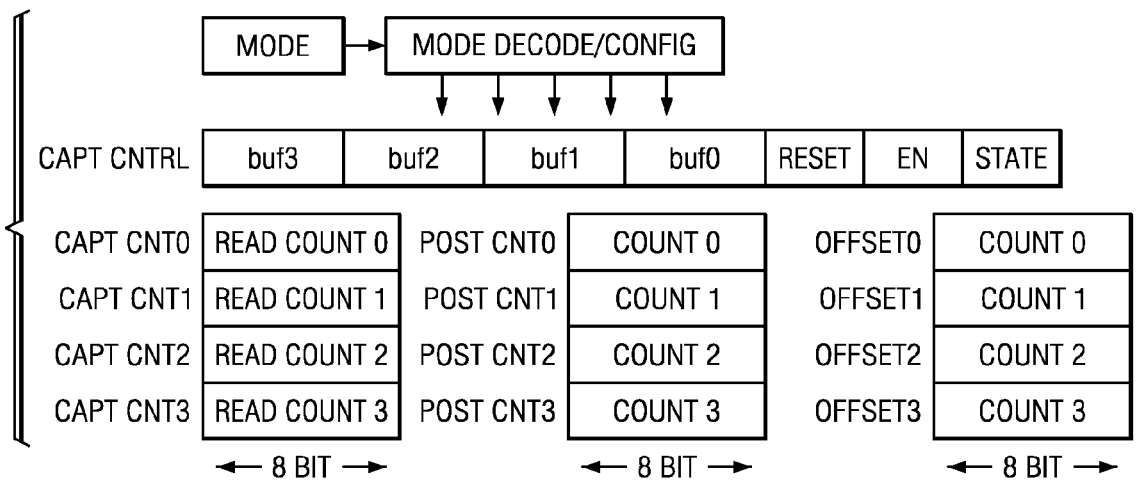
FIG. 26A is a block diagram of alternative registers for the capture control block of FIGS. 20 and 25.

Referring to FIG. 8, more sophisticated tracing and triggering can be performed if the trigger unit block 210.c contains a state machine or sequencer as in FIG. 8 to detect sequences of program activity. The state machine starts in the NT (no trigger) state and goes back to the NT state in response to a REARM signal (FIGS. 18-20) or in response to a RESET signal (FIG. 26 or 26A). Each trigger state T0, T1, T2, T3 can be programmed to recognize specific trigger events or conditions Trig0, Trig1, Trig2, Trig3 being met or not. For some background on programmable state machines see, e.g., Samuel et al. U.S. Pat. No. 7,159,083 assigned to Texas Instruments Incorporated and hereby incorporated herein by reference. In FIG. 8, the programmable state machine can move from any state to any state T0-T3 in response to trigger events TrigX. If no triggers are active or no trigger condition is met, the state machine returns to the NT state. State T3 is the active state where trace data is captured (or a breakpoint asserted). States T0, T1 and T2 are intermediate states, used for detecting the occurrence of a progression of trigger events in specified triggering sequence(s). In FIG. 8 the flagX_mY outputs of the Triggering Units are such that X is the processor number (e.g. processor 100, Triggering Unit 210, flag0_mY). And match output flagX_mY is the output from state TY of FIG. 8 state machine 215 (e.g. flagX_m1 goes active in state machine state T1 of Triggering Unit 21X). Also, by way of example, there are 16 flags if there are four (4) Triggering Units 21X and four state machine states T0, T1, T2, T3 that give match outputs 0, 1, 2, 3.

Figure 8A:
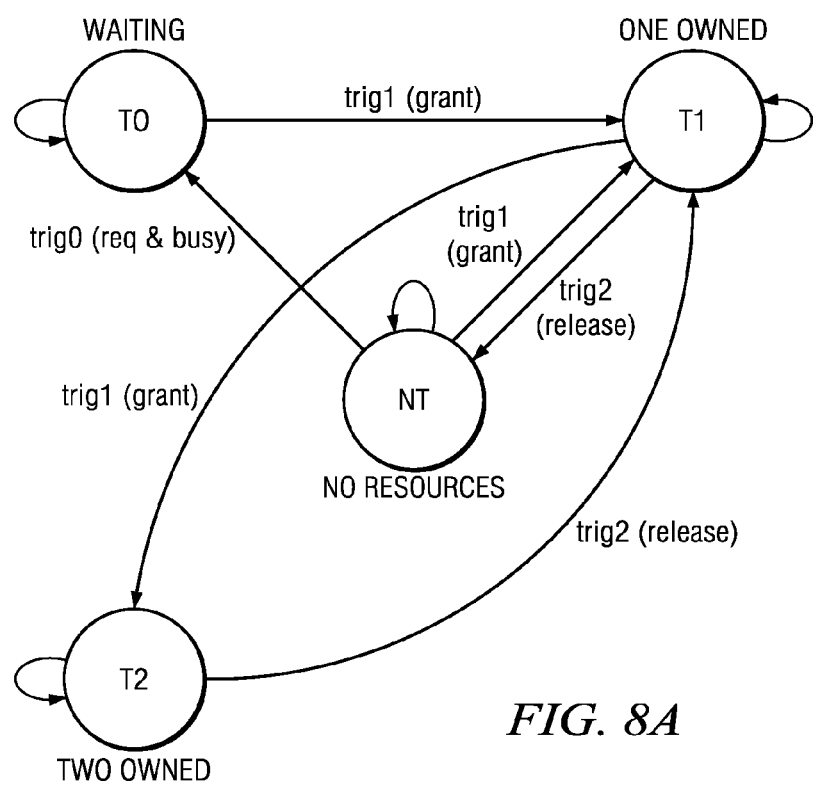
FIG. 8A is another state transition diagram of the trigger unit of FIG. 5 simplified relative to FIG. 8 for illustrating state machine transitions for a scenario of a Simultaneous Activity mode.

FIG. 8A is another state transition diagram for state machine 215.X of the trigger unit of FIG. 5. FIG. 8A is simplified relative to FIG. 8 for illustrating state machine transitions for a scenario of a Simultaneous Activity mode discussed later hereinbelow.

Figures 9, 10:
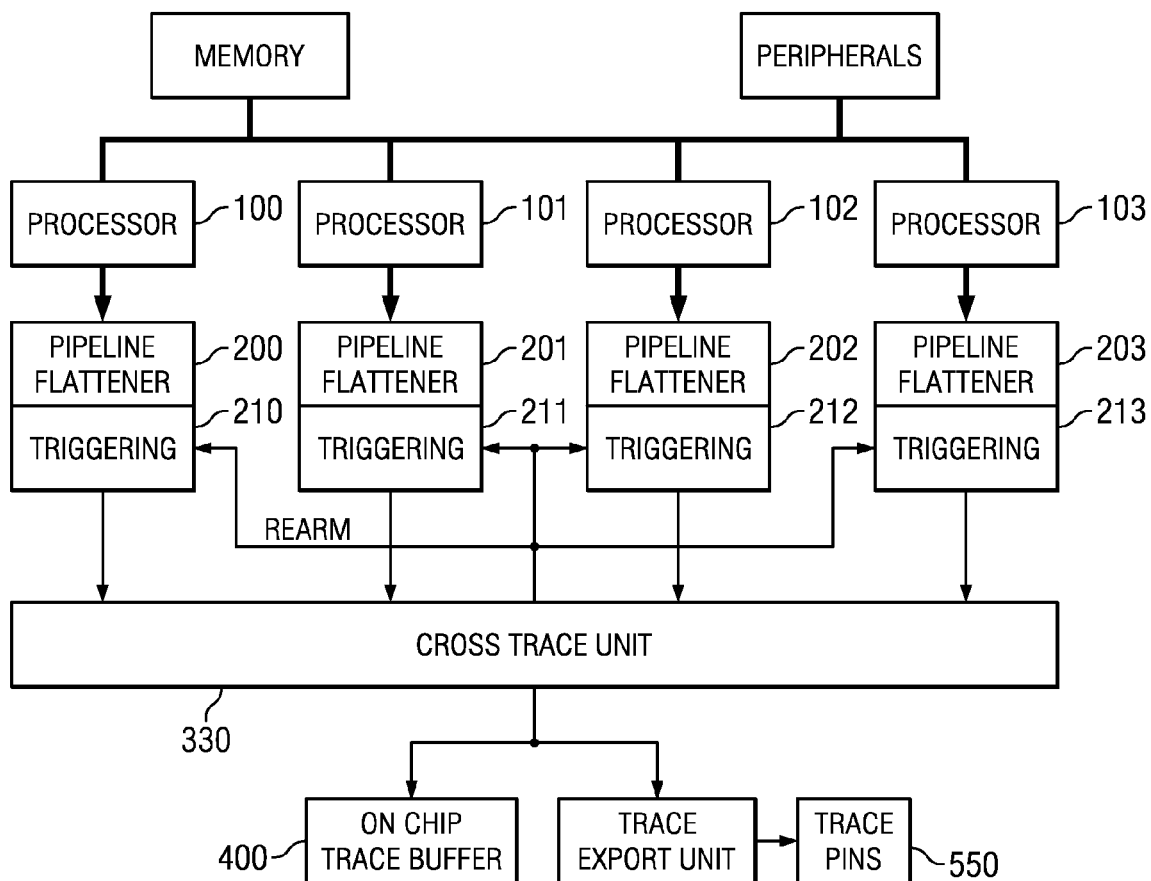
FIG. 9 is a block diagram of configuration registers for the trigger state machine of FIGS. 8 and 5.
FIG. 10 is a block diagram of a multi-processor system combined with trace as in any of FIGS. 11, 11A, 11B, 11C, and 11D.

Referring to FIG. 9, the sequencer control registers allow programming of all of the state transitions from any state to any state in FIG. 8 based on one of the trigger events, which themselves are qualifiers for address, data, control and discrete events. This capability is used to qualify breakpoints to halt the process or minimize the trace data to only the range of interest. The nt_cfg register specifies which state to branch to based on which trigger event occurs when the current state is the no-trigger state NT. Register nt_cfg is provided and each of the states has a negated state action for the current state. This simple configuration acceptably does not address simultaneous trigger events, and in some other embodiments a trigger sequencer is provided with priority circuitry to handle simultaneous triggering if desired. In each state, if another trigger event occurs, the current state is changed to the corresponding new state "new st" according to the contents of the state configuration register. Each such state configuration register has entries to specify a new st to be different from the current state to which the state configuration register applies. If the trigger event which brought the state machine to the current state gets de-asserted, the configuration register specifies what should happen, and the state in FIG. 8 can change to the No-Trigger state NT, remain the same, or advance to another state T0, T1, T2 or T3. This allows triggers to act as one shot events or as continuous events. The state can be forced back to the NT state when the REARM signal is asserted.

In FIG. 9, the state configuration registers nt_cfg and each StateY_cfg operate as sequencer control registers to allow programming of all of the state transitions from any current state to any state T0-T3 or NT based on one of the trigger events TrigX, which themselves are qualifiers for address, data, control and discrete events. In FIG. 9 the register legend "new st" represents a particular entry T0, T1, T2, or T3 entered in register StateY_cfg for each trigger event TrigX. If the state machine of FIG. 8 is in state TY and trigger event TrigX occurs, then particular entry in the "new st" register field signifies the particular new state to be entered. For instance, if the state machine is in state T2 and trigger event Trig1 occurs, then state machine circuitry responds to the particular "new st" entry (e.g., let it be "011" in binary or "3" in decimal) in register State2_cfg for a trigger event Trig1 and goes to new state T3 corresponding to the entry "3". In FIG. 8, corresponding state transition is represented by arrow 215.23. The register StateY_cfg in effect represents a transition matrix for the state machine of all (m x n) transition conditions Trigx to take the state machine from any state Y to any other state "new st."

The state machine capability of FIG. 8 is used, for instance, to qualify address breakpoints to halt a processor and minimize the trace data to only the range of interest. In terms of the State transition diagram of FIG. 8, the registers StateY_cfg of FIG. 9 program or specify the logic to associate with each transition arrow in FIG. 8, wherein those transition arrows are without legends because they are programmable.

An example tracing process based on FIGS. 5-9 starts tracing when the processor 100 executes a function within an address range (Trig 0) and an interrupt occurs (Trig1) and the data read from a peripheral is negative (Trig3). Trig 3 is programmed to match the end of the interrupt service routine. The trigger conditions are configured into the four TrigX_cfg registers of FIG. 7, and the four comparison values each for comparators 210.a and 210.b are set up in FIG. 6 registers Addr_comp_x and Data_comp_x. The sequencer 210.c is programmed by configuring the four registers StateY_cfg of FIG. 9. The sequencer 210.c in this example, is programmed to wait in state NT until the desired function is being executed (trig 0 occurs), whereupon the sequencer advances to state T0 via arrow 215.n0. While in state T0, if an interrupt occurs (Trig 1), the state machine advances to state T1 along arrow 215.01. But if no interrupt occurs and the function is exited, a transition returns operations to state NT along arrow 215.0n. Given state T1, if a data read from the peripheral has the most significant bit set (i.e. it is negative) (Trig 3) then operations advance along arrow 215.13 to state T3. Otherwise, if the interrupt service routine is exited (Trig3), operations return to state NT along arrow 215.1n.

In FIG. 10, in a multi-processor embodiment, each of the processors 100-103 is shown with a pipeline flattener 200-203 and a triggering unit 210-213. Rather than encoding the trace data as in FIG. 4 for each individual processor 100-103 and then combining the independent trace data streams, the outputs of the pipeline flatteners 200-203 are fed to a cross trace unit 330. This provides a flat view of activity for each of the processors 100-103. If the cross trace unit 330 is only supporting capture of program counter activity, the pipeline flattener may not be necessary. The cross trace unit 330 can select and combine trace information from CPUs according to their interaction. Four sets of triggering logic 210, 211, 212, 213 each as described in FIGS. 4-9 provide match controls for the cross trace unit 330. Cross trace unit 330 provides an initializing signal REARM to the triggering logic 210, 211, 212, 213.

Trace data from the cross trace unit 330 is stored in an on chip trace buffer 400 or exported off chip to an external trace receiver 600 by the trace export unit 500. The trace data in this implementation may be, but does not need to be, compressed, and can provide sufficient information to debug CPU interaction.

FIGS. 11 and 11A-11D show five different embodiments for the processors 100-103 and trace hardware, which are replicated for FIGS. 1, 2, 3, 4 and 10 and elsewhere herein. Each embodiment has various benefits.

Figure 11:
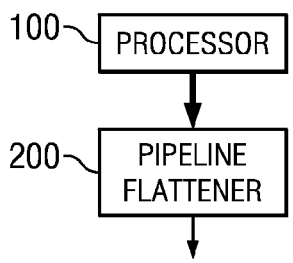
FIGS. 11, 11A, 11B, 11C, and 11D are block diagrams of different trace capture debug logic combinations and arrangements thereof.

In FIG. 11, the first embodiment has a processor 100 and a pipeline flattener 200. This embodiment is economical of hardware and has the cross trace unit 330 of FIG. 10 including triggering logic, and the clocks of all the processors are the same frequency.

Figure 11A:
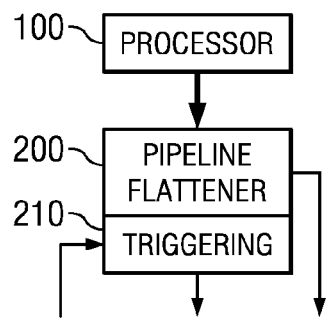

In FIG. 11A, processor-specific triggering units 210-213 respectively support processors 100-103 and pipeline flatteners 200-203. Each processor can be clocked at a different clock frequency. This embodiment is economical of hardware and suitable when it is acceptable to have some latency, and to trace from the trigger point onward, and to capture uncompressed data.

Figure 11B:
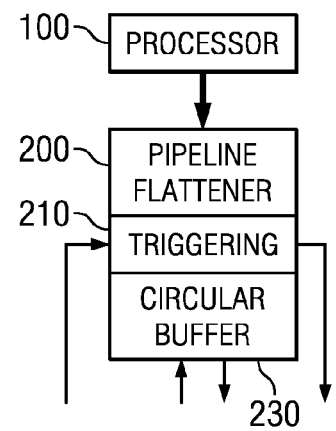

In FIG. 11B, a circular buffer 230 is added in embodiments so that latency is desirably hidden. Moreover, the circular buffer 230 can capture data before the trigger condition is fully satisfied. If the trigger condition is met, then the circular buffer 230 usefully holds data before and after the moment of the trigger condition being met, and otherwise the data can be discarded. The data captured in FIG. 11B is uncompressed.

Figure 11C:
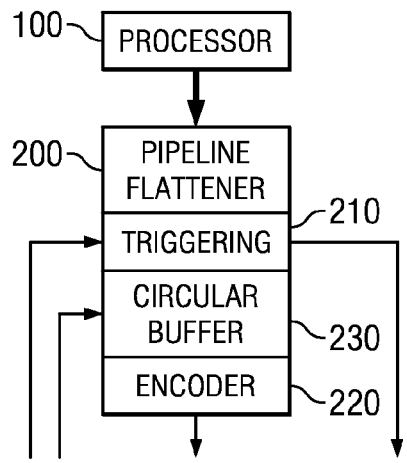

In FIG. 11C, an encoder unit 220 is provided after the circular buffer 230 to compress the trace data and beneficially permit a reduction working size of on-chip trace buffer 400 and permit a more economical trace export unit 500 with reduced bandwidth in FIG. 10. Such compression is beneficial in embodiments with a high CPU clock rate to reduce the required clock rate for trace data acquisition.

Figure 11D:
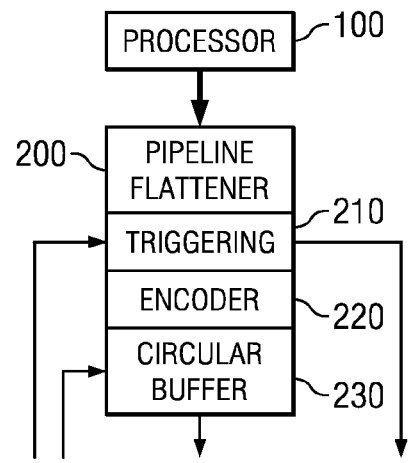

In FIG. 11D, encoder 220 is situated before the circular buffer 230. The encoder 220 compression is also beneficial in embodiments with a high CPU clock rate. Moreover, putting encoder 220 before circular buffer 230 provides greater trace capture depth and can utilize a smaller circular buffer 230 since the data is compressed before buffering. The FIG. 11D embodiment suitably includes a circuit or mechanism that indicates the start of a compressed trace packet, and the circular buffer 230 can discard partial packets when reading, in the case of wrap around.

Figure 12:
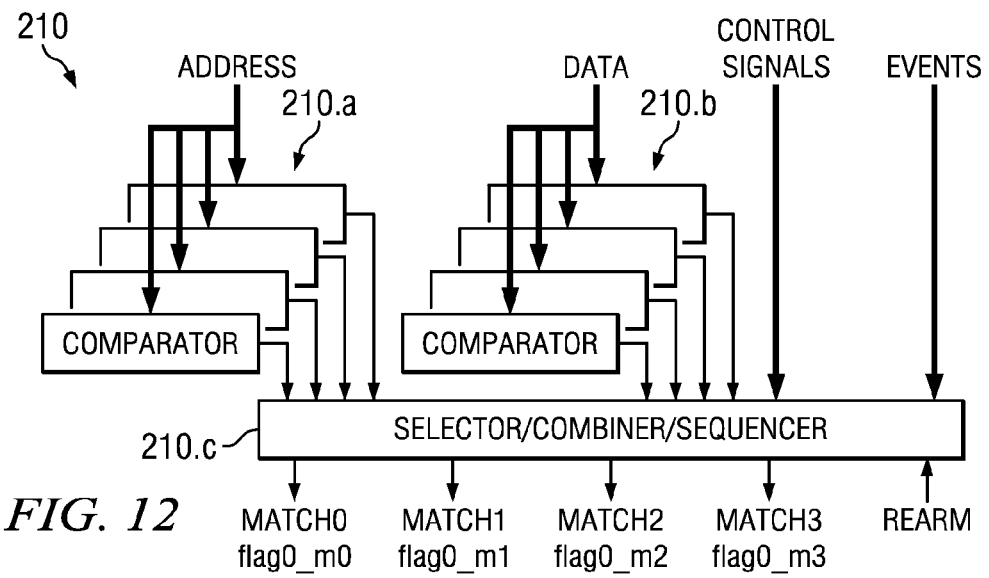
FIG. 12 is a block diagram of an enhanced triggering unit, compare with FIG. 5.

In FIG. 12, an enhanced trigger unit 210 provides additional outputs (match0-match3) and accepts a REARM signal. Some embodiments include these additional features for even more comprehensive cross trigger control. Refer to the description of FIG. 5 for registers and operations that are left implicit in FIG. 12. The four match signals (match0-3) correspond with the four trigger states in embodiments providing a sequencer or correspond to the four trigger events described herein already. Each trigger unit 210 can create different flags each based on a different detection logic specific to that flag and then provide one or match outputs representing different relation operators such as <. =, > for each flag.

In FIGS. 12, 5, and 7-9, programmable triggers (programmed by registers Trig0,1,2,3_cfg of FIG. 7) using comparators and using suitable logic circuits (and/or in some embodiments sum-threshold circuits and/or neural networks) produce active triggers for and state transitions in the state machine(s) of FIG. 8. State machine 215 of FIG. 8 is programmed by registers StateX_cfg of FIG. 9 for each new state transition from a given current state, and each such state machine 215 for a given processor is coupled to, fed by and responsive to the trigger comparators and circuits or networks that produce the triggers.

Figure 13:
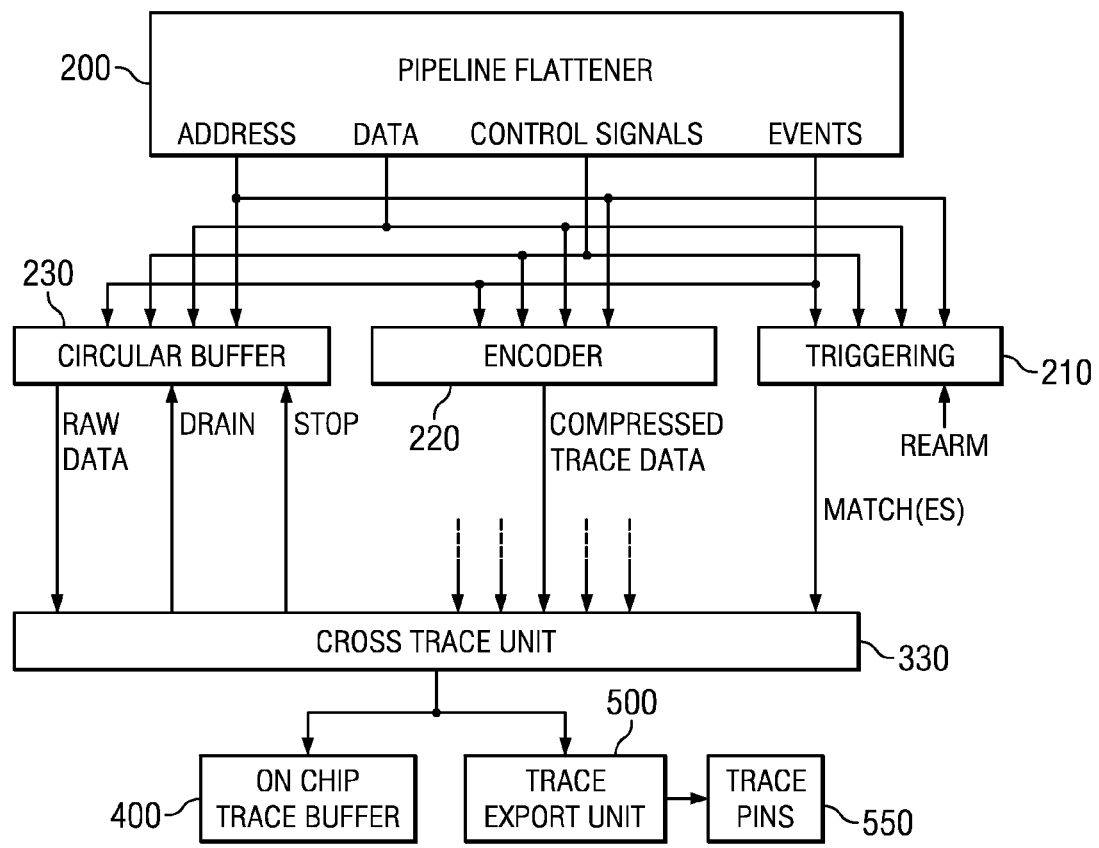
FIG. 13 is a block diagram of trace debug logic with a circular buffer, compare with FIG. 4.

In FIG. 13, pipeline flattener 200 sends all of the address, data, control and event signals simultaneously to the triggering unit 210, encoder 220 and circular buffer 230. This allows the export of trace data in parallel with, or separately from, the cross trace operations and output of Cross Trace Unit 330. The circular buffer 230 has drain and stop controls and it outputs raw (uncompressed) or compressed data. Cross Trace Unit 330 is coupled to on-chip trace buffer 400 and Trace Export Unit 500 to Trace pins 550.

Figure 14:
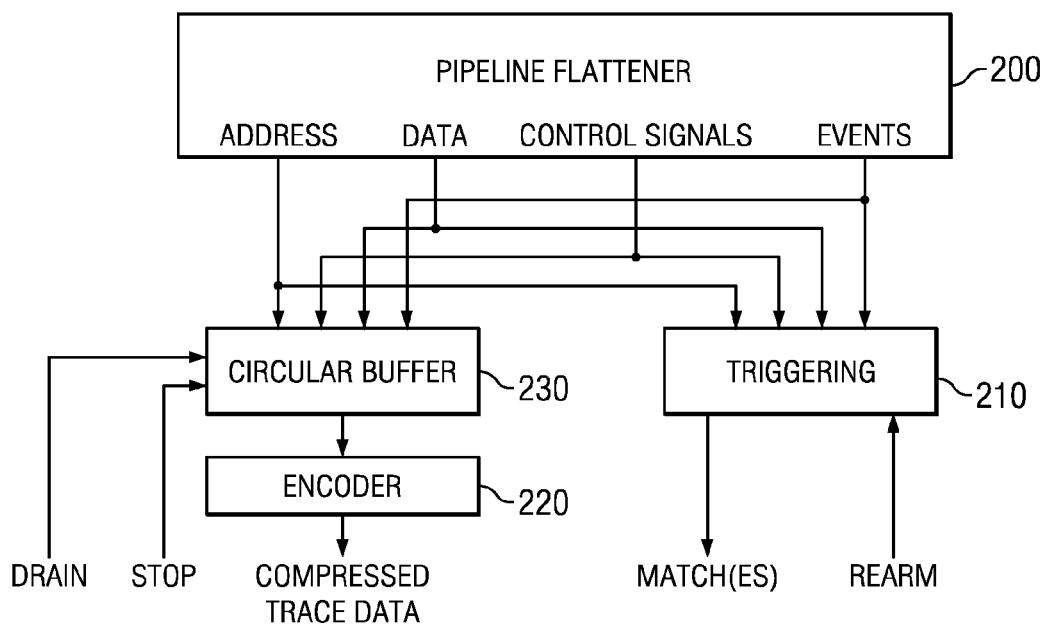
FIG. 14 is a block diagram of trace debug logic with a circular buffer situated before encoder logic.

In FIG. 14, the output of each circular buffer 230-233 is coupled to and sent directly to the corresponding encoder 220-223 to compress the trace data. Compare with FIG. 11C. The circular buffer 230-233 beneficially allows the capture of data occurring before a trigger event as noted in connection with FIG. 11B. Cross Trace Unit 330 is left implicit in the diagram and receives Compressed Trace Data from each Encoder 220-223 and the match outputs from Triggering 210-213. Each pipeline flattener 200-203 has its outputs for Address, Data, Control Signals, and Events coupled in parallel respectively to corresponding Triggering 210-213 as well as to corresponding circular buffer 230-233. Each circular buffer 230-233 has its output coupled to the corresponding Encoder 220-223. Each Triggering 210-213 has its match outputs coupled to the Cross Trace Unit 330. Each Triggering 210-213 can respond to the REARM signal as well as to combinations of the inputs from the pipeline flattener 200-203. The Cross Trace Unit 330 issues drain and stop controls to circular buffers 230-233.

Figure 15:
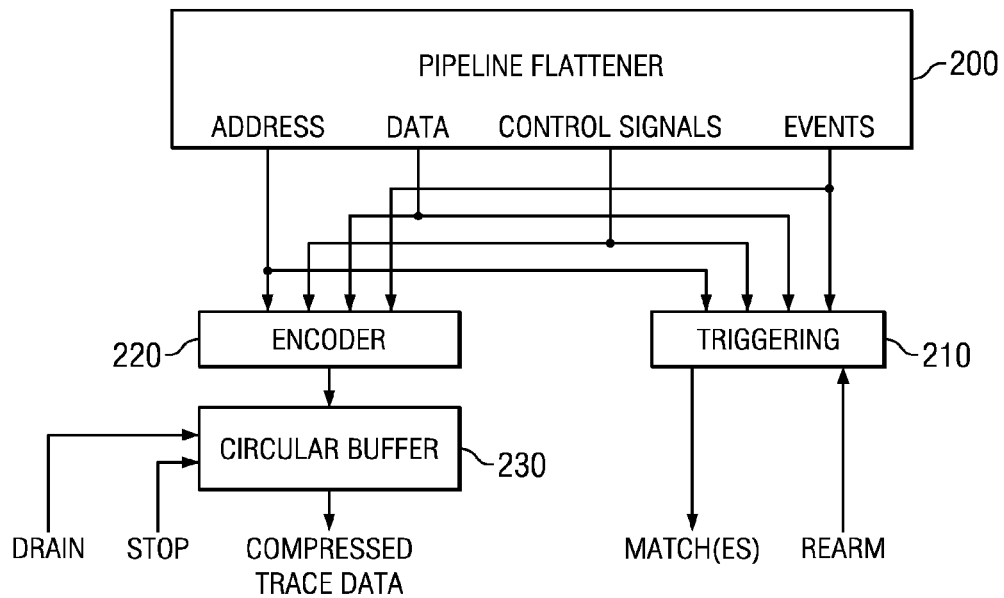
FIG. 15 is a block diagram of trace debug logic with a circular buffer situated after encoder logic.

In FIG. 15, each pipeline flattener 200-203 sends all of the address, data, control and event signals simultaneously or in parallel to the corresponding triggering unit 210-213 and encoder 220-223. The output of each encoder 220-223 is coupled and sent to the corresponding circular buffer 230-233. This arrangement allows a much smaller circular buffer to be used, and an associated circuit or process mechanism identifies the start of a group of trace packets representing one traced event. Complete trace packet groups are output from each circular buffer 230-233 as Compressed Trace Data for Cross Trace Unit 330. Some embodiments multiplex the inputs and outputs of each encoder 220-223 and circular buffer 230-233 such that the encoders are switched in circuit-wise before and so as to feed the circular buffers or alternatively the circular buffers are switched in circuit-wise before and so as to feed the encoders. A circular buffer such as 230 beneficially allows the capture of data occurring before a trigger event involving that one circular buffer, or involving some or all of the circular buffers.

In FIG. 15, Cross Trace Unit 330 is left implicit in the diagram and receives Compressed Trace Data from circular buffer 230-233 and the match outputs from Triggering 210. Compare with FIG. 11D. Each pipeline flattener 200-203 has its outputs for Address, Data, Control Signals, and Events coupled in parallel respectively to corresponding Triggering 210-213 as well as to corresponding Encoder 220-223. Each Encoder 220-223 has its output coupled to the corresponding circular buffer 230-233. Each Triggering 210-213 has its match outputs coupled to the Cross Trace Unit 330. Each Triggering 210-213 can respond to the REARM signal as well as to combinations of the inputs from the pipeline flattener 200-203. Cross Trace Unit 330 issues stop and drain controls to circular buffers 230-233.

Figure 16:
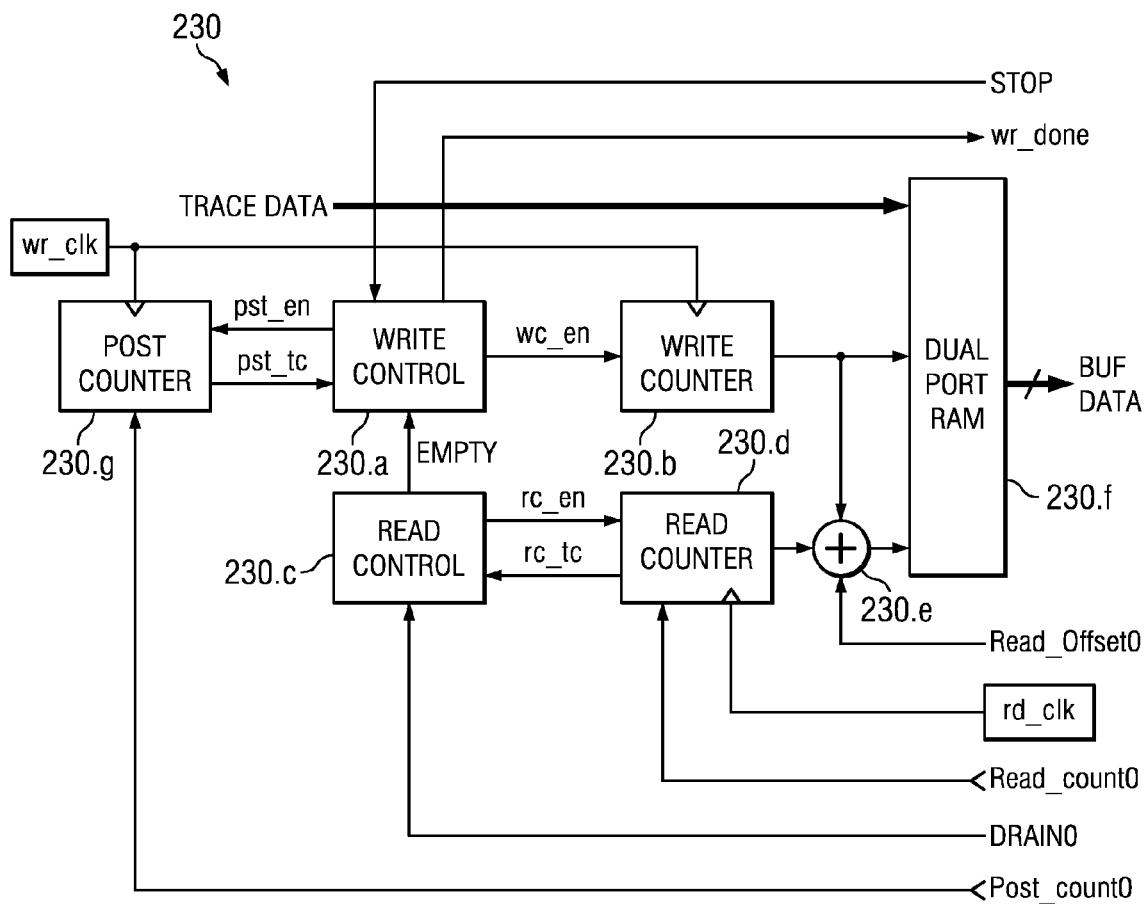
FIG. 16 is a block diagram of a circuit for a circular buffer for combining trace data in other Figures herein where in a circular buffer is utilized.

The circular buffer 230 shown in FIGS. 13, 14 and 15, may optionally have Post Count, Read Count and Read Offset control signals to provide more sophisticated trace capture. Using a Post Count value, the circular buffer 23x outputs a wr_done_x signal, as shown in FIG. 16, but left off FIGS. 13, 14 and 15 for brevity. Without these advanced control signals, the Read data could simply start at the address just past the write counter and return data until the read counter reaches the write counter. In this embodiment these Post Count, Read Count and Read Offset controls come from the Capture Control block 320.d, but other embodiments may embed them within the circular buffer 23x itself.

In FIG. 16, circular buffer 230 has a Write Control logic 230.a, write counter 230.b, read control logic 230.c, a read counter 230.d, a 3 port adder 230.e, a Dual Port RAM 230.f, and a post counter 230.g. Write Control logic 230.a normally has write counter enable wc_en active. Trace Data in FIG. 16 is written to the dual port RAM 230.f, and after each value or datum, the write counter 230.b is incremented. Dual Port RAM 230.f has a finite capacity that, in effect, establishes a Trace Data window. The write counter 230.b automatically wraps around to the start of the address space for circular buffer 230 when a data value is written to the last location in the Dual Port RAM 230.f. Trace Data is written and windowed continually, and in due course Cross Trace Unit 330 asserts the control signal Stop to the Write Control logic 230.a. In response to the Stop signal, Write control logic 230.a asserts or sends a posting-enable signal (pst_en) to post counter 230.g. Write-enable signal wc_en to Write Counter 230.b continues active. When Stop is asserted, the write control logic 230.a allows X more samples of Trace Data to be written under control of the write counter 230.b to the Dual Port RAM 230.f. The post counter 230.g for a circular buffer 23x is programmable on lines Post_countx by register PostCntx of FIG. 26A to allow the number PostCntX of Trace Data samples after a stop (trigger) to be set by the user. Post counter 230.g downcounts from the programmed number PostCntX. The applicable processor 10x CPU clock domain uses a clock wr_clk that is also used as the write clock for write counter 230.b and post counter 230.g of circular buffer 230 (23x in general) so that circular buffer 23x enters TRACE DATA into Dual Port RAM 230.f as fast as the processor 10x sends it. When the downcounting reaches zero, post counter 230.g outputs a signal (pst_tc) to Write Control 230.a signifying that the write has completed and is to be terminated. In response to pst_tc, Write Control 230.a disables counting by Write Counter 230.b by de-asserting wc_en. By disabling Write Counter 230.b, Write Control 230.a terminates writing of Trace Data into Dual Port RAM 230.f for the time being. Write Control 230.a asserts a wr_done signal that signifies to Cross Trace Unit 330 that the write has completed. This stop/wr_done handshake is useful when processing compressed trace data because the data words are likely to be sporadic, due to the varying compression of the raw Trace Data.

The Cross Trace Unit 330 then asserts the drain signal DRAINx to the Read Control logic 230.c of the particular xth circular buffer 23x, which activates enable rc_en to Read Counter 230.d. The starting read address is jointly determined by 1) the current Write Counter 230.b value, by 2) an offset value OFFSETx for circular buffer 23x supplied on lines Read_Offsetx as programmed by the user in register OFFSETx of FIG. 26A, and by 3) the Read Counter 230.d value, which suitably starts at 0 and counts up to the value specified in the Read Countx Register of FIG. 26A and supplied on lines Read_countx. These three values are summed by the three-(3-) port adder 230.e and the read address is sent to the Dual Port RAM 230.f. As each data value is read out, the Read Counter 230.d is incremented and counts up to a programmable value or to the address capacity of Dual Port RAM

230.*f*. A read clock rd_clk is provided and coupled to read counter 230.*d* using a convenient frequency or clock rate for trace read purposes and that can be different from or slower than write clock wr_clk. When the programmed number of trace data samples have been read from Dual Port RAM 230.*f*, Read Counter 230.*c* sends signal rc_tc to the Read Control 230.*c*. Read Controller 230.*c* terminates the reading by de-asserting an rc_en to disable Read Counter 230.*d*. Read Controller 230.*c* asserts an EMPTY signal to Write Control 230.*a*, which in turn lifts the disable from normally enabled (wc_en) Write Counter 230.*b* and thereby commences the operational cycle of circular buffer 230 described in connection with this FIG. 16.

If the trace logic is configured to capture data after a trigger event, the PostCntx value is set to the desired number of samples, the OFFSETx value is set to the negative of the PostCntx value, and the Read Counter 230.*d* is used to read the specified number of samples, beginning at PostCntx samples back from the Write Counter 230.*b*.

If the trace logic is configured to capture data up to a trigger event, the PostCntx value is set to 0, the OFFSETx value is set to the negative of the desired number of samples, and the Read Counter 230.*d* is used to read the specified number of samples, beginning at desired number of samples back from the Write Counter 230.*b*.

If the trace logic is configured to capture data around a trigger event, the PostCntx value is set to the desired number of samples after the trigger, the OFFSETx value is set to the negative of the desired number of samples before the trigger, and the Read Counter 230.*d* is used to read the total number of samples.

Other implementations of the circular buffer 230 are possible, using other types of RAMs, registers, FIFOs, etc. The read/write address mechanism is modified accordingly.

Figure 17:
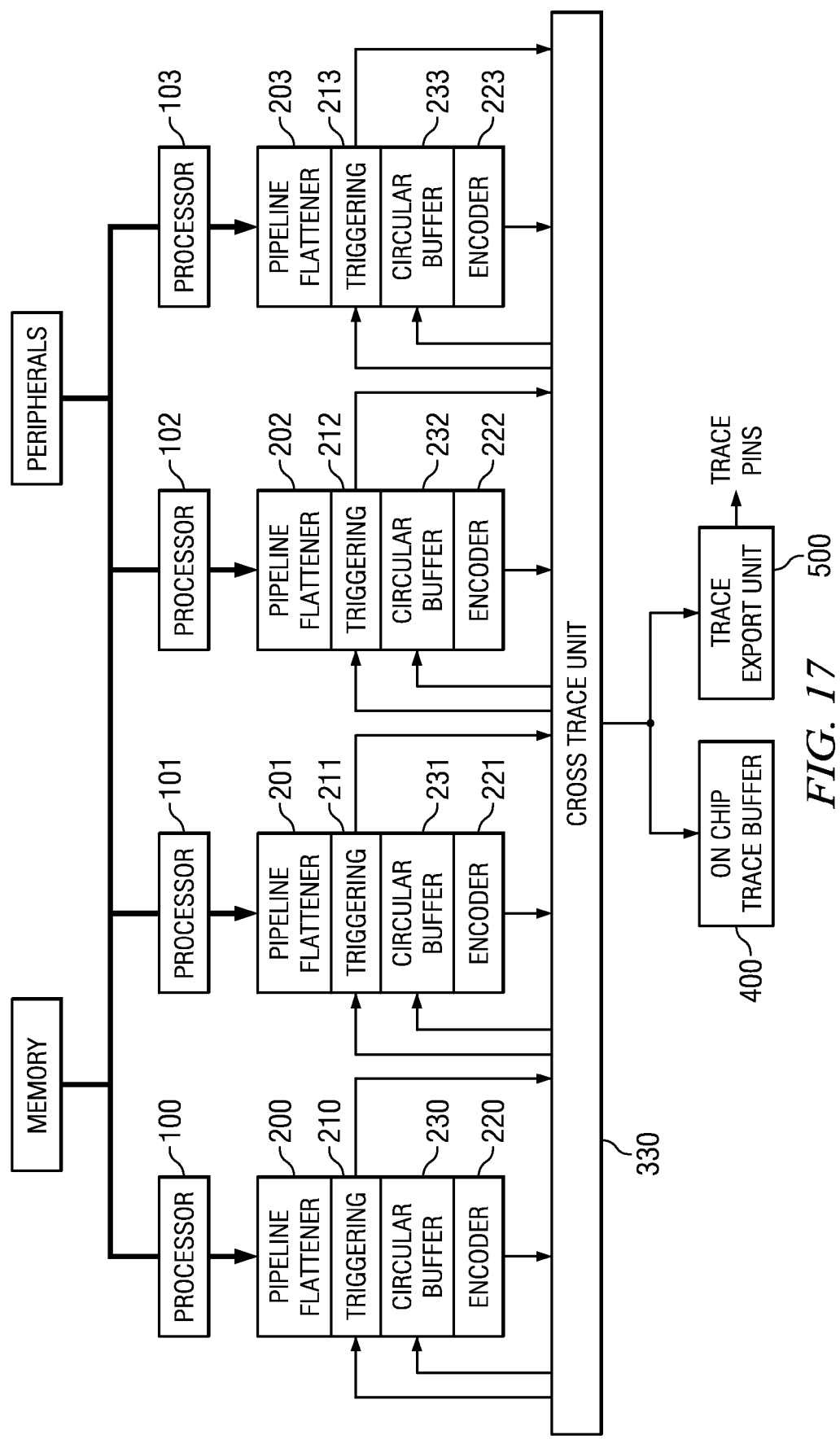
FIG. 17 is a block diagram of a multi-processor system combined with trace according to FIG. 11C.

In FIG. 17, like FIG. 11C, each of the processors 100-103 is coupled with a pipeline flattener 200-203, a triggering unit 210-213, a circular buffer 230-233 and an encoder 220-223. The data presented to the cross trace unit 330 is compressed, but the trigger signals developed by each of the trigger units are available to combine and generate a coordinated trace stream. Controls for the circular buffers 230-233 are used to empty them into either the on chip trace buffer 400 or exported off chip to an external trace receiver 600 by the trace export unit 500.

The embodiment of FIG. 17 does not have or does not need to have encoders 220-223 tag the start of each trace packet group and read back complete packet groups, which promotes simplicity of operation. Complete data is fed into the encoders 220-223. When the last data value is read from one of the circular buffers 230-233, the corresponding encoder 220-223 is pulsed by Cross Trace Unit 330 with a flush command (STOP) to output any packets still being processed. For example, suppose the last few trace data values were sequential program instructions and the encoder 220 is constructed to normally output a packet when a program address (program counter PC) discontinuity occurs in the program sequence. The flush command forces the discontinuity and the encoder 220 outputs the number of sequential instructions it has captured. In addition, this embodiment minimizes the temporal differences in trace data across multiple processor 100-103 cores. When storing compressed data from the encoders 220-223, there is a larger uncertainty regarding when a particular trace event occurred due to the compression. The trace data is already compressed, and when a synchronization point is detected by Cross Trace Unit 330, the trace data is decoded.

Figure 18:
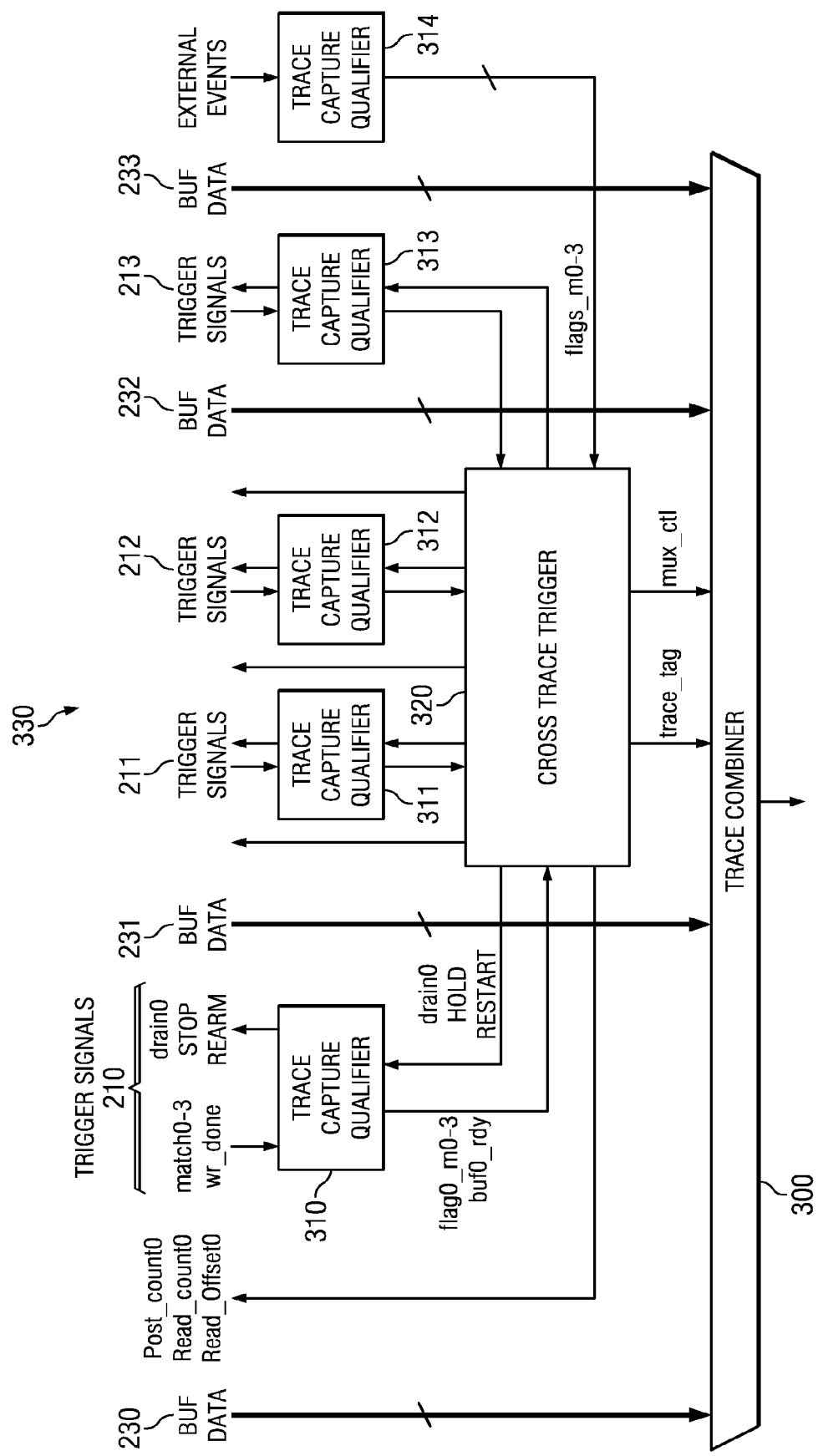
FIG. 18 is a block diagram of a cross trace unit for use as cross trace unit 330 in FIGS. 10 and 17.
Figure 19:
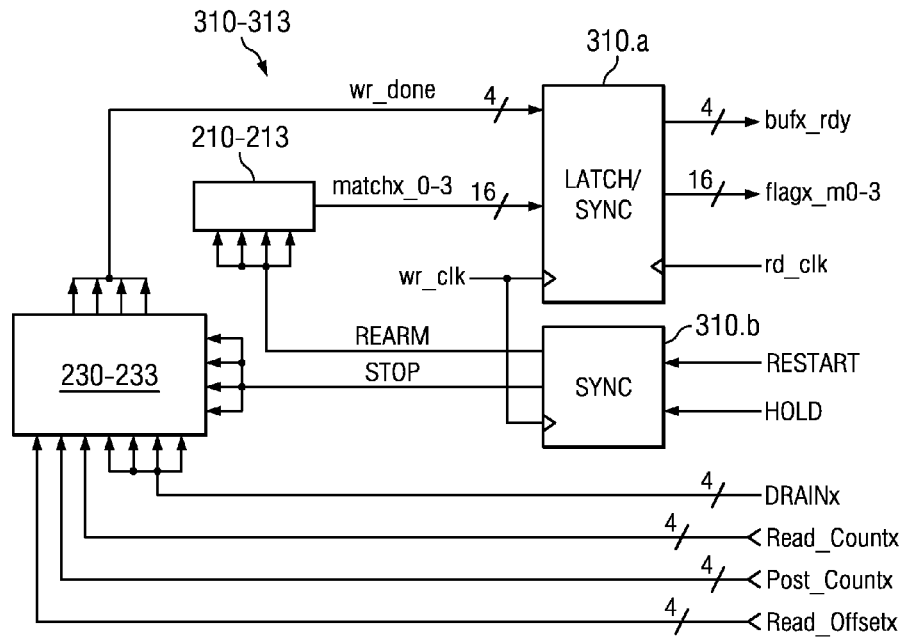
FIG. 19 is a block diagram detailing trace capture qualifier logic for use in the cross trace unit of FIG. 18.

In FIG. 18, the Cross Trace Unit 330 includes Trace Capture Qualifiers 310-313 for each processor 100-103. The outputs of the Trace Capture Qualifiers 310-313 are fed to a Cross Trace Trigger Unit 320 which controls the data being collected by the trace combiner 300 as well as generates trace tags to identify the trace streams. The trace tags suitably are provided as any one, some or all of time stamps, synchronization (sync) markers, loop markers, control bits, processor core identification ID tag for each respective trace stream, trace encoder controls for an external trace decoder, event descriptors, or other trace tags in the trace stream itself or parallel to the trace stream(s). External events are also utilized to affect the operation of the cross trigger sync/trigger logic 320 by sending them through a Trace Capture Qualifier 314. The drain signal on the straight-through line in FIG. 19 is not and does not need to be synchronized, when the read logic in the circular buffer is in the same clock domain as in the example here. If the circular buffers 230-233 are implemented differently, then appropriate synchronization logic is used. The detailed signals are shown for Trace Capture Qualifier 310. Details for Trace Capture Qualifiers 311, 312, 314 are similar, and left out for clarity.

In FIGS. 18 and 19, outputs from Trace Capture Qualifiers 310-313 to Cross Trace Trigger unit 320 include bufx_rdy and flagx_m0-3. Inputs from Cross Trace Trigger unit 320 to Trace Capture Qualifiers 310-313 are RESTART, DRAINx, HOLD. For the Trace Capture Qualifier 314 driven by external events, the outputs are flags_m0-3. Regarding Trigger signals, the inputs to Trace Capture Qualifiers 31*x* are wr_done from each circular buffer 23*x* and each match0-3 (flagx_m0-3) from Triggering units 21*x*. Outputs from Trace Capture Qualifiers 31*x* are STOP and DRAINx to circular buffers 23*x* and REARM to Triggering units 210-213. The lines designated Post_countx, Read_Offsetx and Read_countx also go from Cross Trace Trigger unit 320 in FIG. 18 to circular buffers 23*x* of FIG. 16.

In FIG. 19, the logic of each of the trace capture qualifiers 310-314 has a Latch/Sync block 310.*a* and a Sync block 310.*b*. Let the processor CPU clock domains use one or more clocks wr_clk and let the cross trigger clock domain use a different clock rd_clk. Latch/Sync block 310.*a* has inputs that respectively receive trigger signals matchx_0-3 for each of several flags from each Triggering Unit among such units 210-213 (FIGS. 12-15, 20). Latch/Sync block 310.*a* has further inputs that respectively receive each circular buffer 23*x* signal wr_done_x (FIGS. 16, 19) from the processor CPU clock domains clocked on one or more clocks wr_clk. Latch/Sync block 310.*a* latches and synchronizes the signals on those inputs to the cross trigger clock domain on rd_clk. The four match signals matchx_0,1,2,3 from each of the four Triggering blocks 210-213 are thus synchronized by Latch/Sync block 310.*a* and output as a corresponding one of sixteen flagx match signals flagx_m0-3 in FIG. 19 to Cross Trace Trigger Unit 320 in FIGS. 20, 21, 21A. The wr_done signal from each circular buffer 23*x* is also thus synchronized by Latch/Sync block 310.*a* and output as a corresponding one of signals bufx_rdy in FIG. 20. Signals are latched since the CPU clock wr_clk can be much faster than the Cross Trace Trigger 320 clock rd_clk. A hold signal HOLD from the Cross Trace Trigger Unit 320 is synchronized by Sync block 310.*b* to the CPU clock domain wr_clk to deliver a STOP signal in common to the circular buffers 230-233 to be stopped in FIGS. 14-16 when a cross tracing trigger event is detected by Cross Trace Trigger Unit 320. (Some other embodiments are arranged to deliver respective separate HOLD/STOP signals from the Cross Trace Trigger Unit 320 to the circular buffers 230-233 in case fewer than all of the circular buffers are to be stopped when a cross tracing trigger event is detected.) The separate HOLDx/STOPx signals are qualified by applicability (or not) of a given circular buffer 23x to the cross tracing trigger event as indicated by MASK REGS not masking off (or masking off) all match flag inputs from Triggering Unit 21x via Trace Capture Qualifier 31x for a given processor 10x. (see FIGS. 21, 21A and 23B). In FIG. 19, a RESTART signal is synchronized similar to the HOLD signal and delivered to the triggering units 210-213 as REARM. RESTART also is used to reset Latch/Sync block 310.a. The Read Countx, Post Countx and Read Offsetx are not shown synchronized as it is assumed that these signals will be static during operation of the Cross Trace Unit.

Figure 20:
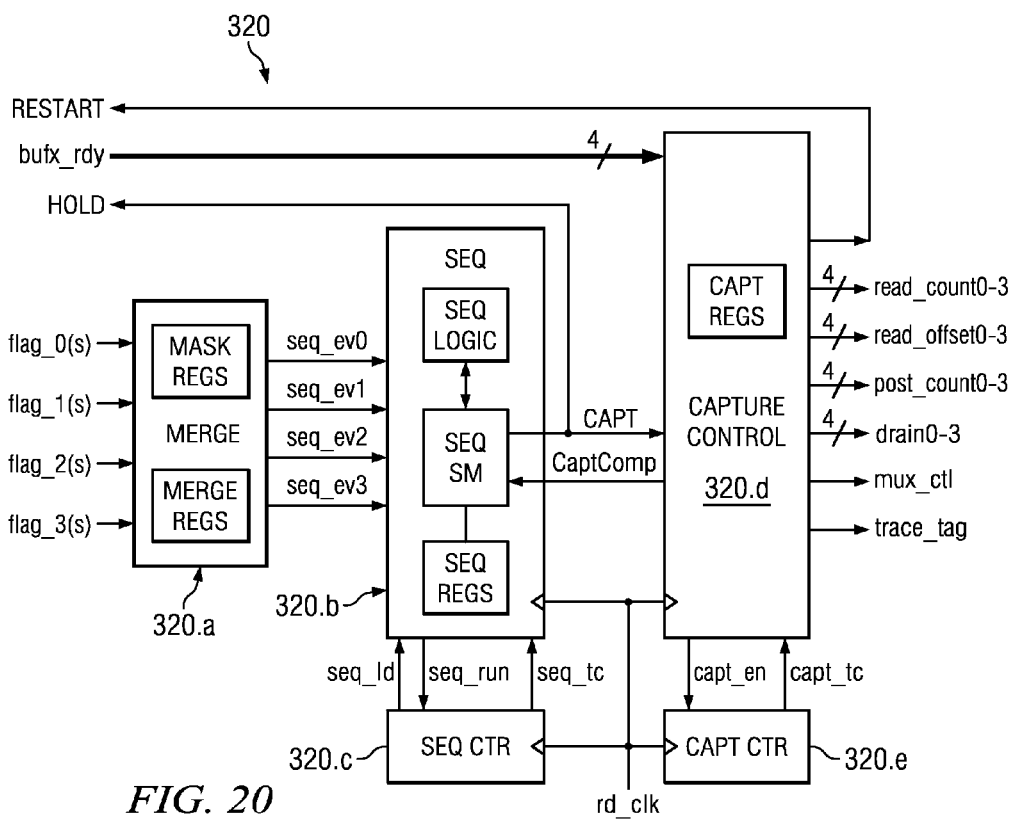
FIG. 20 is a block diagram detailing a cross trace trigger unit for use as the cross trace trigger unit in FIG. 18.

In FIG. 20, the Cross Trace Trigger unit 320 of FIG. 18 merges the signals from the Triggering blocks 210-213 synchronized by the Trace Capture Qualifiers 310-314. This example shows four sets of four match flags each, and the numbers can be arbitrarily established to suit the system architecture and support desired trace operations. The flags flagx_m0-3 are combined by the merging unit 320.a to generate or create outputs called sequencer events (seq_ev#). Four such sequencer event outputs seq_ev# are shown in this example, and the number of such sequencer events can be established to be greater or fewer or can be configurably or programmably determined in various embodiments. The sequencer events seq_ev# lines go to a Sequencer unit 320.b which is programmed or configured in mask registers MASK REGS to detect or identify the desired or specified activities of processors 100-103 and the occurrence of a specified relationship between those activities and/or a particular sequence of those activities. In this way, particular actions and interactions of processors 100-103 and other system components in relation to one another are detected and traced. Sequencer unit 320.b outputs a capture signal CAPT to a Capture Control unit 320.d when a sequence of conditions has been satisfied. Sequencer 320.b delivers a hold output HOLD for the Trace Capture Qualifier circuits 310-313 (each as in FIG. 19) to then deliver the Stop signal to the circular buffers 230-233. The hold output HOLD is fed by, or can be same as, Capture CAPT or otherwise as appropriate to control the circular buffers 230-233.

In FIG. 20, a Sequencer Counter Seq Ctr 320.c is provided in some embodiments to time specific processor activities or time particular states of Sequencer 320.b. Sequencer 320.b has a load (seq_ld) output, an enable/run (seq_run) output and a time completion (seq_tc) input each coupled to the sequence counter Seq Ctr 320.c. The enable/run seq_run is activated for Seq Ctr if, for a current Sequencer state Sx among states S0-S3, a nonzero value is configured into a programmable Seq_Ctr register field Run for a corresponding register Seqx_cfg in registers SEQ REGS of FIGS. 20 and 24. For example, if FIGS. 20 and 23 Sequencer 320.b is in a state S2, and FIG. 24 corresponding or associated register Seq2_cfg has a nonzero value in its Seq_Ctr register field Run, then enable/run seq_run is fed to sequence counter Seq Ctr 320.c. Seq Ctr 320.c is loaded with a nonzero value in that Seq_Ctr register field Run of FIG. 24 for a register Seq2_cfg and then counts down to zero whereupon time completion seq_tc goes active.

In FIG. 20, a Capture Control unit 320.d receives the bufx_rdy inputs from FIG. 19 that are synchronized to respective wr_done outputs from the circular buffers 230-233 of FIG. 16 and other Figures. Capture Control unit 320.d in FIG. 20 issues one or more particular drain signals DRAINx to the circular buffers 230-233 respective to the one or more particular processor(s) being traced among processors 100-103. Capture Control unit 320.d also sends multiplexer selection controls mux_ctl to Trace Combiner 300 and outputs trace tags to identify the trace streams. The protocol for combining the trace streams can be an existing protocol, such as the MIPI Trace Wrapping Protocol, or a proprietary one. The lines designated Post_countx, Read_Offsetx and Read_countx go from Capture Control unit 320.d to circular buffers 23x of FIG. 16. Capture Control 320.d issues the RESTART signal to re-initialize the Triggering units 21x and other circuitry as appropriate. Capture Control 320.d issues a capture completion signal CaptComp signal to re-initialize the Sequencer state machine SEQ SM as appropriate.

In FIG. 20, a Capture Counter 320.e is enabled by a line capt_en from Capture Control 320.d and delivers a time completion active or counter-timed-out signal on a line capt_tc to Capture Control 320.d. Capture Counter 320.e is used to collect a programmed number of samples from each particular processor CPU 100-103 from which trace output is obtained. The value for the Capture Counter 320.e should correspond with the number of samples specified in the circular buffer unit (23x). These may be the same register value or separate values depending on the specific implementation.

Figure 21:
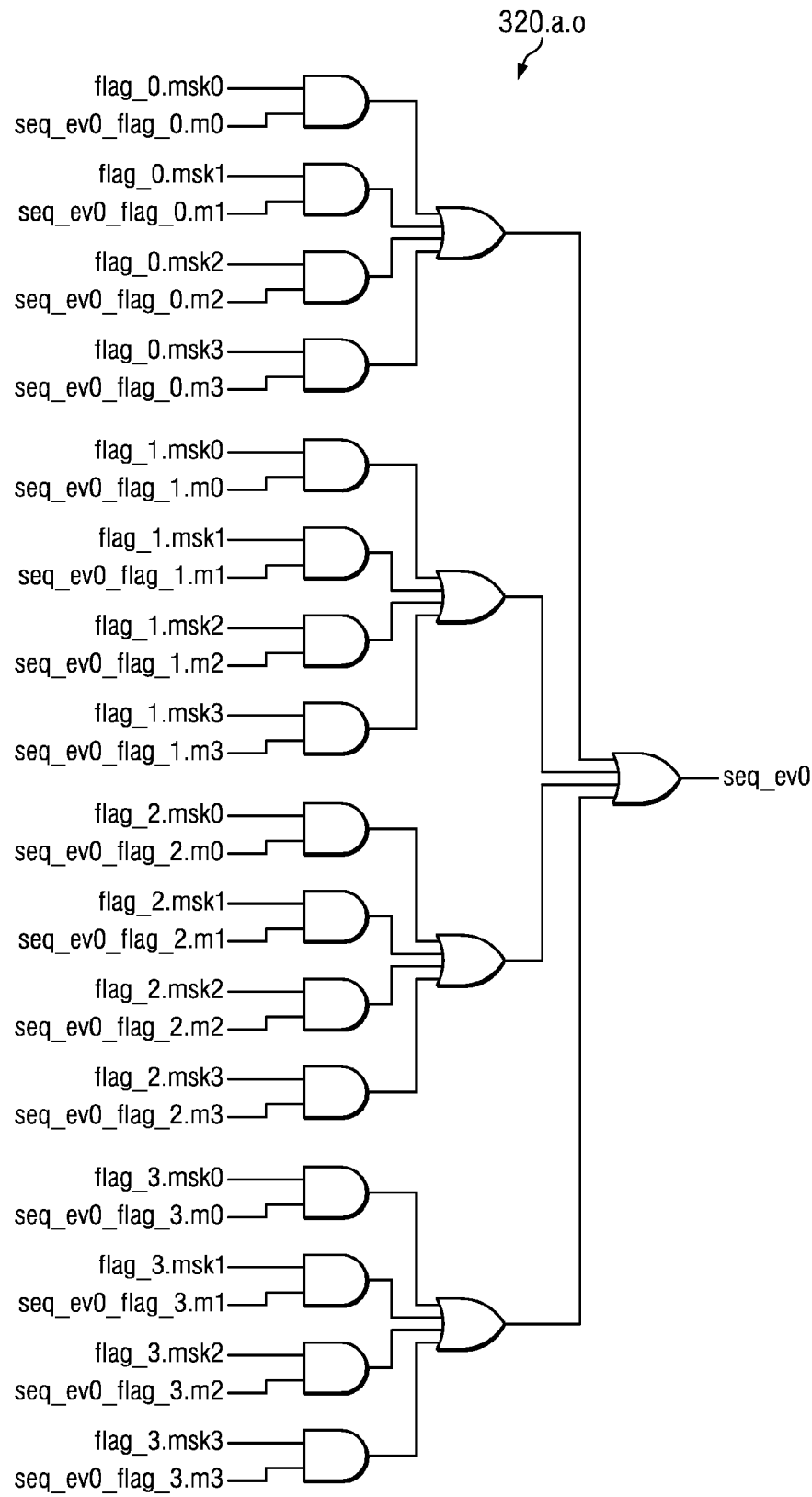
FIG. 21 is a schematic diagram of a logic circuit for combining trigger flags into a sequencer event for use in a merge block of the cross trace trigger unit of FIG. 20.

In FIG. 21 Merge block 320.a includes four sub-blocks typified by Merge sub-block 320.a.0. In Merge sub-block 320.a.0, sixteen match-related flags seq_ev0_flag_0-3.m0-3 are received and held in MERGE REGS from the trace capture qualifier blocks 310-314 of FIGS. 18-19. These match-related flags are ANDed with sixteen programmable or configurable selection mask bits flag_0-3.msk0-3 from registers MASK REGS in the cross trace trigger unit 320 and ORed to create Sequencer Events seq_ev0 in FIG. 21. This logic circuit of Merge sub-block 320.a.0 in FIG. 21 is replicated four times, for generating Sequencer Events seq_ev0-3. Note that the merge logic cross traces across multiple trace sources such as processors 100-103 in FIG. 17 and other Figures. Operations and circuitry of the merge block are pipelined for speed if necessary or desired. Other circuits for merging alternatively have logic programmable for any one, some or all combinations of Boolean ORs, ANDS and NOTs and can mask off any don't-care inputs.

Figure 21A:
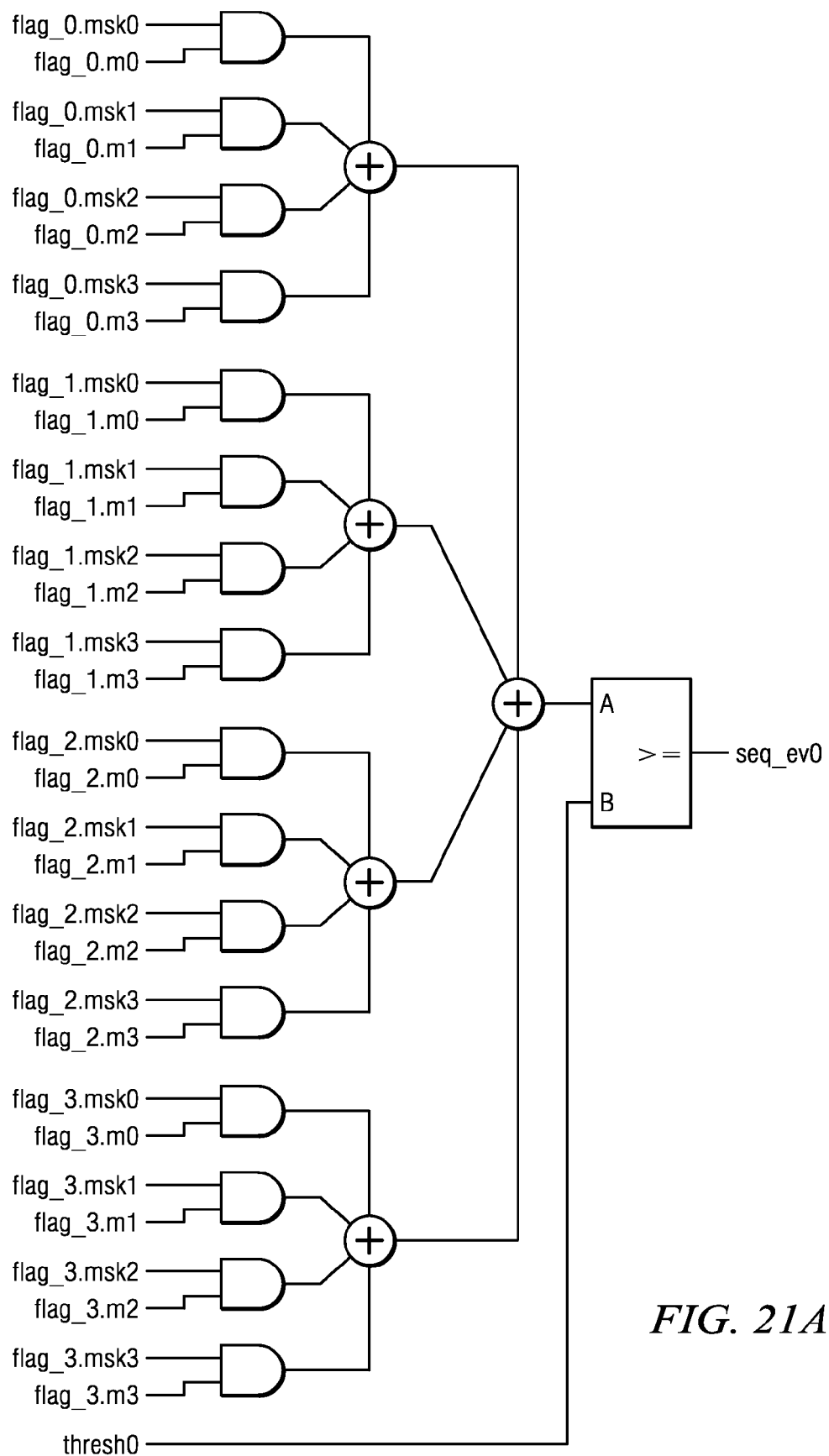
FIG. 21A is a schematic diagram of an alternative logic circuit for combining trigger flags into a sequencer event for use in a merge block of the cross trace trigger unit of FIG. 20.

In FIG. 21A, an example of a further form of circuitry is shown for use in either or both a merge sub-block 320.a of FIG. 20 and or Selector/Combiner/Sequencer 210.c of FIGS. 5 and 8. In FIG. 21A, inputs such as the flags from the trace capture qualifier block are ANDed with selection bits in the cross trace trigger unit and summed up and compared to a threshold. The logic in FIG. 21 is changed from a simple OR gate to an adder/comparator in FIG. 21A. This provides more flexibility in dealing with two or more of four processor type issues. Alternatively they could be just ANDed with selection bits and ORed to create Sequencer Events, see FIG. 21. The circuitry of FIG. 21A is pipelined for speed if necessary or desired. By using the sum of the selected flags and a threshold, the amount of matching can be varied. A threshold of 1 is equivalent to just ORing the masked flags together, while comparing the sum to a threshold allows the sequencer to respond to an occurrence of 2 or more trigger events. The circuitry of FIG. 21A is an example of a pattern recognition circuit having a neural network, with a neural network including a sum-threshold layer being depicted, and some further embodiments have one or more neural networks each including and using one or more such layers with either or both of weighted or unweighted sum-thresholds for either pre-configured or dynamically machine-learned detection responses. In this way, more complex patterns of processor activity across the spatial real estate of the chip as well as over clock cycles through time in the chip are monitored and detected by more powerful neural network circuitry in pattern recognition circuitry with sequencer included and applied for each particular processor as in FIGS. 5 and 8 and/or in FIG. 20.

Figures 22, 23:
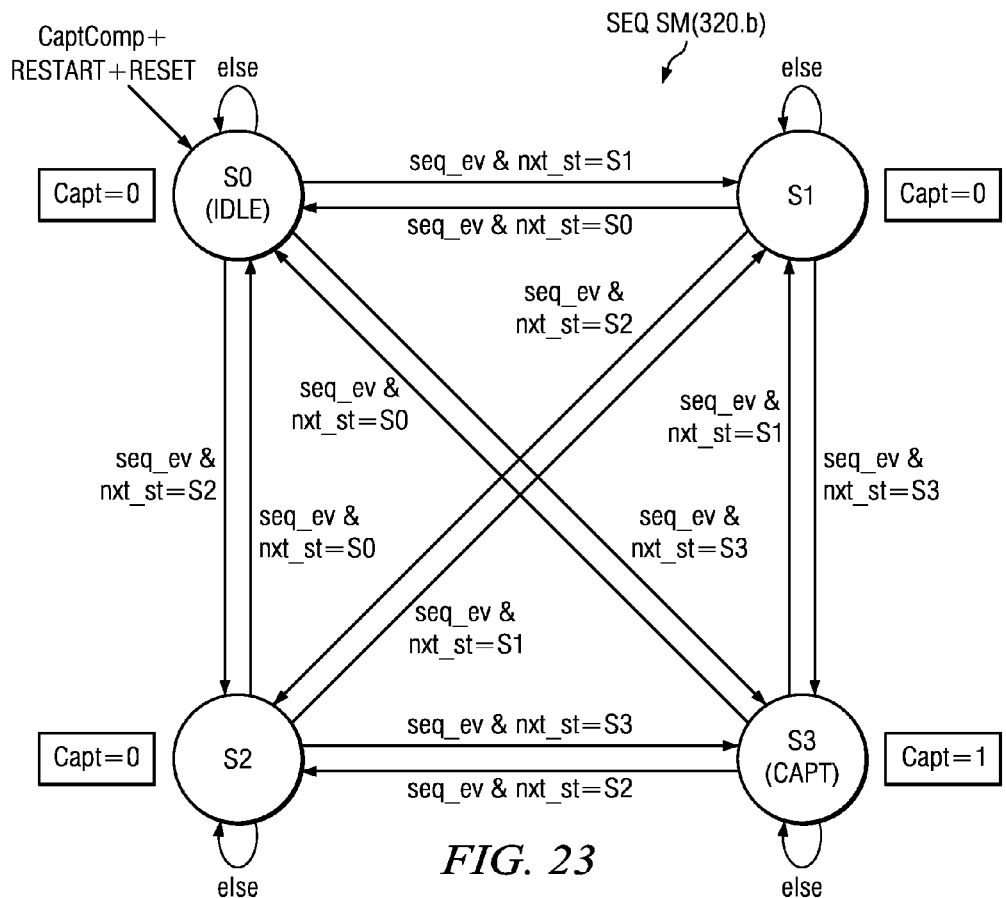
FIG. 22 is a block diagram of Merge Registers associated with sequencer events for use in the merge block of the cross trace trigger unit of FIG. 20.
FIG. 23 is a state transition diagram for a sequencer block of the cross trace trigger unit of FIG. 20.

In FIG. 22, four processor-related sets X of the match-related seq_evX_flagY_m0-3 flag bits have each set including 4×4=16 bits for the FIG. 20 merge logic 320.*a* and stored in four corresponding sets of registers in MERGE REGS. One register among Seq_Ev0-3_reg of FIG. 22 supports each sequencer event seq_ev_0-3 with different merging. This register complement of FIG. 22 supports the logic of FIG. 21, and has register (fields) Threshx to also support the sum-threshold circuitry of FIG. 21A, and provides full flexibility to trigger any event based on any flag input from any CPU 100-103 originated via the already-described triggering 210-213 herein and the latch synch circuitry in FIG. 19. Also, four sets of sixteen selection mask bits flag_0-3.msk0-3, each from MASK REGS, are provided to select any of two-to-the-sixteenth (2^16) selection functions. Sixty-four (64) mask bits for Seq_ev0,1,2,3_reg flag0,1,2,3_msk0,1,2,3 separately mask four (4) different ways using the 16 flags from Triggering Units 210-213 for supporting or generating the respective four (4) Sequencer event outputs of FIG. 20 Merge block 320.*a* and Sequencer SM 320.*b*. Note in FIGS. 21, 21A and 22 that four mask bits .msk0, .msk1, .msk2, .msk3 per flag are used for illustration, and any appropriate number of the mask bits are used.

In FIG. 22, to support the change in FIG. 21A relative to FIG. 21, the registers of FIG. 22 are changed to add a threshold parameter. The register set is augmented to contain the threshold value. This provides full flexibility to trigger any event based on any flag input from any of the processors 100-103 or from discrete inputs.

In FIG. 23, the sequencer 320.*b* has a sequencer state machine SEQ SM described by a state transition diagram. The sequencer state machine SEQ SM can move from any state S0, S1, S2, or S3 to any other said state. Let state S0 be the starting state. When state S3 is active the CAPT signal is asserted. States S1 and S2 are used to provide sophisticated or complex tracing capability. The sequencer 320.*b* can alternatively and feasibly employ a Capture-or-not logic mechanism SEQ LOGIC instead of the state machine SEQ SM in FIG. 23, or along with SEQ SM. The SEQ LOGIC is programmable for any of four logic conditions LOGIC0, 1, 2, 3 by programming logic registers with ordered sets of e.g., four registered values abcd in FIG. 24A for each of the events Seq_Ev0-3. Each bit in the four bits in each such value abcd can be any of 1, 0, or X (don't-care). SEQ LOGIC can be programmed to feed event states into the sequencer state machine SEQ SM. A transition back to the S0 state can be programmed to assert the REARM signal. Suppose one processor has met the triggering conditions and the sequencer state gets advanced to S1 or S2. If that state times out, and the sequencer returns to state S0, RESTART resets the original processors triggering logic, so that the triggering logic must re-trigger before the sequencer state can change again. RESTART, CaptComp or Reset can also force a transition to the state S0 and reset the logic directly.

As described for SEQ LOGIC, simultaneous events from different processors 100-103 are captured to activate capture signal CAPT. The sequencer 320.*b* state machine SEQ SM of FIG. 23 desirably provides extensive, programmable capability to detect and trigger on related processor actions and on processor interactions between processors 100-103. These actions and interactions are captured programmably and can be simultaneous or sequential or mixtures of both. State S0 operates as an IDLE state, and state S3 acts as a Capture state.

If transition conditions noted by arrows from state to state are Boolean inactive (e.g., zero) and thus not currently satisfied, operations remain in the current state, as indicated by the legend 'else' added to respective arcs from each state to itself. A given transition condition noted by a respective arrow from state to state is qualified when a respective particular sequence event occurs. The transition is activated and occurs along the arrow from the current state to a configured destination state nxt_st. The nxt_st configuration for SEQ SM is entered in registers SEQ REGS as described in FIG. 24 or FIG. 24A.

In FIG. 23, the sequencer state machine SEQ SM in the sequencer block 320.*b* of FIG. 20 provides the ability to perform complex trace sequence qualification for and across multiple processors, beyond the capability of a trigger sequencer for one processor. When debugging complex multi-processor systems, the sequencer allows a trigger event to queue another trigger event, and if that does not occur, the state of the triggering logic can return to the untriggered state.

An example of use of the sequencer of FIG. 23 is a video processing engine consisting of several processors. One processor is responsible for moving data into and out of the chip and the other processors are used to compress a portion of an image. The sequencer can be programmed to move to state S1 while any of the image processors are busy, and to state S3 if the data moving processor gets activated. This approach is used, for instance, to detect one processor trying to move image data, while another processor has not completed its portion of an algorithm in time, causing data corruption. If all of the image processors are done, the state returns to S0, so an activation of the data movement processor does not cause the state to advance to S3. If state S3 is reached, the trace data for the image processors may show an algorithm inefficiency, a data dependency, an unexpected interrupt, or other condition causing the problem.

Figure 23A:
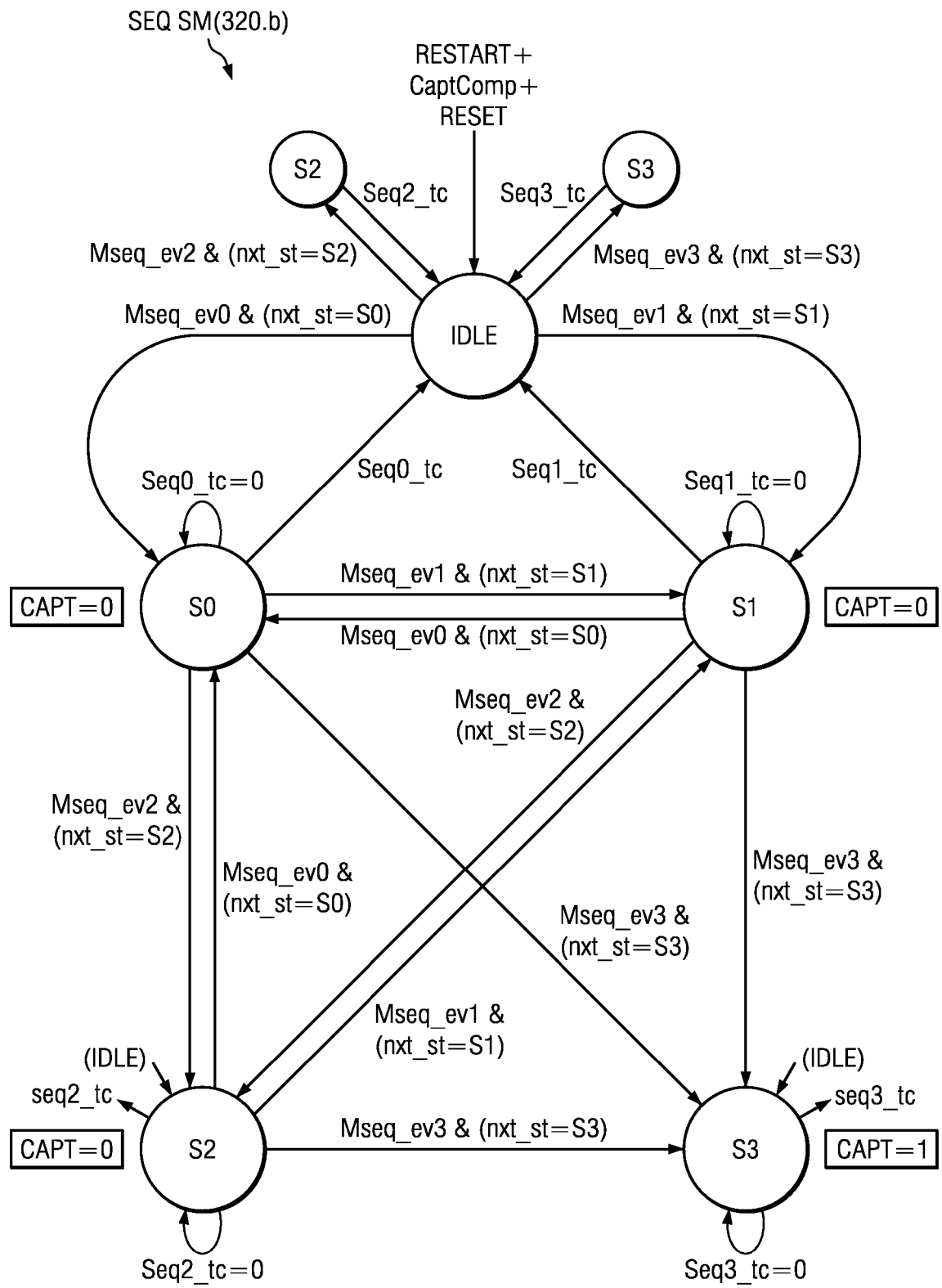
FIG. 23A is an alternative state transition diagram for a sequencer block of the cross trace trigger unit of FIG. 20.

In FIG. 23A, another embodiment of sequencer 320.*b* also has a sequencer state machine SEQ SM described by a state transition diagram. Compared to FIG. 23, an IDLE state is added, and SEQ SM is responsive to Reset, as well as to CaptComp or RESTART from Capture Control 320.*d*, to return to IDLE, and sequence events Seq_evx are multiplexed in FIG. 23B or FIG. 23C to produce multiplexed sequence events Mseq_evx.

In FIG. 23A, this embodiment of sequencer state machine SEQ SM can move from any state IDLE, S0, S1, S2, or S3 to one or more other said states in ways defined by the transition arrows. The IDLE state is the starting state. When state S3 is active the Capture signal is asserted (CAPT=1), and all other states IDLE, S0, 51 and S2, the Capture signal is de-asserted (inactive CAPT=0). States S0, S1, S2 and S3 are used to provide sophisticated or complex tracing capability. The sequencer 320.*b* state machine SEQ SM of FIG. 23A desirably provides further extensive, programmable capability to detect and trigger on related processor actions and on processor interactions between processors 100-103. These actions and interactions are captured programmably and can be simultaneous or sequential or mixtures of both. If transition conditions noted by arrows from state to state are Boolean inactive (e.g., zero) and thus not currently satisfied, operations remain in the current state as long as the Sequence Counter 320.*c* has not timed out, as indicated by the legend Seqx_tc=0 by respective arcs from each state to itself. A given transition condition noted by a respective arrow from state to state is qualified when a respective particular sequence event occurs. The transition is activated and occurs along the arrow from the current state IDLE or S0-S3 to a configured destination state nxt_st. The nxt_st configuration for SEQ SM is entered in registers SEQ REGS as described in FIG. 24 or FIG. 24A. When either the Sequence Counter 320.e has timed out for a given state, operations go from the given state to IDLE as indicated by the legend Seqx_tc by respective arrows to IDLE from any given state.

Dynamic determination of which processor activity to trace based on the sequencer event inputs seq_evx is also provided when necessary or desired. For instance, in a homogeneous array of processors, tasks may be assigned randomly depending on whether a processor is free or not. In such scenario, the processor of interest is the one which generates a trigger event on a dynamic basis and cannot be preassigned. Accordingly, circuitry for dynamic determination of which processor activity to trace based on the sequencer event inputs is also provided in that case.

Figure 23B:
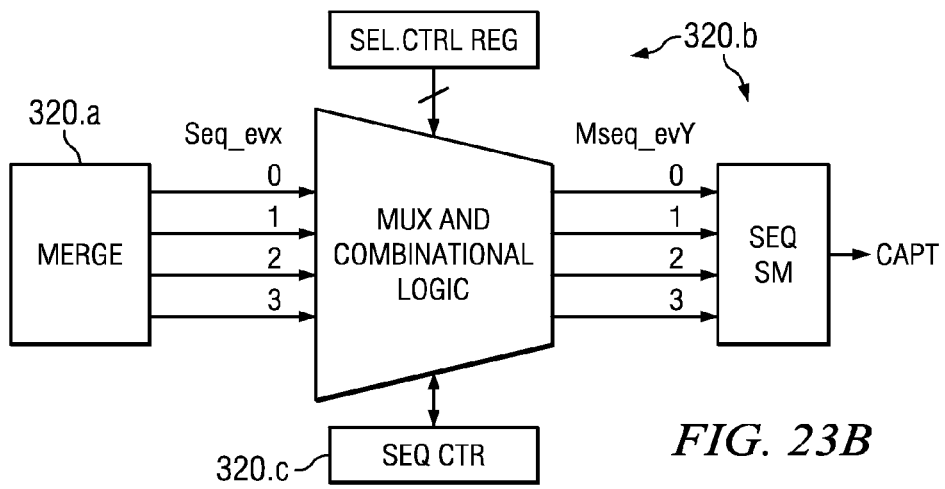
FIG. 23B is a block diagram of an alternative circuitry for use in the cross trace trigger unit of FIG. 20.

In FIG. 23A, a first example of operation of state machine SEQ SM is configured to start in IDLE and respond to a first event Seq_ev0, Seq_ev2, Seq_ev3, in any one of the processors 100, 102, 103 followed by an event Seq_ev1 in processor 101. In FIG. 23B, a Mux maps the processor 101 event Seq_ev1 to a Mux output Mseq_ev3 for use by state machine SEQ SM. Also, Mux maps first event Seq_ev0, Seq_ev2, Seq_ev3 for processors 100, 102, 103 to Mux outputs Mseq_ev0, Mseq_ev2, Mseq_ev1 for state machine SEQ SM. Then, regardless of which muxed event Mseq_ev0, Mseq_ev2, Mseq_ev1 goes active, the state machine SEQ SM goes from IDLE or S0-S2 to one of the intermediate states S0, S1, S2. Then if the processor 101 event occurs, Mux output Mseq_ev3 goes active and transitions from whichever state S0, S1 or S2 to the Capture state S3. However, suppose operations have reached one of the intermediate states S0, S1, S2 and no processor event occurs during a time period programmed for Seq Ctr 320.c. In that case, operations time out and go back to IDLE, whereupon the sequence monitoring continues anew.

Also, notice that in FIG. 23A some of the transition arrows are missing compared to FIG. 23. Configuring nxt_st values in the configuration registers of FIG. 24 or 24A can effectively eliminate or include or add various transition arrows in the state transition diagram. A transition arrow is eliminated by configuring the nxt_st value for a given state to be that same state itself, and a transition arrow is included or added by configuring the nxt_st value for a given state to be a different state to which the arrow is to point.

In FIGS. 23A and 23B, a second example of operation of state machine SEQ SM is configured to start in IDLE and respond to events in the exact order Seq_ev3, Seq_ev1, Seq_ev2, Seq_ev0, from the processors 103, 101, 102, 100. In FIG. 23B, the Mux maps the processor Seq_evX ordering X=3, 1, 2, 0 to Mux outputs Mseq_evY with Y=0, 1, 2, 3 for use by state machine SEQ SM. Also, FIG. 24A nxt_st entries are configured as follows for: S0—all S0 except S1 for Mseq_ev1; S1—all S1 except S2 for Mseq_ev2; S2—all S2 except S3 for Mseq_ev3. S3—all S3. Then when the processor 103, 101, 102, 100 events successively occur, Mux outputs Mseq_ev0, 1, 2, 3 successively go active and transitions go from IDLE to state S0, to S1, to S2, to S3 whereupon Capture signal CAPT=1 is asserted and output. However, suppose operations have reached one of the intermediate states S0, S1, S2 and no processor event conforming to the sequence occurs during a time period programmed for Seq Ctr 320.c. In that case, operations time out and go back to IDLE, whereupon the sequence monitoring continues anew.

In FIG. 23B, the sequencer 320.b embodiment includes Mux and Combinational Logic configured by a Selection Control Register SEL.CTRL.REG to map the processor events Seq_evX ordering X to Mux outputs Mseq_evY. Additionally, combinational logic processes the mapped processor events according to programmed combinational logic to detect concurrent processor events of particular interest and map any one of them to one or more outputs Mseq_evY instead. The combinational logic also is programmable to make an instance of sequencer counter SEQ CTR 320.c timeout itself constitute a sequence event or make such counter timeout also be qualified by a particular processor event Seq_EvX. In this way, event states Mseq_evY are fed into the sequencer state machine SEQ SM of sequencer 320.b so that successive states, repetitions of the same state or successive concurrences of different states are fed to and captured by state machine SEQ SM.

Figure 23C:
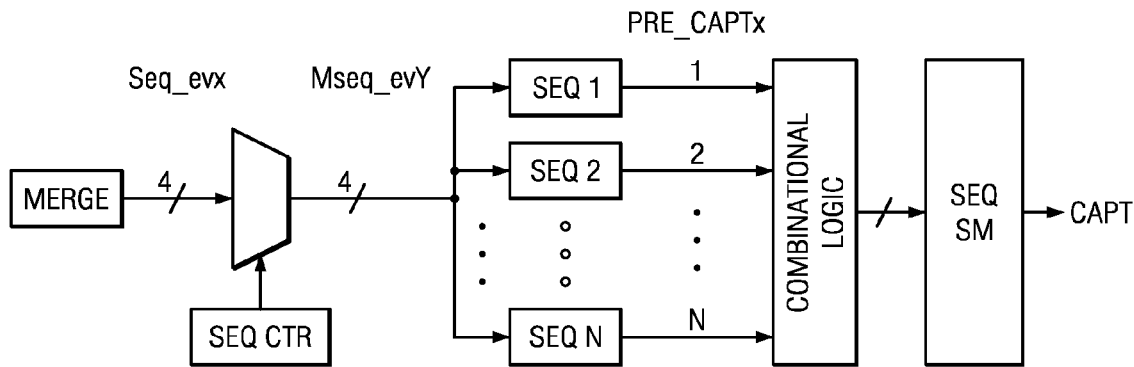
FIG. 23C is a block diagram of another alternative circuitry for use in the cross trace trigger unit of FIG. 20.

In FIG. 23C, a further alternative embodiment for sequencer 320.b has multiple individually-configurable sequencer state machines SEQ1, SEQ2, . . . SEAN, and each such state machine is like the sequencer state machine SEQ SM of FIG. 23 or 23A or similar The Capture state of each state machine SEQ1, SEQ2, . . . SEQN is designated PRE_CAPT1, PRE_CAPT2, . . . PRE_CAPTN. The inputs of the state machines SEQ1, SEQ2, . . . SEQN are respectively fed by Mux and Combination Logic as in FIG. 23B. Further in FIG. 23C, the PRE_CAPTx outputs of the state machines SEQ1, SEQ2, . . . SEQN are fed to additional output Combinational Logic to detect concurrent occurrences of different sequences of events that occur within a time window or otherwise related to each other. In some further embodiments, a further state machine SEQ SM monitors sequences in such concurrent occurrences and provides a Comprehensive Capture output CAPT to feed very complicated combinations and sequences of event states into the Capture Control sequencer state machine 320.d.

Figure 23D:
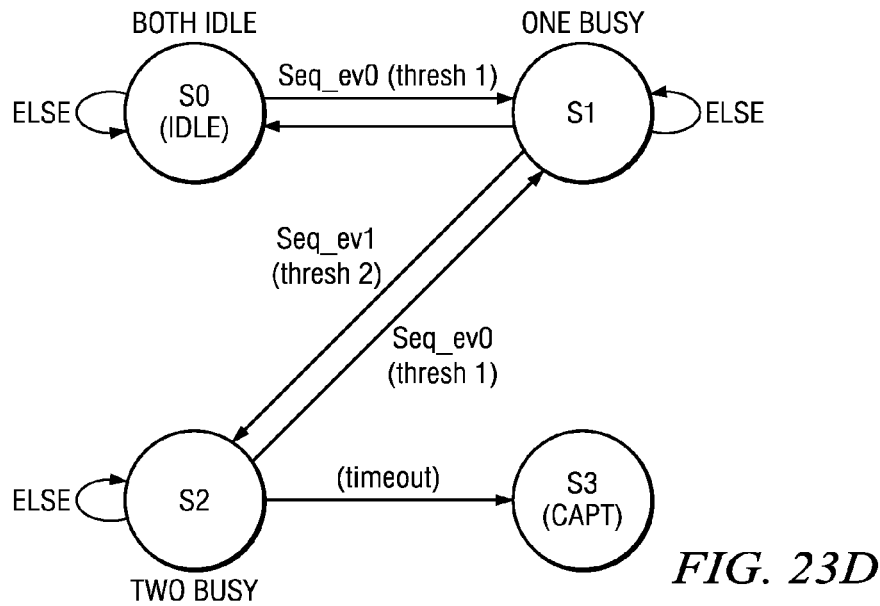
FIG. 23D shows a simplified version of FIG. 23 showing relevant states for detection of a two-processor deadlock scenario using a Simultaneous Activity mode.

FIG. 23D shows a simplified version of FIG. 23 showing relevant states for detection of a two-processor deadlock scenario using a Simultaneous Activity mode described later hereinbelow.

Figure 24:
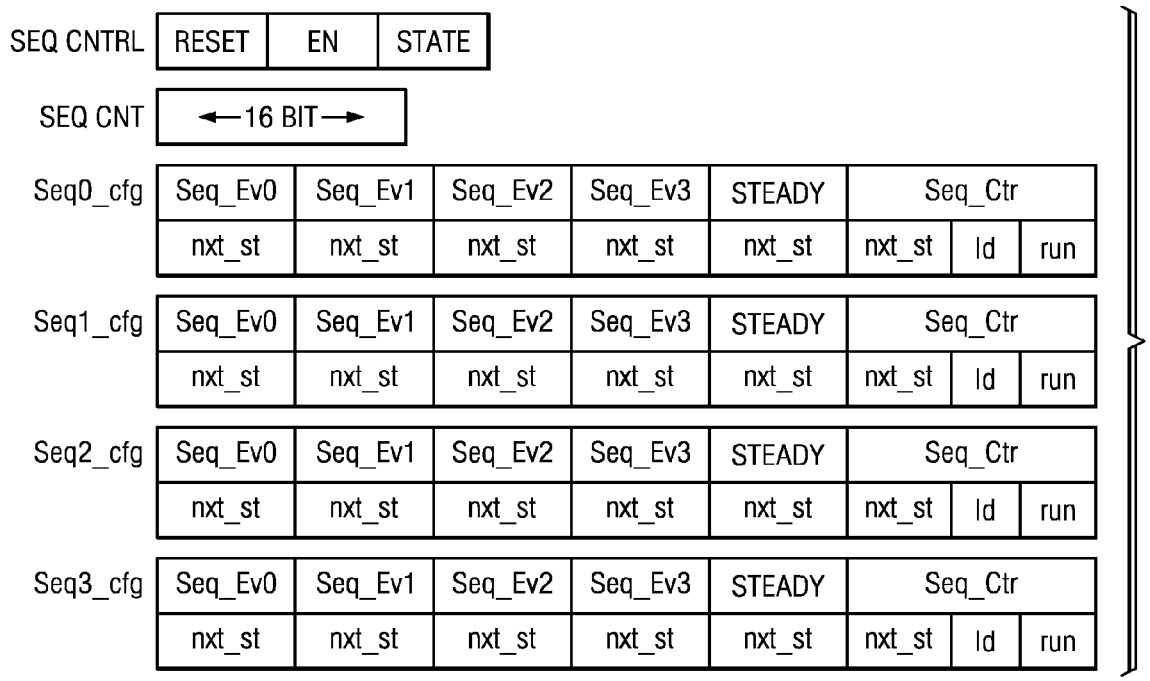
FIG. 24 is a block diagram of configuration and control registers SEQ REGS for the sequencer block of FIGS. 20, 23 and 23A.

In FIG. 24, a set of registers SEQ REGS for the sequencer 320.b in FIGS. 20, 23, 23A, 23B contains a control/status register Seq Cntrl for resetting, and enabling the sequencer 320.b and the ability to read the current state. The FIG. 24 register set SEQ REGS is replicated to the extent desired to support the plurality of state machines SEQ1, SEQ2, . . . SEQN in FIG. 23C.

In FIG. 24 SEQ REGS, a multi-bit sequence count register Seq Cnt is used to set the value in the Sequencer Counter 320.c of FIG. 20. Since the sequencer 320.b has four states S0-S3 in FIG. 23, there are four Seq_Cfg registers in FIG. 24, one for each state. For each state S0-S3, the next state nxt_st is or can be programmed in respective register fields for each of the sequencer events seq_ev0-3. Also, a Seq_Ctr timeout nxt_st register field specifies the next state when the Sequencer Counter 320.c expires.

Sequencer Counter 320.c is a loadable counter that is loaded with the Seq Ctr register SEQ CNT (count) value when SeqX_Cfg register subfield Ld is set active and the state corresponds to X. The Sequencer Counter 320.c is enabled when the SeqX_Cfg register subfield Run is set active and the state corresponds to X. The Sequencer Counter 320.c expires by reaching zero after down-counting from the pre-programmed sequence count value specified, programmed or configured in register SEQ CNT. When Sequencer Counter 320.c expires, it issues an active signal on the FIG. 20 line seq_tc to sequencer 320.b. (The counter could of course be an up-counter instead and arranged to expire when the count up equals the pre-programmed sequence count Ld in Seq_Ctr.) The Seqx_Cfg registers of FIG. 24 also contain control bits in register field Seq_Ctr for the Sequencer Counter 320.c to allow the value to be cleared and the Sequencer Counter 320.*c* to be enabled/run by an active enable/run signal on FIG. 20 line seq_run from an active Run bit in the Seq_Ctr field Run in FIG. 24. FIG. 23 provides a steady state arc ("else") for each state S0-S3. This allows the sequencer 320.*b* of FIGS. 20 and 23 to dwell in a state S0-S3, waiting for another event Seq_Evx, or to return to a different state S0-S3 if the Sequencer Counter 320.*c* reaches zero (seq_tc active).

Figure 24A:
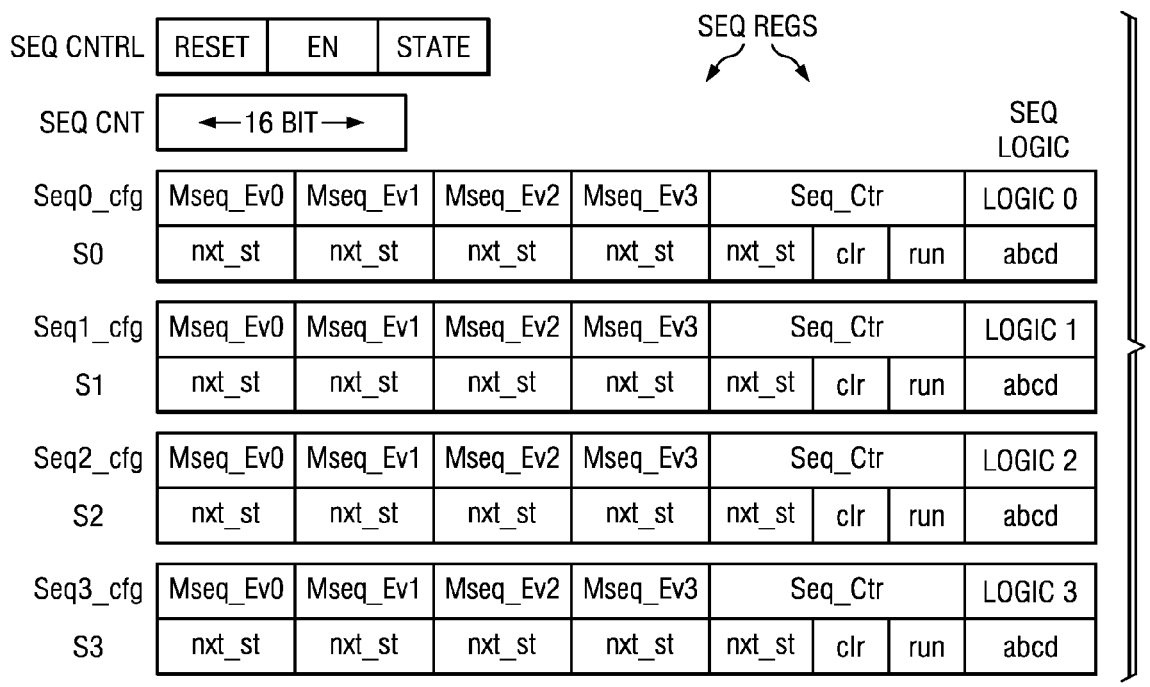
FIG. 24A is a block diagram of alternative configuration and control registers SEQ REGS for the sequencer block of FIGS. 20, 23, 23A, 23B and 23C.

In FIG. 24A, an alternative register set for SEQ REGS is described similarly to FIG. 24 and augmented further. SEQ REGS of FIG. 24A further provides configuration bits values "abcd" for different registers to program the mux mapping and Boolean logic operation of Mux and Combinational Logic of FIG. 23B and FIG. 23C. For example, the number of bits to control mapping of N bits for Seq_evX is $\log_2(N!)$, e.g. 5 bits to map four inputs to four outputs Mseq_evY. Various combinational logic functions are selected under control of additional configuration register bits to process the input lines and/or output lines of a Mux and Combinational Logic unit of FIG. 23B or FIG. 23C. Seq_Ctr field of FIG. 24 is augmented with a subfield called Clear clr in FIG. 24A.

Figure 25:
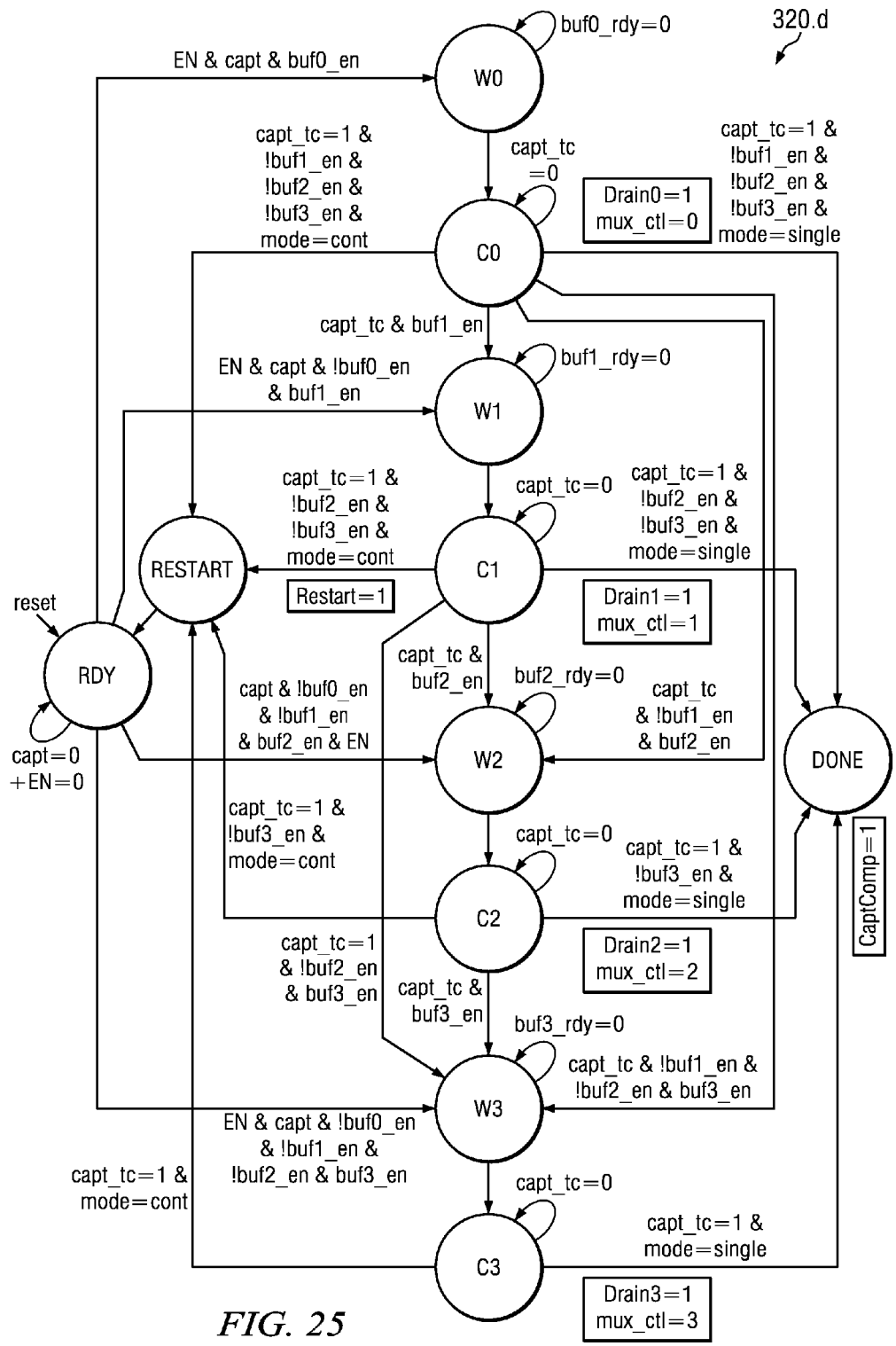
FIG. 25 is a state transition diagram of a capture control block of the cross trace trigger unit of FIG. 20.

In FIG. 25, in a state transition diagram for Capture Control state machine 320.*d*, the Capture Control state machine 320.*d* selects the data to output, based on the capture control registers CAPT REGS of FIGS. 26 and 20. For this state machine 320.*d* of FIG. 25, the four processors 100-103 provide four trace sources, for example. Correspondingly, the number of states for this state machine 320.*d* is suitably established as S=2*N+3, e.g., S=11 states including N=4 capture states C0-C3 for the number N of trace sources, plus an equal number N of wait states W0-W3 for the number of N trace sources to wait for each buffer ready signal bufx_rdy, plus an initial ready state RDY state plus a Done state plus a RESTART state. A mode of operations is configured in FIG. 26 as single capture (Mode=single) or continuous capture (Mode=cont). In Mode=single the state machine 320.*d* starts in the RDY state and ends in the Done state, and then returns to RDY upon being specifically re-initialized by software or RESET active in FIG. 26A register Capt Cntrl. In Mode=cont, state machine 320.*d* returns from the Done state to the RDY state via RESTART automatically.

When the CAPT signal is asserted from the sequencer SEQ 320.*b* of FIGS. 20 and 23, and given that the master enable EN is active in register Capt Cntrl of FIG. 26 or 26A, the Capture Control state machine 320.*d* in FIG. 25 goes from RDY state to the lowest x-numbered enabled (Bufx_En=1) wait state Wx among states W0 through W3, as indicated by the lowest active x-numbered FIG. 26 register entry bufx_en=1. The state machine 320.*d* waits for the bufx_rdy signal to indicate the post-counted capture of trace data is complete. State machine 320.*d* then advances to the correspondingly-numbered capture state among states C0 through C3. Each state Cx activates its respective output DRAINx to the corresponding FIG. 16 Circular Buffer 23*x*, activates the Capture Counter 320.*e* by supplying a signal captx_en to the capt_en line of FIG. 20, and supplies a respective multiplexer control mux_ctl=0, 1, 2, or 3 to Trace Combiner 300. When the FIG. 26-*specified* number CaptCntx of samples for that state Cx have been output by the corresponding FIG. 16 Circular Buffer 23*x*, the Capture Control state machine 320.*d* of FIG. 25 advances to the next higher-numbered enabled wait state Wy. The just-described operations continue until all samples have been transferred from the pertinent circular buffers 23*y* to Trace Combiner 300, with mux_ctl appropriately controlling the mux selections and function of Trace Combiner 300. If the bufx_en signal for any of the processors is 0, the data from that processor is not collected. Then the Capture Control state machine 320.*d* goes to Done state and outputs a Capt-Comp active signal if the capture mode is Mode=single in the FIG. 26 Mode field. If the capture mode is continuous (Mode=cont), state machine 320.*d* goes to the RESTART state to reset all of the trigger sources to get ready for the next occurrence of the trigger sequence, then it returns to the RDY state and waits for the next qualified trigger sequence. This programmability specifically captures the data of interest and transfers that data using Cross Trace Trigger 320 of FIG. 18 to Trace Combiner 300. Trace sources of no interest are thus skipped, and moreover, irrelevant trace combinations and trace sequences of no interest are also skipped. In some embodiments, trace tags are provided in the ID field of the Sequencer 320.*b* state machine registers of FIG. 24 (24A). The trace tags can be time stamps from Trace Combiner 300 or identifications otherwise assigned by the in-circuit emulator or using position information from the Circular Buffers 230-233. In some embodiments, a trace-tag or time sync tag is issued in response to the Capture Control 320.*d* state machine returning to the RDY state or reaching the DONE state. The process begins anew in subsequent tracing.

In FIG. 25, operations of Capture Control state machine 320.*d* in FIG. 20 sequentially drain the pertinent data of circular buffers 230-233 of FIGS. 16 and 17 that are applicable to the events captured or identified by sequencer 320.*b*. In other words, this state machine 320.*d* is primarily an output controller to unload the pertinent circular buffers 23*x* one-by-one via the Trace Combiner 300 of FIG. 18 into the FIG. 17 On Chip Trace Buffer 400 and/or Trace Export Unit 500 for export via trace pins 550 to Trace Receiver 600.

In FIG. 25, Capture Control state machine 320.*d* is in the RDY state as operations commence or begin again. When CAPT becomes active from Sequencer 320.*b*, the lowest numbered enabled circular buffer 23*x* (as indicated by FIG. 26 register field bufx_en active) transitions the state machine 320.*d* from RDY to the correspondingly numbered state Wx among wait states W0, W1, W2 and W3 and then to the corresponding state Cx among states C0, C1, C2 and C3. The role of the various outbound-arrow legends (e.g., EN & CAPT & !buf0_en & buf1_en) is to verify not only that capture has occurred but also that a given circular buffer 23*x* is enabled (in the sense that state machine 320.*d* will access it) and all lower numbered buffers are not enabled (the symbol "!" stands for Boolean NOT). Bufx_rdy in turn responds to the signals wr_done from circular buffers 23*x* of FIG. 16. For example, in FIGS. 26 and 26A, the register bits buf0-3_en are configuration bits corresponding to each circular buffer 230-233. Buffer 230-233 outputs buf0-3_rdy are bits or signals activated upon completion of post-counting in FIG. 16 that acknowledge the HOLD/STOP control from FIG. 20 Sequencer 320.*b*.

In FIG. 25, when a given Capture state C0, C1, C2 or C3 is reached, the Capture Control state machine 320.*d* outputs a state Cx-specific drain command DRAINx from FIGS. 20, 25 to its corresponding circular buffer 23*x* in FIG. 16. Buffer data BUF DATA streams out of FIG. 16 RAM 23*x*.*f* to the FIG. 18 Trace Combiner 300 and is muxed by Trace Combiner mux under x-valued control signal mux_ctl=x that is concurrently supplied from state machine state Cx. The Trace Combiner 300 multiplexing circuit has a trace output and responds to the Capture Control state machine 320.*d* to sequentially couple the applicable circular buffers 23*x* to the trace output in coordination with the sequential draining of those circular buffers 23*x*. In the meantime, state machine 320.*d* state Cx of FIG. 25 activates enable line capt_en in FIG. 20 and enables Capture Counter CaptCtr 320.*e*. Thus, in this meantime, Capture Counter 320.*e* is counting down from the applicable CaptCntx value until counter terminal count signal capt_tc goes active (counter is zero). As described in connection with FIGS. 26 and 26A, Capture Control state machine 320.d can drain a selected buffer sequence of selected ones of fewer than all the circular buffers 23x and sequentially drain a first configurable amount of data from a first such circular buffer and then a second configurable amount of data from a second such circular buffer.

In FIG. 25, the state machine 320.d then responds to the counter terminal count signal capt_tc and goes via a transition arrow to the next higher-x-numbered state Wx for which a FIG. 26 buffer enable bufx_en is active. This process is continued in the same manner until all circular buffers 23x applicable to the cross-trace are drained. When the last, highest-numbered, applicable circular buffer 23x has been drained, then a transition is made from the corresponding last-applicable state machine state Cx to the RESTART or DONE completion state, depending on whether Mode=cont or Mode=single respectively State machine 320.d in the state DONE outputs the CaptComp signal of FIGS. 25 and 20 to sequencer SEQ 320.b in FIGS. 20, 23, and 23A. The Restart signal is issued as part of the automatic transition to the RDY state via the RESTART state from last-applicable state machine state Cx in continuous mode (Mode=cont). In general, software initialization or hardware initialization that sets RESET active in FIG. 26 or 26A thereby resets all the logic in the circuitry directly, see FIGS. 8, 23, 23A, 25. This reset operation also means that when state machine 320.d is in the DONE state in Single mode, setting RESET active returns operations from the DONE state directly to the RDY state.

In FIG. 26, Capture Control registers Capt Cntrl facilitate output from each of the trace sources using bit lines Bufx_en. The full or empty status of each circular buffer 23x in FIG. 16 can be read back on the Bufx_rdy signals from FIGS. 18-19 Trace Capture Qualifiers 310-313 and Circular Buffers 231-233. Capture Control registers Capt Cntrl of FIG. 26 have a RESET field that programmably resets the FIG. 25 state machine 320.d to RDY state and an enable field EN that enables the Capture Control state machine 320.d. Reading a STATE field in Capture Control registers Capt Cntrl provides the current state machine state RDY, W0-W3, C0-C3, RESTART or DONE. Each of the trace sources has a separate count value register, Capt Cnt0-3 with values Read_Count0-3 to separately load the FIG. 20 Capture Counter Capt Ctr 320.e and send Read_Countx to circular buffers 23x. The number of CaptCnt registers corresponds to and varies with the provided number of trace sources, as do the enables Bufx_en and ready statuses Bufx_rdy in the Capt Cntrl register. The CaptCntx register fields specify the number of trace words to output for each trace source 23x. Individual counts CaptCnt0-3 are programmable to allow the Cross Trace unit 330 to capture more or less data from each trace source, i.e. source-specifically, depending upon the amount of information the user wants to capture. Alternatively, a single CaptCnt register is used to support access to each trace source and capture a non-source-specific amount of data from each trace source, such that each amount is equal or the same.

In FIG. 26A, a register array of post counts and offsets are added, compared to the registers of FIG. 26. Each respective post count register Post Cnt0-3 determines how many samples to capture from FIG. 16 Circular Buffers 230-233 to the On Chip Trace Buffer 400 (e.g., FIG. 17) after the trigger event. Each respective Offset register Offset0-3 determines how many samples to extract from FIG. 16 Circular Buffers 230-233 before the trigger event. Register fields buf0-3 of FIG. 26A include the register fields bufx_en and bufx_rdy of FIG. 26.

A programmable/configurable MODE register is coupled to a mode decoder and configuration circuit block in FIG. 26A. The mode decoder and configuration circuit block is suitably provided in some embodiments to respond to a given MODE identifier in the MODE register and deliver decoded outputs and configuration values to any one, some or all of the registers in FIGS. 6, 7, 9, 22, 24, 24A, 26, 26A and 26B to implement various modes as discussed further herein.

Figure 26B:
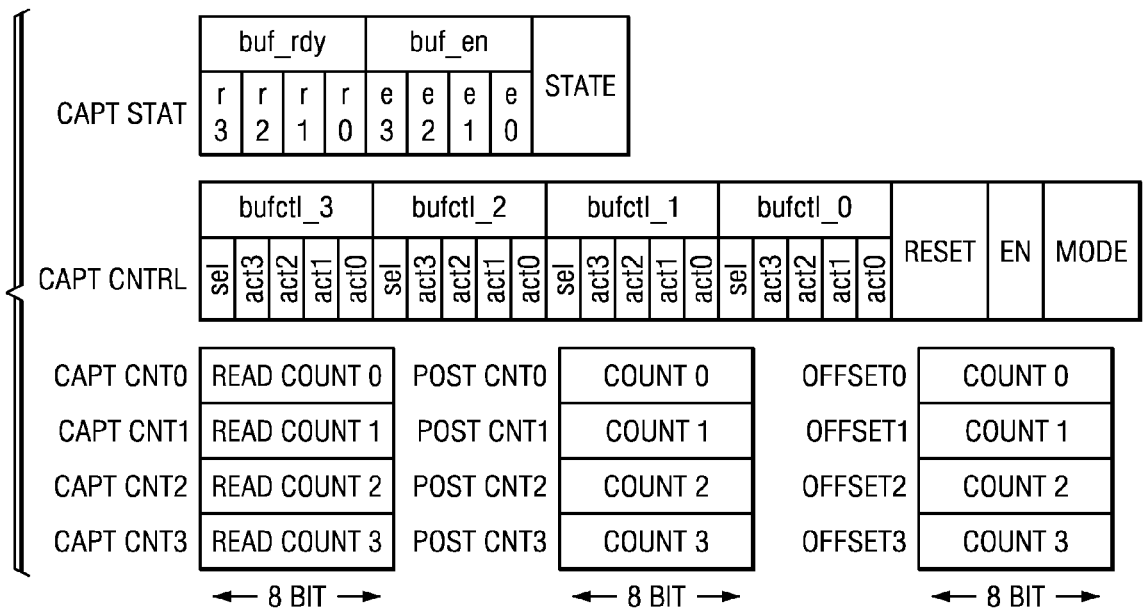
FIG. 26B is a block diagram of further alternative registers for the capture control block of FIGS. 20 and 25.

In FIG. 26B, the description of FIGS. 26 and 26A applies to the extent of correspondence to FIG. 26B. In addition, the trace source (buffer 23x) selection has been augmented. Instead of just enabling a trace source 23x, the Bufx_en can be qualified. Each buffer control register field bufctl_x has a select Sel field which statically selects the buffer for draining as does bufx_en of FIG. 26 hereinbefore. Moreover in FIG. 26B, each buffer control register field bufctl_x has also four (4) .actY control signals which can qualify a trace source for data capture. The Bufx_rdy, Bufx_en and state machine status values are diagrammatically moved to and situated in a separate read only Capture Status register, CaptStat.

Figure 26C:
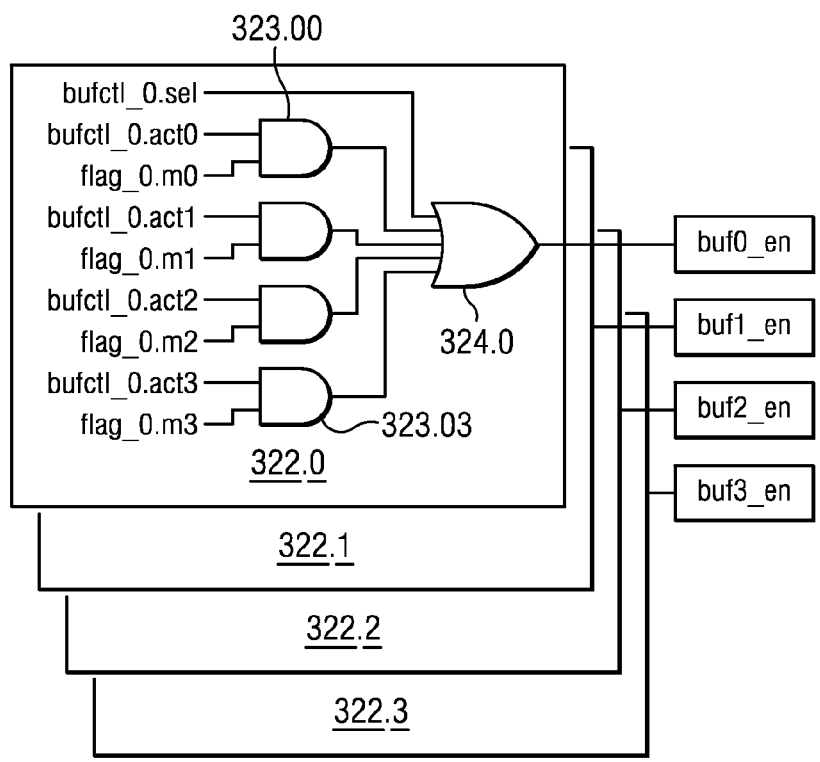
FIG. 26C is a schematic diagram of logic circuits to support the further alternative registers of FIG. 26B.

In FIG. 26B, the Bufx_en signal for each buffer is generated by logic of FIG. 26C to enable Bufx_en for draining (bufctl_x_Sel=1) when capture occurs or to conditionally enable it (bufctl_x.actY=1). When conditionally enabled, the buffer 23x corresponding to the trace source will only be drained on the condition if the FIG. 8 Triggering Unit state machine 215.x for processor 10x is in any one of the bufctl_x_actY specified trigger states TY. This conditional enablement is illustrated in FIG. 26C and expressed by Equation (1) using an OR $$\left(\bigcup_Y\right)$$

over ANDS (&):

$$\text{Bufx\_en} = \bigcup_Y (flagX.mY \ \& \ \text{bufctl\_x\_actY}). \tag{1}$$

In FIG. 26C, logic 322.x (322.0-.3) generates the Bufx_en signal. Each unit of the logic is a replica of logic 322.0, shown in detail. OR-gate 324.x passes an active Bufctl_x_Sel signal, which activates Bufx_en by static configuration using Bufctl_x_Sel. OR-gate 324.0 also receives inputs from four AND-gates 323.00-323.03. Each AND gate 323.XY has a first input for bufctl_X.actY and a second input for flag_X.mY. For dynamic or conditional enable of Bufx_en by the flags flag_X.mY, then Bufctl_x_Sel is made inactive and bufctl_X.actY are configured or set active, for example, instead.

Note that each bufX_en is a register bit in a flip-flop that stays set once it is set. BufX_en becomes set if a flag_X.mY contributes to some pertinent sequence in SEQ 320.b at any time instance along the way. The FIG. 26B/26C logic circuit dynamically selects only the circular buffers X for those CPUs 10X of interest to drain when bufctl_X.actY are set active.

In a periodic sampling mode situation described later hereinbelow, the bufctlX.s bit is set for all those CPUs of interest. When the trigger 215.x and Sequencer SEQ 320.b events occur such that data will be drained, that data is then drained from every selected CPU 10x corresponding to which the bufctlX.s bit is set.

In scenario for a simultaneous activity mode also described later hereinbelow, four (4) CPUs are running and any two of them may be competing for the same resources, the analyst or software specifies the pertinent trigger states (flagX.mY) by setting correspondingly X,Y numbered bufctlX.actY, that will allow data to be drained. This way when a deadlock situation occurs, say between processor 101 and processor 102, only their buffers 231 and 232 are drained, and buffers 230 and 233 processor 100 and processor 103 are not drained. The circuitry to control BufX_en bits is provided and arranged so that the BufX_en bits go on and off if SEQ SM encounters a trigger sequence that only approaches and does not include the final capture event and then goes back to state S0 without reaching capture state S3. In this way, such circuitry is prevented from getting or accumulating a lot of irrelevant bufX_en that could occur in some uncompleted trace scenarios playing out in the multi-processor system.

This prevention becomes ever more important as integrated circuit chips and systems with larger and larger numbers of processor cores become increasingly pervasive in the global market. Preventing accumulation of irrelevant bufX_en can thereby substantially increase the debug and tracing value and efficiency of the circuitry in systems with larger numbers of processor cores not only for systems, and systems-on-chip (SoC), with a few more than two cores, but also for contemplated systems with 16, 64 or hundreds or more processor cores.

For instance, in a potential processor deadlock monitoring sequence, suppose a first processor 101 grabs both resources R1 and R2 and a second processor 102 requests a resource, then deadlock might happen if sequencer counter 320.c timeout occurs after a predetermined time interval and SEQ SM state S3 would be reached. In that case, the one-bits in bufX_en due to flags that went active during that sequence would remain latched in bufX_en for use by capture state machine 320.d to drain the circular buffers 23X corresponding to active bufX_en bits. But if the first processor 101 instead releases the resources in time (i.e., before timeout), the second processor 102 would be able to complete its task without a deadlock situation arising and state machine SEQ SM would return to state S0. Accordingly, the BufX_en bits are automatically reset (off) because no deadlock has occurred at the moment.

As noted, the circuitry in some embodiments is arranged so that the BufX_en bits go on and off if the trigger sequence only approaches and does not reach the final capture event and then goes back to state S0. In that case, the one-bits in bufX_en due to flags that went active during an incomplete sequence are reset to zero in bufX_en upon the SEQ SM going back to state S0. The flagX_mY signals are active when a FIG. 8 Triggering state machines 215.X are in a given state TY, so if they change state, the flags can get de-asserted automatically and memorylessly. The trace capture qualifiers 31x register the match signals in order for them to cross clock domains, but these registers 310.a (FIG. 19) just introduce some latency, but basically follow their input matchY signals to output the flagX_mY signals. So the FIG. 26C logic 322.X inherently has, or can be readily made to have, this behavior to make bufX_en go on and off if the trigger sequence in sequencer SEQ 320.b approaches the final capture event but state S3 is not reached and the SEQ SM instead then goes back to state S0. Compared to the AND logic in the merge unit 320.a of FIGS. 20, 21 21A, sixteen (16) bufctl_X.actY bits are present in the bufX_en logic 322.x of FIG. 26B. Sixty-four (i.e., 4×16=64) mask bits Seq_ev0-3_flag_X_mskY support four Seq_ev0-3, sixteen (16) of the mask bits to support each of the four Seq_EvX from the merge unit 320.a of FIG. 20.

Four (4) flags per processor 10x are provided in FIG. 8 for a total of sixteen (16) flags to support four processors 100-103 in this example. There are 64 mask bits, but the same 16 flags are used together with each of the four sets of 16 mask bits per event. The programmability lets each Seq_Ev be activated by different combinations of trigger states T0-T3 in FIG. 8. In some embodiments, circuit optimization can reuse some of the AND-gates from the merge/mask circuitry 320.a in FIG. 21A for AND-gates 323 in the bufX_en circuitry of FIG. 26C. Some other embodiments have separate sets of gates in FIG. 21A and in FIG. 26C.

Four logic circuits 322.0-3 are provided in FIG. 26C, controlled by the 5-bit bufctlX fields of the capture control register CaptCntrl. The output of each of the four AND/OR gates is a single bit called bufX_en (e.g., four total). Note by way of comparison that the registers of FIG. 26 or 26A have four (4) programmable static register bits called BufX_en in the CaptCntrl register. In FIGS. 26B and 26C, the logic circuits 322.0-3 are added and used in combination with the registers of FIG. 26B, thereby providing or generating the four (4) register bits BufX_en in the CaptCntrl register thus to be dynamically programmable based on processor 10X operations on the fly. The FIG. 26B CaptStat register is provided with bits BufX_en and allows these BufX_en bits to be read back as well.

The FIG. 26C logic 322.0-3 provides the cross trace unit 330 the ability to respond to bufctlX.s to either drain any statically selected buffer 23X, or instead to use bufctl_X.actY to respond dynamically to Triggering units 21X to drain only those buffers 23X corresponding to particular Triggering units 21X that have reached one of the programmed trigger states in response to operations of processors 10X. The bufctlX.actY bits are set up or configured ahead of time, but the logic circuits 322.0-3 provide dynamic control of the buffer draining, by only activating particular BufX_en signals if the operations of particular processors 10X interestingly put their corresponding Triggering units 21X in the selected Trigger states.

In a debug process, suppose the debug analyst is still uncertain whether other processors 10X may be contributing to a given problem. In that case, the debug analyst conveniently sets the bufctlX.s bits for all the processors 10X for X=0, 1, 2, . . . N and this captures all of the data pertaining to the problematic event to sort through for subsequent debug analysis or scrutiny. This is a further useful feature of the bufctlX.s bits in register CaptCntrl.

The exact number and order of sequence events Seq_ev0-3 is less relevant for the most part to determining which bufX_en signals should be enabled although useful in some versions. However, when the sequencer state machine 320.b reaches capture state S3 in FIG. 23 or 23A, the logic 322.X operates to latch the bufX_en active signals resulting from flags that contributed to the sequence that reached state S3. Draining the circular buffers 23X corresponding to those bufX_en active signals provides a snapshot of all those processors 10X that interacted to reach the capture state S3 and generate CAPT active.

Figure 26D:
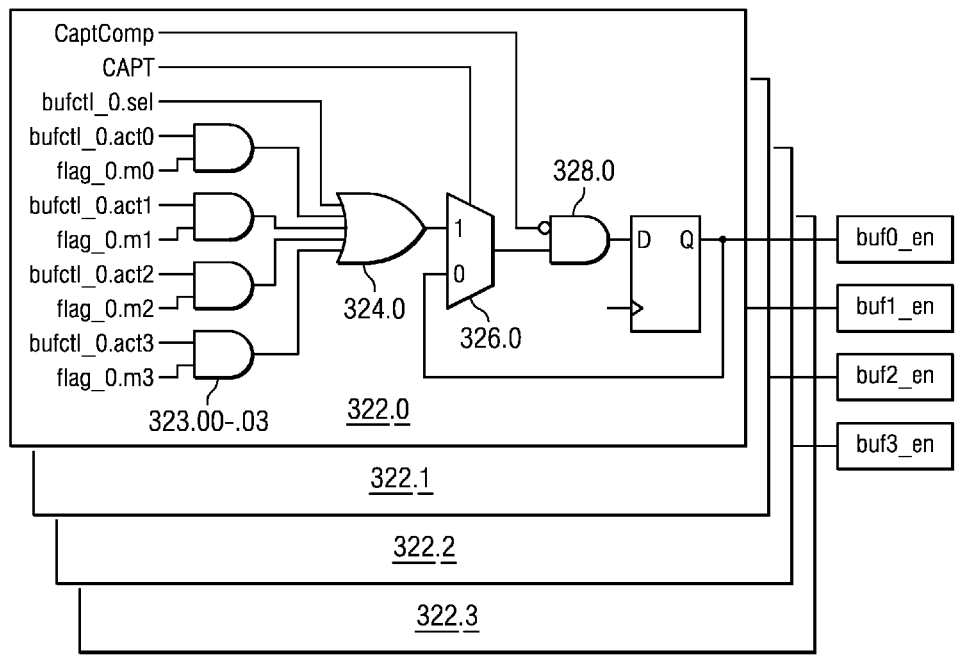
FIG. 26D is a schematic diagram of augmented logic circuits to support the further alternative registers of FIG. 26B.

In some embodiments, a single mode bit (call it ACT) is coupled to logic analogous to that of FIG. 26C, and sets all sixteen Bufctl_X.actY bits active. Sometimes a processor CPU 10X participates in the pertinent trigger sequence, but the trace data is not of interest for particular debug or trace purposes. In such case, the BufctlX.actY bits Y=0,1,2,3 for that particular processor 10X are set to zero individually by configuration. In FIG. 26D, alternative logic is provided for circuits 322.x that latches the buffer enable value in a D-latch for bufX_en when capture signal CAPT occurs. Subsequently, the logic responds to capture completion CaptComp and clears that D-latch for bufX_en after the buffers 23x have been drained. Compared to FIG. 26C, this logic of FIG. 26D provides and uses a mux 326.0 to isolate flag behavior from affecting the state of bufX_en until capture signal CAPT goes active. The FIG. 26D circuitry beneficially focuses bufX_en activity on flags that are active when FIG. 20 SEQ 320.*b* reaches capture state S3, and not flags that were involved in irrelevant earlier uncompleted sequences. When capture signal CAPT goes active at the selection input of mux 326.0, the output of OR-gate 324.0 is coupled by mux 326.0 to a first input of an AND-gate 328.0 that is qualified by CaptComp inactive at a second input while capture completion in capture SM 320.*d* remains pending. The output of OR-gate 324.0 thereupon passes through AND-gate 328.0 and is latched into the D-latch bufX_en that supports the register bit bufX_en. Upon capture completion CaptComp goes active and disqualifies AND-gate 328.0, resetting the D-latch for buf0_en. Moreover, CAPT also goes inactive and controls mux 326.0 to keep the output of AND-gate 328.0 low and maintain buf0_en reset low.

Transient conditions can come and go that involve a first processor 10*x* and its Triggering unit 21*x* reaching and leaving a trigger state TY. Such condition can cause a non-returning Seq_evY in Merge Unit 320.*a* (i.e., Seq_evY going from inactive to active and then back to inactive instead of staying active or returning to active). The temporarily-active Seq_evY is desirably sufficient to transition SEQ SM, and can be followed by some other event due to some other processor to go to the capture state S3, while the first processor 10*x* has already exited from its trigger state. Seq_evY going back to inactive might leave nothing for the bufctlX.actY register bits to enable, and thus not indicate that buffer 23*x* for processor 10*x* should be drained. Alternative implementations may include sticky control bits which will remember any processor involved in the sequence of events leading up to the capture of trace data. If a REARM signal is asserted, those sticky bits would be reset.

But for some scenarios, like debugging processors deadlocking over resources, the processors 10X are basically hung in their states waiting forever, so the flagX.mY signals do not get de-asserted. Other scenarios might have a more transient trigger sequence, and in using some embodiments, the debug analyst can just set the bufctl_X_Sel signal of all processors 10X that might be involved, and then capture all the trace data and sort through it. Also, more selective methods and embodiments can be applied as described further to handle transient conditions. To handle a transient condition, one approach simply revises the FIG. 9 configuration of Triggering SM circuitry 215.*x* such that if FIG. 8 State T1 is active, then instead of returning to no-trigger state NT when the trigger condition is negated, return to state T0 instead. This way the Triggering state machine logic 215.*x* can use the state (e.g., T0) to remember that a trigger has occurred sometime in the past. Then this memory state (e.g., T0) can be used to generate a persisting flag_x.m0 with a FIG. 26B bufctlX.act0 qualifier respective to it, even though the state machine 215.*x* for processor 10*x* is no longer in the active trigger state T1.

In another embodiment, FIG. 26B/26C logic is used, and the bufX_en bits are supported by RS flip-flops or otherwise to remain set once they become set and until they are affirmatively reset. Also, SEQ SM in SEQ 320.*b* has state S0 associated with an additional helper state (call it RETX) to which all transition arrows going to state S0 in FIG. 23 or 23A go instead. In an uncompleted trace trigger scenario, State RETX affirmatively resets all the bufX_en bits and then transitions directly to state S0. In this way, the bufX_en RS flip-flops are prevented from getting or accumulating a lot of irrelevant bufX_en resulting from uncompleted trace trigger sequence scenarios in the multi-processor system. The circuitry is arranged in such embodiment so that the BufX_en bits go on and off by 1) going on if the trigger sequence only approaches the final capture event without reaching state S3 and 2) going off if the trigger sequence then goes back to state S0. However, if a transient flag_X.mY and its sequence event Seq_evZ contributes to the final vital SEQ SM sequence but does go inactive during the sequence and prior to reaching capture state S3, the bufX_en RS flip-flop bit for that flag does not go off but instead remains set and ready for draining circular buffer 23X.

In some embodiments such as FIG. 26B/26C or 26B/26D, further filter logic circuitry is additionally included to generate derived flags called filtered flags herein (designate them FFlag_X.mY). Filtered flags FFlag_X.mY are produced by circuitry similar to FIG. 26C reused from the AND-gates of FIG. 21A and with further AND-gates qualified by each Sequence event Seq_evZ to which the flags contribute. The ANDing (&) performs a filtering operation producing filtered elements represented by the Boolean expression (2).

$$\text{Seq\_evZ} \ \& \ (\text{flagX\_mY} \ \& \ \text{seq\_evZ\_flag\_X.mskY}) \qquad (2)$$

ORing over sequence event index Z $$(\bigcup_Z)$$

is introduced to eliminate dependence on the index Z, and is based on the idea that contribution to any of the sequence events is relevant. The result is filtered flag Boolean Equation (3):

$$\text{FFlag\_X.}mY = \bigcup_Z \text{Seq\_evZ} \ \& \ (\text{flagX\_mY} \ \& \ \text{seq\_evZ\_flag\_X.}mskY) \qquad (3)$$

In this filtered flag circuitry embodiment, the buffer enable bits bufX_en are produced from the filtered flags ANDed with the configuration bits bufctl_x_actY in Boolean Equation (4A) in a manner patterned after Equation (1). Circuitry, such as a pair of AND-gates or a three-input AND-gate, represented by Boolean expression (2) filters out irrelevant flag instances that don't contribute to any active Seq_evZ. Then, OR-gates are sufficiently provided to OR over indices Y and Z thereby to deliver signals to the bufX_en latches according to Boolean Equation (4B):

$$\text{bufX\_en} = \bigcup_Y \text{FFlag\_X.}mY \ \& \ \text{bufctl\_x\_actY} \qquad (4A)$$

$$= \bigcup_Y \bigcup_Z \text{Seq\_evZ} \ \& \qquad (4B)$$

$$(\text{flagX\_mY} \ \& \ \text{seq\_evZ\_flag\_X.}mskY) \ \&$$

$$\text{bufctl\_x\_actY}$$

Some embodiments have a configuration mode wherein the register bits bufctlX.actY themselves are automatically and dynamically generated, such as by ORing over all Z all the seq_evZ flag_X.mskY either according to Equation (5) or (5A):

$$\text{bufctl\_X\_actY} = \bigcup_Z \text{seq\_evZ\_flag\_X}.mskY. \qquad (5)$$

$$\text{bufctl\_X\_actY} = \bigcup_Z \text{Seq\_evZ} \ \& \ \text{seq\_evZ\_flag\_X}.mskY \qquad (5A)$$

Equation (1) earlier hereinabove describes the conditional logic in FIG. 26C, so substituting Equation (5A) into Equation (1) yields the circuit represented by Boolean equation (6):

$$\text{BufX\_en} = \qquad (6)$$
$$\bigcup_Y \left[ flagX.mY \ \& \ \left( \bigcup_Z (\text{seq\_evZ} \ \& \ \text{seq\_evZ\_flag\_X}.mskY) \right) \right]$$

Generally, the OR/AND structure of circuitry that these various Boolean Equations represent is a more elaborate circuitry analogous to the circuitry of FIG. 26C. To avoid unduly multiplying the drawing Figures, the additional circuitry embodiments are believed to be sufficiently specified and disclosed by their Boolean expressions and equations and the associated description herein. Some embodiments drain the buffers 23X in an X-ordered sequence as described in detail herein, corresponding to the active bufX_en bits. Some other embodiments are also feasible to drain the buffers 23X corresponding to the active bufX_en in parallel with each other, and the herein-described static and dynamic methods of generating the active bufX_en bits facilitate the use of both kinds of embodiments. Many embodiments and combinations thereof for dynamic determination and use of bufX_en are thus possible.

In operation, the Cross Trace Trigger unit 320 is configured or parameterized to generate the desired number of processor CPU 100-103 bus inputs. The inputs may be operating at different clock rates so appropriate clock domain crossing logic is suitably provided for FIG. 19 Trace Capture Qualifiers 310-313. The Cross Trace Trigger unit 320 has several modes of operation, as described in detail next. Various embodiments can provide or omit various such modes and other modes. Configuration is simplified by using mode macros for configuring the various registers according the following descriptions of different modes, and then selecting any particular mode using a corresponding particular value of one or more mode ID bits. Four modes of operation presented here are 1) periodic sampling, 2) shared data, 3) event sampling and 4) simultaneous activity. These modes are not necessarily exclusive.

1) Periodic Sampling Mode

In a periodic sampling mode of Cross Trace Trigger unit 320, the circular buffers 230-233 are configured to store program counter (PC) values for each of the processors 100-103. The Cross Trace Trigger unit 320 outputs HOLD/STOP in FIGS. 20, 19, 16 and stops the capture of all the applicable circular buffers 230-233 simultaneously or concurrently. Cross Trace Trigger unit 320 then issues a DRAINx drain signal using Read Counter 230.d to count from a current count or position value to the pre-established or pre-programmed buffer depth values from each circular buffer. Since data from the processors 100-103 is acquired concurrently, this Periodic Sampling mode provides a snapshot of where each processor 100-103 is running at the exact time the capture is stopped. Once the data is drained and stored or exported, the data acquisition can be or is repeated. The event which causes this sampling can be a timer event, or the data acquisition can simply run at the maximum capture rate. The program counter PC values are compressed in some embodiments within each buffer to maximize trace output bandwidth, by minimizing the amount of data to be sent. This mode is suitably used for profiling code, for one example.

Using the example triggering and cross trace registers previously described for a four processor system, the Periodic Sampling mode is configured by setting the respective Triggering Unit 210-213 registers of FIGS. 6 and 7 for each processor 100-103 as shown in TABLE 1 (no triggers). Also, the registers of FIGS. 24 and 26A for Cross Trace Trigger unit 320 are configured as shown in TABLE 2. This configuration example causes the Cross Trace Trigger unit 320 to generate a capture event every 150 clocks (Seq Ctr), and then extract 32 trace data values (PostCnt, CaptCnt) for each of the four processors 100-103. The cross trace sequencer 320.b state machine SEQ SM of FIG. 23 starts in IDLE state S0 and loads the register Seq Ctr value 150 into the counter Seq_Ctr 320.c of FIGS. 20 and 23B. State machine SEQ_SM advances to state S1 and waits for the counter Seq_Ctr to count down to 0 whence timeout event seq_ev=seq_tc=1, and then SEQ_SM goes to state S3 and activates Capture CAPT/HOLD. State S3 signal CAPT=1 from sequencer state machine SEQ SM triggers the Capture Control state machine 320.d of FIGS. 20 and 25. Capture Control state machine 320.d issues DRAIN0-3 signals to the circular buffers 230-233 and drains them for 32 clocks as specified by registers PostCnt0-3 and CaptCnt0-3 in FIG. 26A. Capture Control state machine 320.d then issues CaptComp to Sequencer 320.b state machine SEQ SM. The state of sequencer state machine SEQ SM responds to the CaptComp signal and goes back to IDLE state S0, reloading the counter Seq_Ctr with the value 150. (FIG. 23A explicitly illustrates the CaptComp transition from a state back to IDLE.) This overall structure and process embodiment operates and occurs continuously until it gets disabled, such as by resetting the Sequencer Control register Seq Cntrl.

TABLE 1

PERIODIC SAMPLING MODE, TRIGGER REGISTERS

| Register Name | Value | Register Name | Value |
|---|---|---|---|
| Addr Comp 0 | 0x0 | Addr Mask 0 | 0x0 |
| Addr Comp 1 | 0x0 | Addr Mask 1 | 0x0 |
| Addr Comp 2 | 0x0 | Addr Mask 2 | 0x0 |
| Addr Comp 3 | 0x0 | Addr Mask 3 | 0x0 |
| Data Comp 0 | 0x0 | Data Mask 0 | 0x0 |
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
|  |  | nt_cfg | 0x0 |
| Trig0_cfg0 | 0x0 |  | 0x0 |
| Trig0_cfg1 | 0x0 | State0_cfg |  |
| Trig1_cfg0 | 0x0 |  | 0x0 |
| Trig1_cfg1 | 0x0 | State1_cfg |  |
| Trig2_cfg0 | 0x0 |  | 0x0 |
| Trig2_cfg1 | 0x0 | State2_cfg |  |
| Trig3_cfg0 | 0x0 |  | 0x0 |
| Trig3_cfg1 | 0x0 | State3_cfg |  |

TABLE 2

PERIODIC SAMPLING MODE, CROSS TRACE REGISTERS

| Register Name | Value | Register Name | Value |
|---|---|---|---|
| Seq Cntrl | Enable | Seq Ctr | 150 |
| Seq_Ev0 | 0x0 | Seq_Cfg0 | load ctr=1 goto S1 |
| Seq_Ev1 | 0x0 | Seq_Cfg1 | S3 when ctr=0 else S1 |
| Seq_Ev2 | 0x0 | Seq_Cfg2 | 0x0 |
| Seq_Ev3 | 0x0 | Seq_Cfg3 | goto S0 |
| Capt Cntrl | All Bufx_en Enabled, Mode= Continuous | | |
| Offset 0 | 0x0 | Capt Cnt 0 | 32 |
| Offset 1 | 0x0 | Capt Cnt 1 | 32 |
| Offset 2 | 0x0 | Capt Cnt 2 | 32 |
| Offset 3 | 0x0 | Capt Cnt 3 | 32 |
| Post Cnt 0 | 32 | | |
| Post Cnt 1 | 32 | | |
| Post Cnt 2 | 32 | | |
| Post Cnt 3 | 32 | | |

2) Shared Data Mode

In the Shared Data mode of Cross Trace Trigger Unit 320, the Triggering Units 210-213 have address/data qualifiers as discussed in FIGS. 5-9 and FIG. 12. Triggering Units 210-213 monitor respective processor CPU 100-103 activity for actions which access shared data objects. The shared data objects can be semaphores, buffers, message queues, shared peripherals, or other shared data objects. The processor 100-103 CPUs address/data qualifier of other Triggering Units 210-213 are suitably programmed to look for similar data accesses or program flow in interprocessor communication code. The Cross Trace Trigger unit 330 is programmed to capture CPU activity if there are one or more matches of activity when a processor 100-103 CPU data access or program execution of the shared data routine is detected by any Triggering Unit 210-213. This can enable the user to determine what each CPU is doing when a shared data object is modified. The Cross Trace Trigger 330 logic in some embodiments also includes one or more intelligent sequencers as in, or based on, SEQ 320.b of FIG. 23 and Capture Control 320.d of FIG. 25 that hold state activity and then wait for additional state activity before triggering the CAPT output and/or DRAINx signals. For example, the Cross Trace Trigger unit 330 logic can be configured to detect a sequence wherein a first processor CPU, e.g. 100, writes to a data location and then another CPU, e.g. 101, does not read the same data within a certain time frame or interval. Detection of that sequence causes a trigger event and records where the other CPU, e.g. 101, is executing code. By configuring the Cross Trace Registers with an Offset, the activity before the trigger can be captured. This is very useful when the trigger is a failure of an event to occur. If processor CPU 101 does read the data within the specified time frame, the Cross Trace Trigger unit 330 state machines of FIGS. 23 and 25 return to looking for first-CPU 100 accesses to the shared data resource. Cross Trace Trigger unit 330 asserts the REARM signal to clear the previous triggered condition.

To illustrate this Shared Data mode of operation suppose, for example, a four processor system has CPU 100 managing buffers of data and CPU 101, CPU 102 and CPU 103 processing the data. Further, each data processing CPU 101-103 has two input buffers and two output buffers used in a ping pong fashion wherein one pair of buffers gets loaded/unloaded while the other pair is being processed. CPU 100 copies data into/out of the buffers and sets a data ready flag for each of the data processing CPUs 101-103. When any of the data processing CPUs 101-103 finish processing a buffer of data, it sets a Data_Done_x flag. This enables CPU 100 to determine which data processing CPU 10x is available to process the next buffer of information. A data overflow error may occur if the data processing CPUs cannot process the data fast enough or if CPU 100 cannot load and unload the buffers fast enough.

To trace the foregoing example in Shared Data Mode, TABLES 3-5 show the register configurations. The trigger registers of FIGS. 6, 7, 9 for CPU 100 are each configured with all zeroes as shown in TABLE 3. No triggers are configured in this example to occur due to CPU 100 buffer-managing activity. Trigger state machine 215 of Triggering Unit 210 stays in its NT state that issues no match flag. The trigger registers of FIGS. 6, 7, 9 for the data processors 101-103 are each configured as shown in TABLE 4. When a processor 10x executes in the poll routine, as indicated by asserted addresses in an address range characteristic of that poll routine, it causes the corresponding Triggering Unit 21x state machine 215 of FIG. 8 to go from no-trigger state NT to trigger state T0.

To accomplish this, the configuration previously sets FIG. 6 registers AddrComp0,1 to the start/end addresses of the poll ready poll routine code. FIG. 7 register field Trig0_cfg0_addr0 is set to 011 (=,> for greater than or equal) and Trig0_cfg0_addr1 is set to 110 (<,=). The AND register field in Trig0_cfg1 register is set with configuration bits that configure the AND function between the >=Addr0 and <=Addr1 comparisons. In this way, comparator operation detects when operations are in the poll routine. FIG. 9 register field nt_cfg_trig0 has a new state new st entry code T0, and State0_cfg_trig0 has an entry code T0. Trigger state T0 continues as long as trig0 is active and then returns to the NT state. Each trigger state machine 215 in Triggering Units 211, 212, 213 is constructed and/or configured so that trigger state T0 in any one of them issues a respective match flag (flag1, 2,3_m0) to Cross Trace Unit 330 of FIG. 17. The Cross Trace Unit 330 has registers as shown in FIGS. 22, 24 and 26A, and an example of their configuration for Shared Data Mode is provided in TABLE 5.

TABLE 3

SHARED DATA MODE, CPU 100 TRIGGER REGISTERS

| Register Name | Value | Register Name | Value |
|---|---|---|---|
| Addr Comp 0 | 0x0 | Addr Mask 0 | 0x0 |
| Addr Comp 1 | 0x0 | Addr Mask 1 | 0x0 |
| Addr Comp 2 | 0x0 | Addr Mask 2 | 0x0 |
| Addr Comp 3 | 0x0 | Addr Mask 3 | 0x0 |
| Data Comp 0 | 0x0 | Data Mask 0 | 0x0 |
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
| | | nt_cfg | 0x0 |
| Trig0_cfg0 | 0x0 | | 0x0 |
| Trig0_cfg1 | 0x0 | State0_cfg | |
| Trig1_cfg0 | 0x0 | | 0x0 |
| Trig1_cfg1 | 0x0 | State1_cfg | |
| Trig2_cfg0 | 0x0 | | 0x0 |
| Trig2_cfg1 | 0x0 | State2_cfg | |
| Trig3_cfg0 | 0x0 | | 0x0 |
| Trig3_cfg1 | 0x0 | State3_cfg | |

TABLE 4

SHARED DATA MODE, DATA PROCESSOR TRIGGER REGISTERS

| Register Name | Value | Register Name | Value |
|---|---|---|---|
| Addr Comp 0 | Poll ready start | Addr Mask 0 | 0x0 |
| Addr Comp 1 | Poll ready end | Addr Mask 1 | 0x0 |
| Addr Comp 2 | 0x0 | Addr Mask 2 | 0x0 |
| Addr Comp 3 | 0x0 | Addr Mask 3 | 0x0 |
| Data Comp 0 | 0x0 | Data Mask 0 | 0x0 |
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
| | | nt_cfg | goto T0 when trig0 |
| Trig0_cfg | In Poll routine Addr0: >= Addr1: <= | State0_cfg | stay in T0 if trig0 else NT |
| Trig0_cfg1 | >=Addr0 AND <=Addr1 Ctl_sel: Instr = 1, Read = 1. | | |
| Trig1_cfg0 | 0x0 | State1_cfg | 0x0 |
| Trig1_cfg1 | 0x0 | | |
| Trig2_cfg0 | 0x0 | State2_cfg | 0x0 |
| Trig2_cfg1 | 0x0 | | |
| Trig3_cfg0 | 0x0 | State3_cfg | 0x0 |
| Trig3_cfg1 | 0x0 | | |

TABLE 5 tabulates an example configuration for Shared Data Mode of the registers in FIGS. 22, 24 and 26A for Cross Trace Unit 330. In FIG. 20 Merge block 320.a, MASK REGS are configured all zeroes except one-bits in each of the respective mask register bits flag1,2,3_msk0. In this way, only flag1_m0 from Trigger Unit 211, flag2_m0 from 212, and flag3_m0 from 213 are admitted to the logic of FIG. 21A. That logic of FIG. 21A has a configured threshold value Thresh=1. Because Thresh=1, and when any of the data processors 101-103 is executing its poll loop waiting for CPU 100 to load data, the sequencer event Seq_ev0 from Merge block 320.a goes active. The Sequencer 320.b state machine SEQ SM is already configured with nxt_st entry code S1 in FIG. 24 register field Seq0_cfg_Seq_ev0. Accordingly, the state machine SEQ SM goes to state S1 in response to sequencer event Seq_ev0 active, i.e., in response to polling by any processor 101, 102 or 103 as signaled by the match flag1,2,3_m0 from state machine 215 state T0 of any Triggering Unit 211-213. Processor 100 should have completed the loading and unloading of the requesting processors ping-pong buffer by the time it is ready to process another buffer of data. If the state machine SEQ SM remains at state S1 for more than a reasonable time for the handshake, e.g. 50 clocks, configured for Seq Ctr 320.c, processor 100 is not keeping up and Seq Ctr timeout occurs and the state machine SEQ SM transitions to state S3 to issue signals CAPT/HOLD. CAPT triggers the Capture Control unit 320.d; and STOP to circular buffers as in FIG. 16 is responsive to HOLD. To accomplish this, the FIG. 24 configuration has nxt_st=S3 entered (TABLE 5A) in the nxt_st sub-field in Seq1_cfg_Seq_Ctr, and the run count 50 entered in the subfield "run."

Moreover, the trace is configured to operate to respond when two or more of the data processors 101-103 are concurrently in their poll loop. A replica of the FIG. 21A circuitry is provided and separately configured with Thresh=2 to generate a sequencer event Seq_ev1 active. In response to Seq1_ev1 active from FIG. 20 Merge block 320.a, FIG. 23 state machine SEQ SM goes directly from IDLE state S0 to state S3 and issues CAPT and HOLD. The configuration for the transition to S3 is a nxt_st entry signifying S3 in each of FIG. 24 register fields Seq0_cfg_Seq_ev1 and Seq1_cfg_Seq_ev1.

The Capture Control unit 320.d has FIG. 26A register values CaptCnt1-3 for Capture Counter CaptCtr 320.e configured to capture 150 cycles of data from each of the processors 101-103, including 100 pre-event cycles and 50 post-event cycles. FIG. 26 registers Offset1-3 specify the 100 pre-event cycles and registers PostCnt1-3 specify the 50 post-event cycles for those processors 101-103. Separately, CaptCnt0 is set to capture 250 cycles of data from processor 100, including Offset0=150 pre-event cycles and PostCnt0=100 post-event cycles. This data provides information whether and why CPU 100 is unable to keep up with the data rate (Seq_ev0) or if two or more the other data processing CPUs 101, 102, 103 unexpectedly are polling for more data (Seq_ev1) and what CPU 100 was doing about the same time. Note also in TABLE 5 that FIG. 26A register CaptCntrl has all buffer bits Bufx_en active so that data from all processors 100-103 is admitted to the Trace Combiner 300. At the end of the process, state machine SEQ SM 320.b goes back to state S0 in response to CaptComp from Capture Control 320.d because SEQ SM is configured with nxt_st entry S0 in register field Seq3_cfg_Seq_ev3. The CaptCntrl register is configured for Single mode so the data will be captured when a counter underflow event (timeout) occurs and then stop so the failing data can be examined.

A similar example of shared data mode is the reverse situation, where processor 100 is loading and unloading buffers of data and processors 101-103 cannot keep up with the data processing load. For conciseness, this example is not described in detail herein, but can also be traced using the cross trace logic.

TABLE 5

SHARED DATA MODE, CROSS TRACE REGISTERS

| Register Name | Value | Register Name | Value |
|---|---|---|---|
| Seq Cntrl | Enable | Seq Ctr | 50 |
| Seq_Ev0 | CPU101-match0, CPU102-match0, CPU103-match0, Thresh = 1 | Seq0_Cfg | goto S1 if Seq_Ev0 active; Ld load Seq Ctr, goto S3 if two procs in poll routine; goto S0 if no polling |
| Seq_Ev1 | CPU101-match0, CPU102-match0, CPU103-match0, Thresh = 2 | Seq1_Cfg | goto S3 if two or more polling, goto S3 if timeout Seq_ct = 1 |
| Seq_Ev2 | 0x0 | Seq2_Cfg | 0x0 |
| Seq_Ev3 | 0x0 | Seq3_Cfg | If CaptComp, goto S0 |
| Capt Cntrl | All Bufx_en Enabled, Mode = Single | | |
| Offset 0 | 150 | Capt Cnt 0 | 250 |
| Offset 1 | 100 | Capt Cnt 1 | 150 |
| Offset 2 | 100 | Capt Cnt 2 | 150 |
| Offset 3 | 100 | Capt Cnt 3 | 150 |
| Post Cnt 0 | 100 | | |
| Post Cnt 1 | 50 | | |
| Post Cnt 2 | 50 | | |
| Post Cnt 3 | 50 | | |

TABLE 5A

SEQx_CFG REGISTER CONFIGURATION FOR TABLE 5

| Register\|Cur. State | Seq_Ev0 | Seq_Ev1 | Seq_Ctr | Seq_Ev3 |
|---|---|---|---|---|
| Seq0_Cfg (S0) | S1 | S3 | S0 | S0 |
| Seq1_Cfg (S1) | S1 | S3 | S3 | S0 |

TABLE 5A-continued

SEQx_CFG REGISTER CONFIGURATION FOR TABLE 5

| Register\|Cur. State | Seq_Ev0 | Seq_Ev1 | Seq_Ctr | Seq_Ev3 |
|---|---|---|---|---|
| Seq2_Cfg (S2) | S0 | S0 | S0 | S0 |
| Seq3_Cfg (S3) | S3 | S3 | S3 | S0 |

3) Event Sampling Mode

In the Event Sampling mode of Cross Trace Trigger Unit 320, the circular buffers 230-233 are configured to store program counter (PC) values from each processor 100-103. The Cross Trace Trigger Unit 320 stops capture of all the circular buffers 230-233 simultaneously and then drains the values from each circular buffer 230-233. Since data is acquired by the circular buffers 230-233 concurrently, this provides a snapshot of where each processor 100-103 CPU is running at the exact time the capture is stopped. The event which causes this sampling can be an external event or be caused by the data or program activity of one or more of the CPUs. External events desirably initiate capture of processor 100-103 CPU activity that occurred immediately before the event. The event can be a CPU accessing shared data structures or executing an interprocessor communication (IPC) code or some other event. For example, when a processor CPU, e.g. 100, decrements a resource counter, Cross Trace Trigger Unit 320 captures all that CPU 100 activity until the resource is claimed by another CPU.

To illustrate the Event Sampling mode of operation, a multi-processor system has CPU 100 managing a communication peripheral. CPU 100 receives one or more interrupts, processes each interrupt, and may put a task on the task queue depending on a message from the communication peripheral. Suppose one of the other processors, such as CPU 101, 102, or 103 must start executing the task before the next interrupt occurs. Further suppose CPU 100 code has been previously traced and debugged, but get-task execution by processors 101-103 is problematic. Once the task is put on the task queue, the Event Sampling mode of Cross Trace Trigger Unit 320 records the activity of all the other processors 101-103 to determine the task response time and trace their operations to verify or diagnose them.

The trigger registers of FIGS. 6, 7 and 9 in Event Sampling Mode for CPU 100 are shown in TABLE 6. A trigger event trig0 is caused by the entry into the Interrupt Service Routine (ISR), and another trigger event trig1 is caused if the task queue gets written by CPU 100. These trigger events are established in Triggering Unit 210. There, Registers Addr Comp 0, 1 of FIG. 6 are pre-loaded respectively with the start address and the stop address of interrupt service routine ISR. Register Trig0_cfg0 of FIG. 7 is loaded in the addr0 field with value 011 (=,>), and loaded in the addr1 field with value 110 (<,=). Register Trig0_cfg1 is loaded with bits in the AND plane field to enable addr0 and addr1 comparators and in the OR plane field to enable the first AND plane. The ctl_sel field is enabled to select instruction instr and read operations. In this way, the FIG. 5 address comparator detects ISR execution when CPU 100 asserts an instruction read at an actual address on a bus in the address range defined by the Addr Comp 0,1 registers and Register Trig0_cfgx such that ISR start address <=Asserted Address <=ISR stop address.

Analogously, address comparison detects a trig1 event wherein write-to-task-queue software code asserts a data write to a task queue address in a task queue address range specified or configured into registers Addr Comp 2,3; and registers Trig1_cfg0 and Trig1_cfg 1 are configured to define the trig1 event. The FIG. 9 configuration registers are configured so that the Triggering Unit 210 state machine 215 of FIG. 8 looks for a two-step sequence of processor 100 operation having 1) ISR execution (trig0, NT-to-T0 transition) followed by 2) data write by processor 100 to task queue (trig1, T0-to-T2 transition). When such two-step sequence is detected by Triggering Unit 210 state machine 215 reaching state T2, the state machine in state T2 outputs a match flag value flag0_m2=1 to Cross Trace Trigger Unit 320 of FIG. 20.

TABLE 6

EVENT SAMPLING MODE, INTERRUPT PROCESSOR TRIGGER REGISTERS

| Register Name | Value | Register Name | Value |
|---|---|---|---|
| Addr Comp 0 | ISR start | Addr Mask 0 | 0x0 |
| Addr Comp 1 | ISR stop | Addr Mask 1 | 0x0 |
| Addr Comp 2 | Task queue start | Addr Mask 2 | 0x0 |
| Addr Comp 3 | Task queue stop | Addr Mask 3 | 0x0 |
| Data Comp 0 | 0x0 | Data Mask 0 | 0x0 |
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
| | | nt_cfg | goto T0 when trig0 |
| Trig0_cfg0 | ISR execution Addr0: >=, Addr1: <= | State0_cfg | goto T2 if trig1 else stay in T0 if trig0 else NT |
| Trig0_cfg1 | >=Addr0 AND <=Addr1 Ctl_sel: Instr=1, Read=1 | | |
| Trig1_cfg0 | Write to task queue: Addr2: >=, Addr3: <= | State1_cfg | goto NT |
| Trig1_cfg1 | >=Addr2 AND <= Addr3 Ctl_sel: Data=1, Write=1 | | |
| Trig2_cfg0 | 0x0 | State2_cfg | 0x0 |
| Trig2_cfg1 | 0x0 | | |
| Trig3_cfg0 | 0x0 | State3_cfg | 0x0 |
| Trig3_cfg1 | 0x0 | | |

The trigger registers for the task processors 100-103 are shown in TABLE 7. Execution by any of the processors 10x in the get_task routine causes the trigger state of the corresponding Trigger Unit 21x state machine 215 to go from No-Trigger state NT to trigger state T0 in FIG. 8. Each of the Triggering Units 211-213 is configured as shown in TABLE 7. FIG. 6 registers Addr Comp0,1 for monitoring each processor 101, 102, 103 are configured as in TABLE 7. Trigger trig0 for any of these processors 101-103 occurs when a read address, in the range of Addr Comp0,1 for the get_task routine, is actually asserted on an address bus by an instruction read by any one such processor 101-103. If trig0 occurs, a respective Trigger Unit 21x state machine 215 goes from state NT to state T0 and issues a match flag value flagX_m0=1 as an active input to Cross Trace Trigger Unit 320 of FIG. 20.

TABLE 7

EVENT SAMPLING MODE, TASK PROCESSOR TRIGGER REGISTERS

| Register Name | Value | Register Name | Value |
|---|---|---|---|
| Addr Comp 0 | get_task start | Addr Mask 0 | 0x0 |
| Addr Comp 1 | get_task stop | Addr Mask 1 | 0x0 |
| Addr Comp 2 | 0x0 | Addr Mask 2 | 0x0 |
| Addr Comp 3 | 0x0 | Addr Mask 3 | 0x0 |
| Data Comp 0 | 0x0 | Data Mask 0 | 0x0 |

TABLE 7-continued

EVENT SAMPLING MODE, TASK PROCESSOR TRIGGER REGISTERS

| Register Name | Value | Register Name | Value |
|---|---|---|---|
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
|  |  | nt_cfg | goto T0 when trig0 |
| Trig0_cfg0 | get_task execution Addr0: >= Addr1: <= | State0_cfg | stay in T0 if trig0 else NT |
| Trig0_cfg1 | >=Addr0 AND <=Addr1 Ctl_sel: Instr=1, Read = 1. |  |  |
| Trig1_cfg0 | 0x0 | State1_cfg | 0x0 |
| Trig1_cfg1 | 0x0 |  |  |
| Trig2_cfg0 | 0x0 | State2_cfg | 0x0 |
| Trig2_cfg1 | 0x0 |  |  |
| Trig3_cfg0 | 0x0 | State3_cfg | 0x0 |
| Trig3_cfg1 | 0x0 |  |  |

The Cross Trace Trigger Unit 320 registers for this example of an Event Sampling Mode are shown in TABLE 8. Only trace data from CPUs 101-103 are of interest because the example presumes processor 100 manager code is already debugged and so no trace data from CPU 100 is captured. 100 samples of each of the task processors 101-103 is captured every time a task gets put on the task queue by manager processor 100 in response to a peripheral message.

In TABLE 8, Merge block 320.a output Seq_ev0 is activated in FIG. 20 when Triggering unit 210 issues flag0_m2=1, indicating a CPU 100 task queue write that followed an ISR execution in CPU 100. To support the merge operation, MASK REGS has a one-bit set only for bit position flag0_msk2=1 and Thresh=1 in FIG. 21A. Upon receipt of active match flag0_m2=1 merge block 320.a outputs sequence event Seq_ev0 active to Sequencer 320.b. Sequence Count SeqCnt is set to zero so that Sequence counter Seq Ctr 320.c immediately times out upon receipt of Seq_ev0 active. Sequencer 320.b state machine SEQ SM is programmed to thereupon go from state S0 to capture state S3 and Capture signal CAPT commences immediately. Registers PostCnt1,2,3 are each set to 100 cycles as are registers CaptCnt1,2,3 so as to deliver 100 cycles of information on each processor 101-103 only. The CaptCntrl register is set for continuous mode, so after each capture sequence, the logic gets re-armed. This enables response time to putting a task on the queue to be profiled. The field for FIG. 26B bufctl1, bufctl2 and bufctl3 is set to 1 to enable trace capture of CPU101-103. The field for bufctl0 is set to 0, to prevent trace capture of CPU100.

TABLE 8

EVENT SAMPLING MODE, CROSS TRACE REGISTERS

| Register Name | Value | Register Name | Value |
|---|---|---|---|
| Seq Cntrl | Enable | Seq Ctr | 0 |
| Seq_Ev0 | CPU100-match2, Thresh=1 | Seq0_Cfg | goto S3 if task queue written |
| Seq_Ev1 | 0x0 | Seq1_Cfg | 0x0 |
| Seq_Ev2 | 0x0 | Seq2_Cfg | 0x0 |
| Seq_Ev3 | 0x0 | Seq3_Cfg | 0x0 |
| Capt Cntrl | Enable Buf1-3_en, Mode=Continuous |  |  |
| Offset 0 | 0x0 | Capt Cnt 0 | 0x0 |
| Offset 1 | 0 | Capt Cnt 1 | 100 |
| Offset 2 | 0 | Capt Cnt 2 | 100 |
| Offset 3 | 0 | Capt Cnt 3 | 100 |
| Post Cnt 0 | 0x0 |  |  |
| Post Cnt 1 | 100 |  |  |
| Post Cnt 2 | 100 |  |  |
| Post Cnt 3 | 100 |  |  |

TABLE 8A supports an additional hypothetical trace investigation of the operation of the processors. Merge block 320.b output Seq_ev0 is activated when flag0_m2 from Triggering Unit 210 goes active for processor 100. Separate output Seq_ev1 is activated when at least one of Triggering Units 211-213 issues an active match flag—flag1,2,3_m0—for at least one processor 101, 102, 103. Logic as shown in FIG. 21A has a single mask bit flag0_msk2 set to one (1) in associated seq_ev0 MASK REGS for that logic. Separately for seq_ev1, a replica of the logic of FIG. 21A has replica MASK REGS with three one-bits set in the flag1,2,3_msk0 positions and threshold Thresh=1 in TABLE 8A for the replica logic. SeqCnt is set to 50 cycles. In this way, an event or event sequence is collectively defined by 1) CPU 100 Seq_ev0 and SeqCtr timeout OR 2) a sequence including event Seq_ev0 followed by Seq_ev1 active. In TABLES 8A and 8B, such event or event sequence causes Sequencer state machine SEQ SM to go to a state S3 and produce a Capture signal CAPT active. Configuration of each FIG. 26A Offset1,2,3 is 50 cycles in TABLE 8A. This Offset desirably delivers trace data from circular buffers 231-233 about processors 101-103 activity from the moment of sequence event Seq_ev0 even though SeqCtr timeout 50 cycles later is what activates Capture signal CAPT. Configuration of PostCnt1,2,3 is 100 cycles in TABLE 8A to capture get_task execution, if it occurs, in processor 101, 102, and/or 103. The CaptCntrl mode is set to single, so that when a failure to respond in time occurs, the data is captured and acquisition stops.

TABLE 8A

EVENT SAMPLING MODE, CROSS TRACE REGISTERS

| Register Name | Value | Register Name | Value |
|---|---|---|---|
| Seq Cntrl | Enable | Seq Ctr | 50 |
| Seq_Ev0 | CPU 100 event Flag0_m2, Thresh=1 | Seq0_Cfg | goto S1 if Seq_ev0 (task queue written) |
| Seq_Ev1 | CPUs 101-103, any flag1,2,3_m0, Thresh=1 | Seq1_Cfg | go from S1 to S3 if Seq_ev1 or if Seq_tc=1 (timeout). |
| Seq_Ev2 | 0x0 | Seq2_Cfg | 0x0 |
| Seq_Ev3 | 0x0 | Seq3_Cfg | 0x0 |
| Capt Cntrl | Enable Buf1-3_en Mode=Single |  |  |
| Offset 0 | 0x0 | Capt Cnt 0 | 0x0 |
| Offset 1 | 50 | Capt Cnt 1 | 150 |
| Offset 2 | 50 | Capt Cnt 2 | 150 |
| Offset 3 | 50 | Capt Cnt 3 | 150 |
| Post Cnt 0 | 0x0 |  |  |
| Post Cnt 1 | 100 |  |  |
| Post Cnt 2 | 100 |  |  |
| Post Cnt 3 | 100 |  |  |

TABLE 8B

SEQx_CFG REGISTER CONFIGURATION FOR TABLE 8A

| Register\|Cur. State | Seq_Ev0 | Seq_Ev1 | Seq_Ctr |
|---|---|---|---|
| Seq0_Cfg (S0) | S1 | S0 | S0 |
| Seq1_Cfg (S1) | S1 | S3 | S3 |
| Seq2_Cfg (S2) | S0 | S0 | S0 |
| Seq3_Cfg (S3) | S3 | S3 | S3 |

4) Simultaneous Activity Mode

Turning to the Simultaneous Activity mode of Cross Trace Trigger Unit 320, an example is illustrated wherein the Cross Trace Trigger Unit 320 monitors circumstances in which multiple processors among the processors 100-103 are executing communication and synchronization code. Such circumstances then cause the contents in the applicable circular buffers 230-233 for the respective processors executing such code to be captured by Cross Trace Trigger Unit 320 when the Simultaneous Activity mode is active. Then trace data from those circular buffers is exported using Trace Combiner 300, On Chip Trace Buffer 400 and Trace Export Unit 500 to the Trace Pins 550. This Simultaneous Activity mode is useful to locate deadlock code, for instance, wherein multiple processors are trying to access the same resources such as a memory space or peripheral buffer.

To illustrate the Simultaneous Activity mode, suppose a four-processor system with shared resources executes some tasks that require multiple resources. Assume that a Task A and Task B run on separate processors. Suppose further that semaphores are used to keep track of requests and ownership of the shared resources. If Task A needs Resources R1 and R2, and Task B also needs Resources R1 and R2, the situation can arise where each Task owns one of the Resources it needs but neither Task can run until it acquires the other Resource as well. Notice that the word "simultaneous" in connection with this Simultaneous Activity mode has an approximate meaning relative to deadlock since Resources R1 might be granted to one processor at a somewhat different time than when Resources R2 are granted to the other processor, and yet both processors would thereafter be in deadlock at the same time since they both need R1 and R2.

The FIGS. 6, 7, 9 trigger registers are configured for each Triggering Unit 210-213 to monitor all of the processors 100-103. TABLE 9 shows the register configuration for any one Triggering Unit 21*x*. It is assumed that Task A and Task B can run on any pair of the processors 100-103. A resource is claimed by reading a semaphore or hardware register and getting an available status, in this case 0, then writing a non-zero value to the same location. For hardware mechanisms, this may be a single bit, for a semaphore, it could be a bit or the processor ID. A resource is released by writing a 0 to the semaphore, indicating it is now available.

A trigger event trig0 (resource busy) is caused by a processor requesting an already-busy shared resource R1 or R2, as indicated by a read operation, an asserted address of the appropriate semaphore configured in registers Addr Comp0 or 1, along with a non-zero data value (i.e., busy). Trigger event trig1 (resource granted) is caused by a processor being granted a shared resource R1 or R2, as indicated by a write operation, an asserted address of the appropriate semaphore configured in registers Addr Comp0 or 1, along with a non-zero data value. Trigger event trig2 (resource released) is caused by a processor releasing a shared resource R1 or R2, as indicated by a write operation, an asserted address of the appropriate semaphore configured in registers Addr Comp0 or 1, along with a zero data value. See TABLE 9 for configuration of each of these trigger events trig0-2 in registers Trig0-2_cfg0,1.

TABLE 9A summarizes the configuration and/or structure of state machine 215 and its trigger-induced transitions that are described in the next several paragraphs.

FIG. 8A provides a simplified version of FIG. 8 and illustrates the state machine transitions for this example.

In FIG. 8A, State T0 in trigger state machine 215.*x* is entered by a transition from state NT in Triggering Unit 21*x* when get_resource code is executed by processor 10*x* and thereby requests Resource R1 or R2. If the resource is busy (non-zero data value), trig0 is asserted and the state machine 215 transitions to the state T0 (resource busy) and match flagX_m0 is output active from Triggering Unit 21*x*. (This state machine 215 transition is configured by a FIG. 9 new_st entry code T0 in register field nt_cfg_trig0 for each Trigger Unit 21*x*.).

In FIG. 8A, State T1 (one resource granted) is entered from state T0 if and when the requested resource is granted to processor 10*x*, whereupon trig1 is asserted and a match flagX_m1 for processor 10*x* is output from Triggering Unit 21*x* while match flagX_m0 is reset inactive. (The FIG. 9 register field State0_cfg_trig1 is configured for that T0-to-T1 transition with entry code T1.) State T1 is alternatively enterable directly from NT state. If the requested resource is granted to processor 10*x* directly upon request, trig1 is asserted and an NT-to-T1 transition occurs.

Further in FIG. 8A, State T2 (both resources granted) is entered from state T1 if and when another resource request is granted to processor 10*x*, whereupon trig1 is asserted a second time and a match flagX_m2 for processor 10*x* is output from Triggering Unit 21*x* while match flagX_m1 is reset inactive. (The FIG. 9 register field State1_cfg_trig1 is configured for that T1-to-T transition with entry code T2.)

State T1 (one resource granted) is entered from state T2 if and when a resource is released by processor 10*x*, whereupon trig2 is asserted and a match flagX_m1 for processor 10*x* is output from Triggering Unit 21*x* while match flagX_m2 is reset inactive. (The FIG. 9 register field State2_cfg_trig2 is configured for that T2-to-T1 transition with entry code T1.)

In FIG. 8A, State NT (idle) is entered from state T1 if and when a resource is released by processor 10*x*, whereupon trig2 is asserted and match flagX_m1 for processor 10*x* is reset inactive from Triggering Unit 21*x*. (The FIG. 9 register field State1_cfg trig2 is configured for that T1-to-NT transition with entry code NT.)

TABLE 9

SIMULTANEOUS ACTIVITY MODE, TRIGGER REGISTERS

| Register Name | Value | Register Name | Value |
|---|---|---|---|
| Addr Comp 0 | Reg R1 | Addr Mask 0 | 0x0 |
| Addr Comp 1 | Reg R2 | Addr Mask 1 | 0x0 |
| Addr Comp 2 | 0x0 | Addr Mask 2 | 0x0 |
| Addr Comp 3 | 0x0 | Addr Mask 3 | 0x0 |
| Data Comp 0 | 0x0 (it indicates Free) | Data Mask 0 | Resource Claim Field |
| Data Comp 1 | 0x0 | Data Mask 1 | 0x0 |
| Data Comp 2 | 0x0 | Data Mask 2 | 0x0 |
| Data Comp 3 | 0x0 | Data Mask 3 | 0x0 |
|  |  | nt_cfg (Idle) | goto T0 if trig0 else T1 if trig 1 |
| Trig0_cfg0 | Resource Busy Addr0: =, Addr1: =, Data: < > | State0_cfg (waiting) | goto T1 if trig 1 else stay in T0 |

TABLE 9-continued

SIMULTANEOUS ACTIVITY MODE, TRIGGER REGISTERS

| Register Name | Value | Register Name | Value |
|---|---|---|---|
| Trig0_cfg1 | (=Addr0 OR =Addr1) AND Data <> 0 Ctl_sel: data=1, read=1 | | |
| Trig1_cfg0 | Resource Granted Addr0: =, Addr1: =, Data: < > | State1_cfg (one owned) | goto T2 if trig1 else NT if trig 2 else stay in T1 |
| Trig1_cfg1 | (=Addr0 OR =Addr1) AND Data <> 0 Ctl_sel: data=1, write=1 | | |
| Trig2_cfg0 | Resource Released Addr0: =, Addr1: =, Data: = | State2_cfg (both owned) | goto T1 if Trig2 else stay in T2 |
| Trig2_cfg1 | (=Addr0 OR =Addr1) AND Data=0 Ctl_sel: data=1, write=1 | | |
| Trig3_cfg0 | 0x0 | State3_cfg | |
| Trig3_cfg1 | 0x0 | | |

TABLE 9A

STATEx_CFG REGISTER CONFIGURATION FOR TABLE 9

| Register\|Cur. State | Trig0 | Trig1 | Trig2 |
|---|---|---|---|
| nt_cfg (NT) | T0 | T1 | NT |
| State0_Cfg (T0) | T0 | T1 | T0 |
| State1_Cfg (T1) | T1 | T2 | NT |
| State2_Cfg (T2) | T2 | T2 | T1 |

A deadlock occurs if two or more processors are in state T0 or T1 for more than a predetermined amount of time. The deadlock condition is undesirable and should be traced, diagnosed and corrected. To accomplish this, Cross Trace Trigger Unit 320 is configured to detect and capture an occurrence indicative of such deadlock when one processor 10x is represented by its Triggering Unit 21x state machine 215 in a state T0 or T1 and another processor 10y is represented by its separate Triggering Unit 21y state machine 215 in a state T0 or T1. Cross tracing is used because such a deadlock event involves two different processors 10x and 10y, and responding to their respective Triggering Units 21x and 21y is performed herein by Cross Trace Trigger Unit 320 and activates seq_en active to Seq Ctr 320.c in FIG. 20.

The FIGS. 24 and 26A or 26B cross trace registers for Cross Trace Trigger Unit 320 are configured as shown in TABLE 10. As an introductory matter, if any processor Triggering Unit 21x is in FIG. 8 trigger state machine 215 state T0 (waiting for R1 or R2), a match flagX_m0 is issued. If any processor Triggering Unit 21x is in FIG. 8 trigger state machine 215 state T1 (owns R1 or R2), a match flagX_m1 is issued.

In FIG. 20, Merge block 320.a MASK REGS for sequencer event Seq_ev0 are configured with ones for all of the flags except flag_0.msk3, flag1.msk3, flag1.msk3 and flag3.msk3. Threshold is set to unity (Thresh=1) in a Seq_ev0 merge logic of FIG. 21A, so that if at least one Triggering Unit 21x issues a match flag flagX_m0, flagX_m1 or flagX_m2, then Merge block 320.a thus issues a sequencer event Seq_ev0.

A simplified version of FIG. 23 showing relevant states for this example is shown in FIG. 23D. Sequencer state machine SEQ SM of FIG. 23/23D is configured to respond to sequencer event Seq_ev0 by going out of IDLE state S0 to SEQ SM state S1. State S1 issues load Ld=1 to register field Seq2_cfg_Seq_Ctr of FIG. 26A. In TABLE 10, the masking by Merge Unit 320.a using the thus-configured MASK REGS section for Seq_ev0 only admits match flags flag0,1,2,3_m0, m1 and m2, which relate to processor CPUs 100, 101, 102, 103 respectively. Thus TABLE 10 uses nomenclature CPU100-match0-2, CPU101-match0-2, CPU102-match0-2, CPU103-match0-2 to refer to the conditions that said match flags represent.

In FIG. 20, Merge block 320.a MASK REGS for sequencer event Seq_ev1 are configured with ones for all of the flags except flag_0.msk3, flag1.msk3, flag1.msk3 and flag3.msk3. Threshold is set to two (Thresh=2) in a Seq_ev1 merge logic of FIG. 21A, so that if two or more Triggering Unit 21x issues a match flag flagX_m0, flagX_m1 or flagX_m2, then Merge block 320.a thus issues a sequencer event Seq_ev1. Sequencer state machine SEQ SM of FIG. 23/23D is configured to respond to sequencer event Seq_ev1 by going out of state S1 to SEQ SM state S2. State S2 issues Run=1 to register field Seq2_cfg_Seq_Ctr of FIG. 26A. State S2 represents two or more processors using or requesting Resources R1 and R2. If this state persists longer than the value loaded into the SeqCtr takes to count down to zero, it may indicate a deadlock. The nxt_st field of the Seq_Ctr field is set to S3, so that if the SeqCtr counts down to zero, sequencer state machine SEQ SM of FIG. 23/23D is configured to respond by going out of state S2 to SEQ SM state S3.

A deadlock occurs if one processor is in state T0 or T1 and another processor is currently in T1 or T2 for a period of time longer than it should take to perform the task using resources R1 and R2. The FIGS. 24, 26A cross trace registers configurations are shown in TABLE 10. If any processor 10x is in state T0, T1 or T2, goto state S1 of SEQ SM as above. If a second processor is in state T0, T1, or T2, goto state S2 of SEQ SM as above and start the timeout counter. If one of the processors releases its resource and returns to state NT, then the SEQ_SM will goto state S1 and the SeqCtr will be reloaded. If all processors release resources R1 and R2, SEQ_SM will goto state S0. If the SeqCtr expires while in state S2, then deadlock exists, and configuration in TABLES 10 and 10A has SEQ SM goto state S3 and capture the data. Sequencer state machine SEQ SM is configured by FIG. 24 registers Seqx_cfg to respond to such deadlock by going from such SEQ SM states, under conditions as just described, to state S3 and capturing trace data for subsequent diagnostic analysis by activating outputs CAPT and HOLD. The trace data from Circular Buffers 230-233 covers a configured time window in FIG. 26A and TABLE 10 of 100 clock cycles (CaptCnt0-3), including 50 cycles (Offset0-3) previous to the deadlock event and 50 cycles (PostCnt0-3) after the deadlock event.

The field of all the bufctlx words in FIG. 26B is set to 0. The .act0, .act1 and .act2 fields of all the bufctlx words are set to 1 and the .act3 field is set to 0. This enables dynamic trace capture for only those particular processors among processors 100-103 that were accessing the shared resources.

The TABLES and Figures as described herein define the hardware for implementation straightforwardly.

TABLE 10

SIMULTANEOUS ACTIVITY MODE,
CROSS TRACE REGISTERS

| Register Name | Value | Register Name | Value |
|---|---|---|---|
| Seq Cntrl | Enable | Seq Ctr | 200 |
| Seq_Ev0 | CPU100-match0-2, CPU101-match0-2, CPU102-match0-2, CPU103-match0-2, Thresh=1 | Seq0_Cfg | if 1 match (Seq_Ev0), goto S1. |
| Seq_Ev1 | CPU100-match0-2, CPU101-match0-2, CPU102-match0-2, CPU103-match0-2, Thresh=2 | Seq1_Cfg | If >= 2 matches, (seq_ev1), goto S2. If seq_ev0 deasserted goto S0. Load SeqCtr 320.c |
| Seq_Ev2 | Enable | Seq2_Cfg | If Seq_ev2, goto S3 else Seq_ev1 deasserted goto S1. Enable SeqCtr 320.c |
| Seq_Ev3 | 0x0 | Seq3_Cfg | goto S0 |
| Capt Cntrl | Enable All | | |
| Offset 0 | 50 | Capt Cnt 0 | 100 |
| Offset 1 | 50 | Capt Cnt 1 | 100 |
| Offset 2 | 50 | Capt Cnt 2 | 100 |
| Offset 3 | 50 | Capt Cnt 3 | 100 |
| Post Cnt 0 | 50 | | |
| Post Cnt 1 | 50 | | |
| Post Cnt 2 | 50 | | |
| Post Cnt 3 | 50 | | |

Still other embodiments for Simultaneous Activity mode detect deadlock or other interprocessor conditions by configuring a different set of sequencer events.

Figure 27:
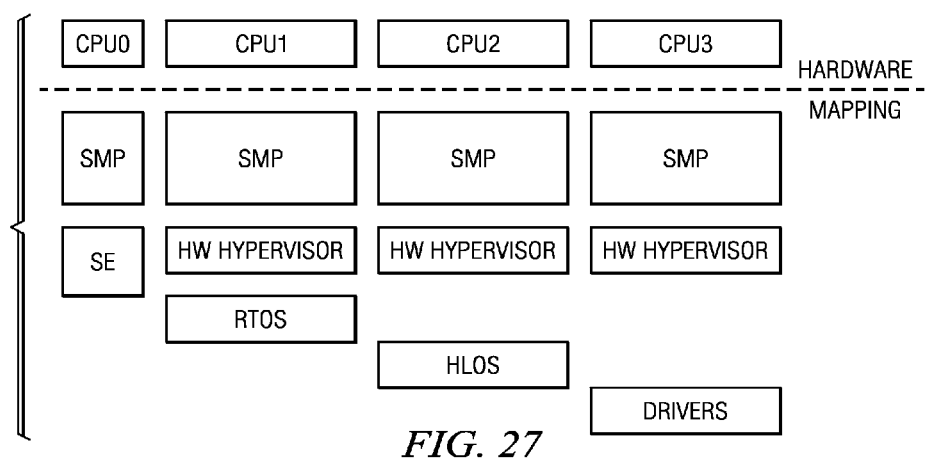
FIG. 27 is a block diagram of four-CPU hardware and software for four-core operation.

In FIG. 27, a multi-processor embodiment has the same one SMP HLOS (Symmetric Multi-Processing High Level Operating System) running on all processor 101-10x CPU cores indexed by index X, e.g. with four processors 101-103. Each CPU 10x has a hardware-supported hypervisor to share its bandwidth between the SMP HLOS and another operational category or world in the following manner. CPU0 is shared between SMP HLOS and Secure Environment using a security zone mechanism. CPU1 is shared between SMP HLOS and Modem RTOS (Real Time Operating System) using a security zone mechanism plus secure state machine SSM 2460 (FIG. 28) protected hardware hypervisor structuring. For background on such structuring, see published U.S. patent application 20070226795 (TI-61985) "Virtual Cores and Hardware-Supported Hypervisor Integrated Circuits, Systems, Methods and Processes of Manufacture," which is hereby incorporated herein by reference. CPU2 is shared between SMP HLOS and Public HLOS using security zone mechanism plus SSM hardware hypervisor structuring. CPU3 is shared between SMP HLOS and drivers such as non-GPL drivers using security zone mechanism plus SSM hardware hypervisor structuring.

In FIG. 27, the symmetric multiprocessing (SMP) core(s) have one of the cores 100-103 that is called the SMP core and designated processor 100 or CPU 100. A hardware (HW) supported secure hypervisor runs at least on the SMP core 100. Linux SMP HLOS is symmetric across all cores and is chosen as the master HLOS in some embodiments. A secure environment is provided by use of SSM 2460 of FIG. 28. The HW hypervisor mechanism provides standalone CPU virtualization in order to run a single processor based OS such as WinCE or Nucleus. The hypervisor code runs in Monitor Mode, and virtual worlds are switched from Monitor Mode. The hypervisor-mediated virtual worlds or categories are scheduled by timers in synchronous time sharing fashion. The HW secure hypervisor mechanism in some embodiments is asymmetric relative to the processor cores. In some other embodiments, a pseudo-symmetric architecture has virtual processors wherein any of the virtual processors can do SMP (symmetric multi-processing) while using a control core plus a further number n−1 (one less than n) CPU cores, also called processor cores herein. In other words, if a complete cluster has four (4) cores or processors, then the pseudo-symmetric virtual core mechanism uses an SMP cluster of 3 CPUs as processor cores with some operations conducted by the additional control core CPU 100.

The hardware hypervisor provides real time interrupt firing capability for virtual worlds to ensure RTOS capability. Any OS running in a virtual world is able to call Secure services even if the secure environment is on CPU 100 and the virtual world is running on another CPU 100-103. Any security mechanism and any hypervisor mechanism are invisible to the SMP HLOS. A minor FIQ (Fast interrupt request) latency introduction has negligible effect on the SMP HLOS performance.

Figure 28:
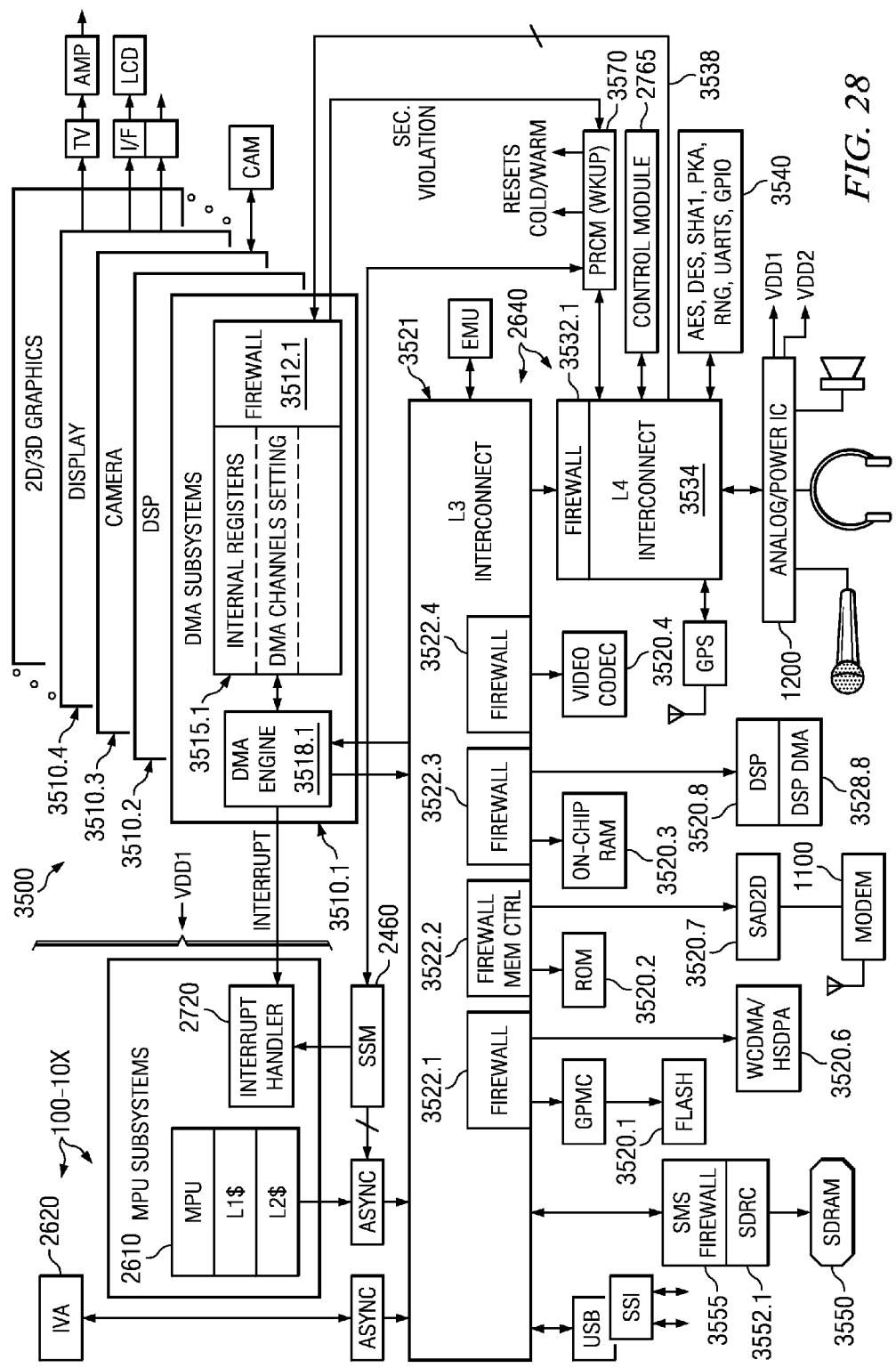
FIG. 28 is a block diagram of a combination of multiple microprocessor units (MPU) and peripheral hardware together with an emulator.

Some trace embodiments as described herein are implemented in system-on-chip hardware of FIGS. 27, 28 and 29 and the other Figures, or otherwise appropriately to form more comprehensive system-on-chip embodiments for larger device and system embodiments, as described next. In FIG. 28, a system embodiment 3500 improved as in the other Figures has one or more microprocessor unit MPU subsystem(s) and an IVA imaging, video and audio processing subsystem 2620, and DMA (Direct Memory Access) subsystems 3510.i. Each MPU subsystem suitably has one or more processors with CPUs such as RISC or CISC processors 2610, and having superscalar processor pipeline(s) with L1 and L2 caches. IVA subsystem 2620 has one or more programmable digital signal processors (DSPs), such as processors having single cycle multiply-accumulates for image processing, video processing, and audio processing. Various processors 100-10x and trace blocks 200-500 as described in the other Figures herein are suitably distributed, situated and/or allocated among some or all of the various processors in system 3500 of FIG. 28.

IVA 2620 provides multi-standard codecs for high speed and low real-estate impact (AVS, H.264, H.263, MPEG4, WMV9, RealVideo®), and MPEG4, for some examples. Also integrated are a 2D/3D graphics engine, a Mobile DDR Interface, and numerous integrated peripherals as selected for a particular system solution. The IVA subsystem 2620 has L1 and L2 caches, RAM and ROM, and hardware accelerators as desired such as for motion estimation, variable length codec, and other processing. DMA (direct memory access) performs target accesses via target firewalls 3522.i and 3512.i of FIG. 28 connected on interconnects 2640. A target is a circuit block targeted or accessed by another circuit block operating as an initiator. In order to perform such accesses the DMA channels in DMA subsystems 3510.i are programmed. Each DMA channel specifies the source location of the Data to be transferred from an initiator and the destination location of the Data for a target. Some Initiators are MPU 2610, DSP DMA 3510.2, System SDMA 3510.1, Universal Serial Bus USB HS, virtual processor data read/write and instruction access, virtual system direct memory access, display 3510.4, DSP MMU (memory management unit), and camera 3510.3. Another initiator is a secure debug access port to emulation block EMU, see also FIG. 29.

In FIG. 28, data exchange between a peripheral subsystem and a memory subsystem and general system transactions from memory to memory are handled by the System SDMA 3510.1. Data exchanges within a DSP subsystem 3510.2 are handled by the DSP DMA 3518.2. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview. Data exchange to refresh a display is handled in a display subsystem 3510.4 using a DISP (display) DMA 3518.4. This subsystem 3510.4, for instance, includes a dual output three layer display processor for 1× Graphics and 2× Video, temporal dithering (turning pixels on and off to produce grays or intermediate colors) and SDTV to QCIF video format and translation between other video format pairs. The Display block 3510.4 feeds an LCD (liquid crystal display), plasma display, DLP™ display panel or DLP™ projector system, using either a serial or parallel interface. Also television output TV and Amp provide CVBS or S-Video output and other television output types.

In FIG. 28, a hardware security architecture including SSM 2460 propagates Mreqxxx qualifiers on the interconnect 3521 and 3534. The MPU 2610 issues bus transactions and sets some qualifiers on Interconnect 3521. SSM 2460 also provides one or more MreqSystem qualifiers. The bus transactions propagate through the L4 Interconnect 3534 and line 3538 then reach a DMA Access Properties Firewall 3512.1. Transactions are coupled to a DMA engine 3518.*i* in each subsystem 3510.*i* which supplies a subsystem-specific interrupt to the Interrupt Handler 2720. Interrupt Handler 2720 is also fed one or more interrupts from Secure State Machine SSM 2460 that performs security protection functions. Interrupt Handler 2720 outputs interrupts for each processor 100-10*x*, such as MPU 2610. In FIG. 28, firewall protection by firewalls 3522.*i* is provided for various system blocks 3520.*i*, such as GPMC (General Purpose Memory Controller) to Flash memory 3520.1, ROM 3520.2, on-chip RAM 3520.3, Video Codec 3520.4, WCDMA/HSDPA 3520.6, device-to-device SAD2D 3520.7 to Modem chip 1100, and a DSP 3520.8 and DSP DMA 3528.8. A System Memory Interface SMS with SMS Firewall 3555 is coupled to SDRC 3552.1 (External Memory Interface EMIF with SDRAM Refresh Controller) and to system SDRAM 3550 (Synchronous Dynamic Random Access Memory).

In FIG. 28, interconnect 3534 is also coupled to Control Module 2765 and cryptographic accelerators block 3540 and PRCM 3570. Power, Reset and Clock Manager PCRM 3570 is coupled via L4 interconnect 3534 to Power IC circuitry in chip 1200, which supplies controllable supply voltages VDD1, VDD2, etc. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

In FIGS. 27 and 28, some embodiments have symmetric multiprocessing (SMP) core(s) such as RISC processor cores in the MPU subsystem. One of the cores is called the SMP core. A hardware (HW) supported secure hypervisor runs at least on the SMP core. Linux SMP HLOS (high-level operating system) is symmetric across all cores and is chosen as the master HLOS in some embodiments.

The system embodiments of and for FIG. 28 are provided in a communications system or other multiprocessor system and implemented as various embodiments in any one, some or all of cellular mobile telephone and data handsets, a cellular (telephony and data) base station, a WLAN AP (wireless local area network access point, IEEE 802.11 or otherwise), a Voice over WLAN Gateway with user video/voice over packet telephone, and a video/voice enabled personal computer (PC) with another user video/voice over packet telephone, that communicate with each other. A camera CAM provides video pickup for a cell phone or other device to send over the internet to another cell phone, personal digital assistant/personal entertainment unit, gateway and/or set top box STB with television TV. Video storage and other storage, such as hard drive, flash drive, high density memory, and/or compact disk (CD) is provided for digital video recording (DVR) embodiments such as for delayed reproduction, transcoding, and retransmission of video to other handsets and other destinations.

In FIG. 28, a Modem integrated circuit (IC) 1100 supports and provides wireless interfaces for any one or more of GSM, GPRS, EDGE, UMTS, and OFDMA/MIMO embodiments. Codecs for any or all of CDMA (Code Division Multiple Access), CDMA2000, and/or WCDMA (wideband CDMA or UMTS) wireless are provided, suitably with HSDPA/HSUPA (High Speed Downlink Packet Access, High Speed Uplink Packet Access) (or 1×EV-DV, 1×EV-DO or 3×EV-DV) data feature via an analog baseband chip and RF GSM/CDMA chip to wireless antenna(s). Replication of blocks and antennas is provided in a cost-efficient manner to support MIMO OFDMA of some embodiments. An audio block in an Analog/Power IC 1200 has audio I/O (input/output) circuits to a speaker, a microphone, and/or headphones as illustrated in FIG. 28. A touch screen interface is coupled to a touch screen XY off-chip in some embodiments for display and control. A battery provides power to mobile embodiments of the system and battery data on suitably provided lines from the battery pack.

DLP™ display technology from Texas Instruments Incorporated is coupled to one or more imaging/video interfaces. A transparent organic semiconductor display is provided on one or more windows of a vehicle and wirelessly or wireline-coupled to the video feed. WLAN and/or WiMax integrated circuit MAC (media access controller), PHY (physical layer) and AFE (analog front end) support streaming video. A MIMO UWB (ultra wideband) MAC/PHY supports OFDM in 3-10 GHz UWB bands for communications in some embodiments. A digital video integrated circuit provides television antenna tuning, antenna selection, filtering, RF input stage for recovering video/audio and controls from a DVB station.

Figure 29:
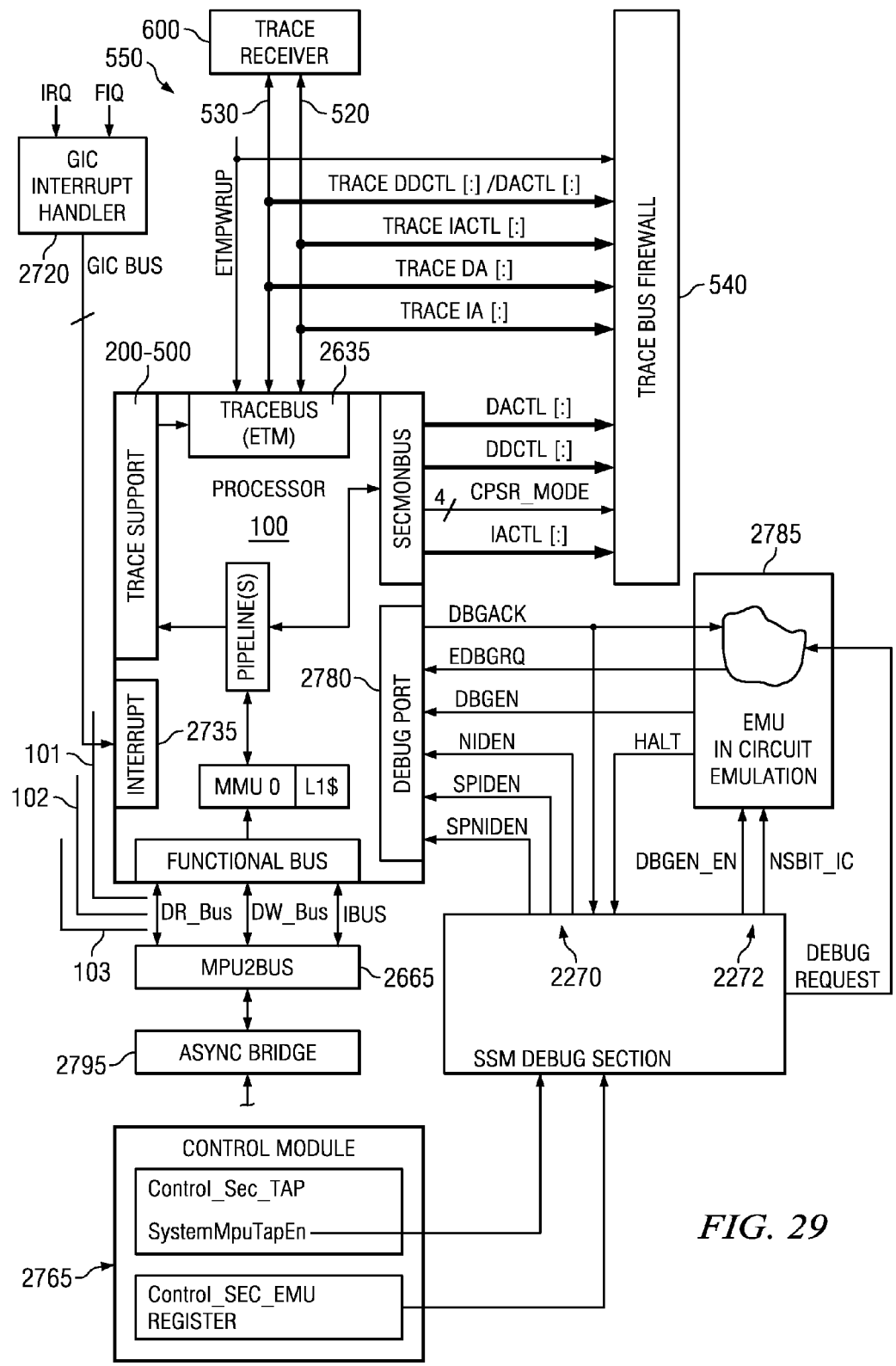
FIG. 29 is more detailed block diagram of four-CPU hardware and associated trace and debug hardware support for the four-core system of FIGS. 27 and 28.

In FIG. 29, processors 100-10*x* are supported by trace/debug and other blocks of FIG. 29 and the other Figures herein. A block called a Generalized Interrupt Handler GIC 2720 is provided to handle interrupts that can be selectively masked and routed to respective GIC Bus 0-3 ports corresponding to each of the CPU cores CPU 100-103. The Interrupt architecture, for example, optionally has SFIQ input. Some ordinary interrupts IRQ are reserved for SMP HLOS in some embodiments. Public FIQ can be used with SMP HLOS of Public Non-virtual mode. Other modes (Public Virtual, Secure Non-virtual and Secure Virtual) use exclusively Secure FIQ to preempt the SMP HLOS. Some embodiment do not differentiate interrupt lines activated by and assigned to Virtual modes from interrupt lines activated by and assigned by Non-virtual modes at GIC level. Each interrupt line from many possible interrupt lines to GIC interrupt handler 2720 is tagged to the Public Normal, Public Virtual, Secure Normal or Secure Virtual mode. A Security zone mechanism (SZ) traps any FIQ in Monitor Mode. The Monitor code is written to identify to which category (Public Non-virtual, Public Virtual, Secure Non-virtual or Secure Virtual) the FIQ belongs. To do this, the Monitor code reads the GIC 2720 qualifier MreqSecure (Secure or Public FIQ) and then reads the SSM 2460 qualifier MreqSystem (Non-virtual or Virtual). Using the identified mode information, the Monitor code switches operations to a specific processor 10x. A shared Snoop Control Unit (not shown) supports cache coherency.

In some embodiments, the security zone mechanism is implemented on all CPUs 100-103 of the cluster. The Secure Kernel and its secure services run specifically on CPU 100, which operates as a master CPU. CPU 100 is the first CPU core to boot and to setup or configure the hypervisor structure. CPU cores other than CPU 100 have a small secure kernel that includes a Monitor Mode implementation to forward SMI/WFI (Software Monitor Interrupt SMI or Wait for Interrupt WFI). SMI/WFI are generated by a virtual OS kernel (WinCE, RTOS) as Secure fast interrupt SFIQ. SFIQ is coupled to the secure hypervisor in Monitor Mode operating on the master CPU 100 core, which executes or drives hypervisor scheduling. The hypervisor scheduling on master CPU 100 core is unnecessary on the other CPU cores, which simplifies this embodiment. The Security Monitor bus SECMON interface for each processor 10x is accessible by the SSM 2460. The CPU cores 10x in some embodiments have circuitry for establishing various privilege modes such as some or all of Monitor, Supervisor, System, FIQ mode, IRQ mode, Abort mode, Undefined mode, and a non-privilege mode such as a User mode. A Wait for Interrupt WFI instruction is trapped into Monitor Mode as a SWI software interrupt exception, if and as-configured on a CPU-specific basis. In some embodiments, all clocks and timers for various processors and blocks operate in a synchronous mode, and are either synchronous at the same clock rate or clock frequency or run at clock rates that are exact multiples of each other and have coinciding clock edges at the lower or lowest clock rate. All clocks and timers, including watchdog timers, are programmable by CPU 100 to support the hypervisor scheduling.

Various signal designators are used in connection with the coupling to busses. The signal designators are composites build up from abbreviations and interpreted according to the following Glossary TABLE 11.

TABLE 11

GLOSSARY

| Abbreviation | Remarks |
|---|---|
| A | Address |
| CLK | Clock |
| D | Data |
| EN | Enable |
| I | Instruction (bus) |
| W | Write |
| R | Read |
| Supervisor Mode | Processor non-user mode for interruptions, exception, operatings system, etc. |
| CPSR_Mode | User or Exception Mode bit in MPU core CPSR register. Processor hardware signals to indicate in which mode the processor core is evolving in, taken from Execute stage of processor pipeline. |
| SECMON | Security monitor bus coupled to processor core and SSM 2460 hardware-support for hypervisor. |
| MPU2BUS | MPU bus bridge to a bus protocol for a bus outside of MPU processor core. |
| TRACE | Embedded trace macrocell 600 allows tracing code executed and data transferred, example is ETM. |
| TRACEPWRUP | TRACE Power Up activates a TRACE interface to each MPU 10x. Trace is enabled only when emulation is needed. For security purposes, TRACE from MPU is output on SECMON bus to SSM Debug Section of FIG. 29. |
| TRACEIA[ ] | TRACE instruction address. Virtual address of the instruction executed by the processor at writeback WB stage plus one in the MPU pipeline. |
| TRACEIACTL[ ] | Execution status of the instruction executed by each MPU at writeback WB stage plus one in the pipeline. |
| TRACEDDCTL[:] | Trace data data control. |
| TRACEDACTL[ ] | Trace data address control |
| TRACEDA[:] | Trace data address |
| PRCM | Power, resets, and clocks manager |
| NSBIT_IC | CP15S_NS transferred to In-Circuit emulation block 2785. |
| DBGACK | Asserted when the MPU is Halted subsequently to a debug request taken when DSCR = HALT mode. |
| EDBGRQ | External debug request to Halt processor(s) (handshake reply is DBGACK) |
| DBGEN | Debug enable (MPU Halt or Real-Time Debugging mode) |
| NIDEN | Non-Intrusive Debug NID enable for MPU to supply a trace output to Trace receiver 600 |
| SMI | MPU instruction to switch to Monitor Mode, a secure mode. |
| SPIDEN | in-circuit emulation secure privileged intrusive debug enable, debug in Secure Supervisor Mode |
| SPNIDEN | TRACE secure privileged non-intrusive debug enable for MPU to supply a trace output in Secure Supervisor mode |
| SUNIDEN: | TRACE secure user non-intrusive debug enable for MPU to supply a trace output in Secure User mode |
| SystemMpuTapEn | Enable from System microprocessor MPU 100 or external computer to JTAG debug TAP (test access port) controller |

FIG. 29 shows an SSM Debug Section 2770, 2772. The SSM Debug Section is coupled to the MPU 2610 via debug port 2780 and to an in-circuit emulation block 2785. The Core Power Domain includes the Control Module 2765 coupled to the SSM Debug Section. The Control Module 2765 has a secure control over a TAP (e.g., JTAG 1149.1 Test Access Port for serial scan) via a TAP enable field designated SystemMpuTapEn in a Control_SEC_TAP register.

In-circuit Emulator 2785 is coupled to the TAP controller which in turn controls and selects serial scan chains that are built into each processor 10x in predetermined core areas. These serial scan chains, and other emulation and testability features, obtain bits from each processor 10x that represent a selected portion of the processor state (also called the image). Some background information on this type of technology is provided in U.S. Pat. No. 5,329,471, "Emulation Devices, Systems And Methods Utilizing State Machines," which patent is hereby incorporated herein by reference. The processor state is selectively coupled to an emulation and testability host computer.

Emulation security and privilege modes are established by configurable entries in a register Control_SEC_EMU. Various debug modes are provided and have names to correspond with various Boolean combinations of two or more of the Mreqxxx qualifiers. ForceDAP< > entries in register Control_SEC_EMU are used to establish and control the MreqInfo qualifiers for debug purposes. Different trace/debug modes are configurable by a combination of Control Module 2765 registers, SSM registers 2620 and MPU registers (e.g., CP15S_, DSCR) configuration fields or bits establishing the different debug modes.

An invasive debug mode is activated by setting DBGEN active. Invasive debug mode couples the SSM Debug Section 2770, 2772 with the in-circuit emulator 2785 and/or a Trace receiver 600 of FIG. 29. Invasive debug is used for debug of a halted system or running system, using watch points and break points. A Real Monitor Mode and a Halt Mode are software configurable when DBGEN is active. The configurable signal System MPU TAP En sets enable DBGEN_EN active to activate DBGEN from Emulator 2785. The type of debug mode is set in a processor 10x Debug Status and Control Register (DSCR) using debug mode bits. Hardware halting of each processor 10x in debug mode operates when an external debug request (e.g. EDBGRQ) is received from Emulator 2785. Processor 10x responds with the DBGACK debug acknowledge signal active, and processor 10x is halted. DBGACK is coupled to both Emulator 2785 and to SSM Debug Section 2770. MPU core(s) 10x are halted on specific addresses, events or instructions in some multiprocessor embodiments as described herein. Halt mode debugging halts processor 10x to collect information and invasively allows changing processor and coprocessor state.

A Non-Invasive Debug (NID) observational mode, also called real-time debugging here, is established by setting a trace enable signal NIDEN active. Real-time debugging is established by suitable values in register DSCR and is used to collect information in situations in which processor 10x is not halted. Processor 10x is caused to take a Debug Exception instead of halting and a software module called a monitor target can then take control to examine or alter the processor state. The SSM Debug Section is coupled with the Trace block 600. A trace export from each processor 10x to the Trace block 600 occurs when NIDEN is activated. Non-invasive debug mode permits data observation of a running system through trace, performance monitoring, and program counter (PC) sampling from processors 10x according to embodiments as described for the other Figures herein.

In FIG. 29, a trace instruction bus 520 at port 2635 couples the MPU 2610 to Trace receiver 600. A Trace data bus 530 conveys the results of actual execution in any selected one, some or all processors 10x, such as from a writeback execution stage of the processor 10x pipeline. A Trace bus firewall 540 is coupled to the trace instruction bus 520 and trace data bus 530 to hardware-protect the Monitor Mode from security compromise. This firewall 540 is coupled to receive and check trace information from each processor 10x via the trace instruction bus 520. Control Module registers are coupled to this hardware 540, which re-creates or specifies Monitor code virtual address ranges or spaces for instruction fetch and data transfer (relating to Monitor Stack(s), Monitor code ROM location and via a Peripheral Port as addressable spaces) and checks that the instructions fetched from L1/L2 Caches and ROM locations correspond to what is expected.

The Trace Instruction Address bus TRACEIA outputs virtual addresses that have been executed or generated by processor(s) 10x at writeback execute stage in the pipeline. The Trace Instruction Address bus 520 is qualified by Trace instruction address control IACTL information available on the SECMON Bus. The SECMON Bus also outputs the CPSR modes from the writeback execute stage itself in the pipeline, thereby checking and promoting the coherency of the information and the reliability of the information used for the checking Certain Trace bus control signals for Trace instruction address control IACTL, Trace data address control TRACEDACTL and Trace data data control DDCTL are used to ascertain and control that the instruction execution and data transfer are valid. In this way, the instructions fetched from L1/L2 Caches and ROM locations are properly executed.

In FIG. 29, a Trace DA bus 530 outputs the virtual addresses of the Data that has been manipulated by the processor 10x at an Add execute pipeline stage. The TRACEDA bus is qualified by Trace DACTL lines in FIG. 29, such as on SECMON Bus at Add stage in the pipeline so that the checking occurs when a line indicates that a data item is present and another line indicates that the data is not a coprocessor access. A Trace DDCTL bus performs Data transfer as addresses are output on the Trace DA bus. Data transfer in Monitor Mode involves SECMON bus lines corresponding to Trace DDCTL so that when a data item is present, other bus lines indicate that no data write failed and no imprecise data abort occurred.

Figure 30:
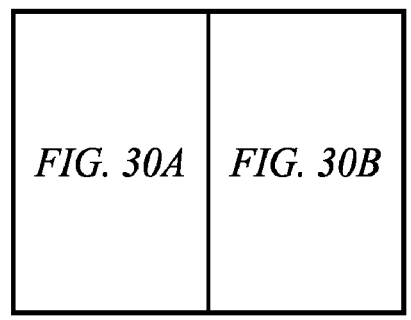
FIG. 30 is a composite block diagram composed of FIGS. 30A and 30B together showing a combination of circuits of FIGS. 5, 6A-1, 6A-2, 6A-3, 8, 18 and 20.
Figure 30B:
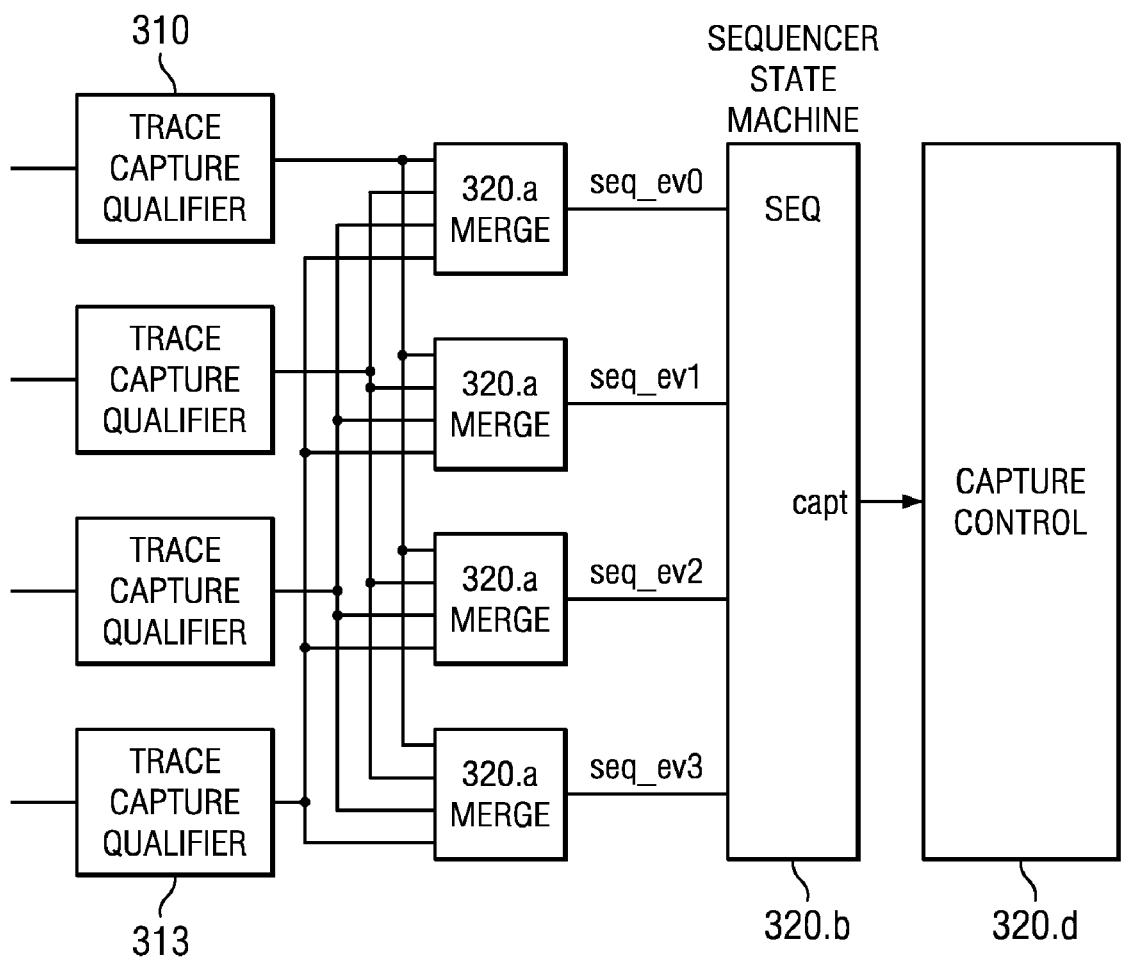
Figure 30A:
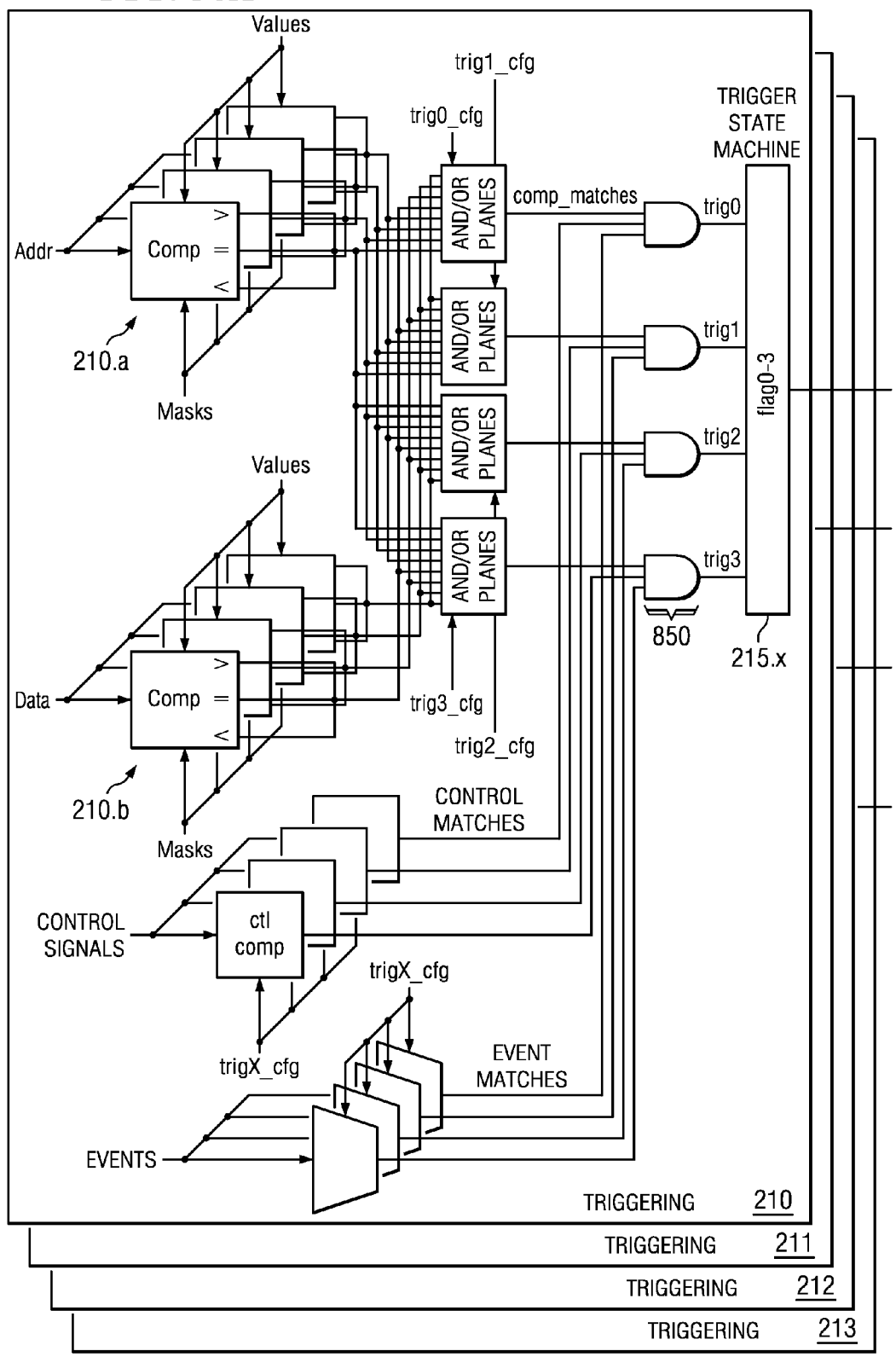

FIG. 30 is a composite block diagram composed of FIGS. 30A and 30B, which together show a combination of circuits from FIGS. 5, 6A-1, 6A-2, 6A-3, 8, 18 and 20. FIG. 30 diagrammatically ties most of the triggering logic together and illustrates how each trigger has access to all of the comparators. FIG. 30 represents the triggers, flags and sequencer events Seq_evx and shows their connectivity and programmability.

Various embodiments are used with one or more microprocessors, each microprocessor having a pipeline, and selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

Various embodiments as described herein are manufactured in a process that prepares RTL (register transfer language) and netlist for a particular design including circuits of the Figures herein in one or more integrated circuits or a system. The design of the trace circuitry and other hardware is verified in simulation electronically on the RTL and netlist. Verification checks contents and timing of registers, operation of trace hardware circuits under various configurations and described modes and hardware to be traced in different scenarios such as semaphores, handles, buffers, message queues, shared peripherals, or other shared data structures and data trace of multiple processors, real-time and non-real-time operations, events and interrupts, responsiveness to transitions through modes, sleep/wakeup, and various attack scenarios. When satisfactory, the verified design dataset and pattern generation dataset go to fabrication in a wafer fab and packaging/assembly produces a resulting integrated circuit and tests it with real time video. Testing verifies operations directly on first-silicon and production samples such as by using scan chain methodology on registers and other circuitry until satisfactory chips are obtained. A particular design and printed wiring board (PWB) of the system unit, has one or more peripherals coupled to the processors and can have a user interface coupled to the processors. A storage, such as SDRAM and Flash memory is coupled to the system and has configuration values, macros and parameters and has software, e.g., a hypervisor, a real-time operating system RTOS, image codec-related software HLOS, protected applications (PPAs and PAs), and/or other supervisory software and applications. System testing tests operations of the integrated circuit(s) and system in actual application for efficiency and satisfactory operation of fixed or mobile display for continuity of content, phone, e-mails/data service, web browsing, voice over packet, content player for continuity of content, camera/imaging, audio/video synchronization, and other such operation that is apparent to the human user and can be evaluated by system use. Also, various attack scenarios are applied. If further increased efficiency is called for, the values, macros and parameter(s) are reconfigured for further testing. Adjusted configurations and parameter(s) are loaded into the Flash memory or otherwise, components are assembled on PWB to produce resulting system units.

Aspects (See explanatory notes at end of this section)

1A. The electronic circuit claimed in claim 1 wherein at least one of said first and second triggering circuits includes a comparator circuit operable to compare addresses or data from at least one of said first and second processors with at least one configurably-specified value.

1B. The electronic circuit claimed in claim 1 wherein said cross trace circuit is also operable to respond when one of the particular processing operations of said first processor is concurrent with another said processing operation of said second processor.

1C. The electronic circuit claimed in claim 1 wherein said cross trace circuit includes a capture control circuit having a first control output coupled to said first trace buffer and a second control output coupled to said second trace buffer.

1D. The electronic circuit claimed in claim 1 wherein said first and second triggering circuits each include a sequencer circuit operable to detect occurrence of a configurably-specified sequence of operations of said first and second processors respectively and to output respective flag signals to said cross trace circuit.

1E. The electronic circuit claimed in claim 1 further comprising a pipeline flattener coupled between each said processor and each said trace buffer respectively.

1F. The electronic circuit claimed in claim 1 further comprising an encoder circuit operable to compress trace information derived from said first and second processors.

9A. The trace circuit claimed in claim 9 wherein said merge circuit includes a pattern recognition circuit.

9B. The trace circuit claimed in claim 9 wherein said merge circuit further includes a mask circuit and a mask register coupled to said mask circuit.

9C. The trace circuit claimed in claim 9 further comprising a capture circuit operable in association with the configurable sequencer circuit to control the delivery from at least two selected ones of said trace buffers consecutively as the trace output.

9CA. The trace circuit claimed in claim 9C further comprising an asynchronous interface coupled between at least one of said trace buffers and said capture circuit.

9D. The trace circuit claimed in claim 9 further comprising an encoder circuit coupled to said trace buffers and operable to compress trace information.

9E. The trace circuit claimed in claim 9 wherein said sequencer circuit has a plurality of possible states and is operable to perform a transition from a current state among said plurality of possible states to a new state among said plurality of possible states in response to at least one of the event signals from said merge circuit.

9EA. The trace circuit claimed in claim 9E further comprising a sequencer configuration register having a configuration field corresponding to the current state and a said event signal from said merge circuit, the configuration field for holding a representation of the new state to which said sequencer circuit can make a transition from the current state in response to the said event signal from said merge circuit.

9F. The trace circuit claimed in claim 9 wherein said trace circuit is integrated onto a single integrated circuit chip having pins and said trace circuit further comprising a trace export unit operable to communicate said trace output to at least one of said pins.

9G. The trace circuit claimed in claim 9 wherein said trace circuit is integrated onto a single integrated circuit chip including an in-circuit emulator coupled with said trace circuit.

9H. The trace circuit claimed in claim 9 wherein said trace circuit is integrated onto a single integrated circuit chip including a test access port coupled with said trace circuit.

9J. The trace circuit claimed in claim 9 further comprising an asynchronous interface coupled between at least one of said trace buffers and said sequencer circuit.

9K. The trace circuit claimed in claim 9 further comprising a plurality of processor circuits coupled to said trace buffers and to said trace trigger circuits.

9KA. The trace circuit claimed in claim 9K wherein at least one of said trace buffers is operable on a common clock with at least one of said processor circuits.

9KB. The trace circuit claimed in claim 9 wherein one or more of said processor circuits has a pipeline selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), and 10) multiple instruction multiple data (MIMD).

9L. The trace circuit claimed in claim 9 further comprising at least one peripheral coupled to at least one of said trace trigger circuits and selected from the group consisting of 1) DMA circuit, 2) wireless modem, 3) wireline modem, 4) user interface, 5) camera circuit, 6) video circuit, 7) tuner circuit.

12A. The buffer circuit claimed in claim 12 further comprising a processor circuit coupled to deliver a stream of information to said dual port memory.

12B. The buffer circuit claimed in claim 12 further comprising a capture state machine operable to selectively actuate the read.

18A. The processor debug circuit claimed in claim 18 wherein said multiple modes include a mode for said electronic circuit to periodically collect information over a respective interval of operation from each of said plural electronic processors.

18B. The processor debug circuit claimed in claim 18 wherein the debug-related response includes a noninvasive debug response.

18C. The processor debug circuit claimed in claim 18 wherein the debug-related response includes at least temporarily halting said plural electronic processors.

18D. The processor debug circuit claimed in claim 18 wherein said plural electronic processors include program counters and said electronic circuit is operable to cross trace and provide simultaneous samples of values from said program counters.

18E. The processor debug circuit claimed in claim 18 wherein said electronic circuit is operable in response to that detection to capture trace data from one or more selected processors among said plural electronic processors, as at least part of the debug-related response.

23A. The processor debug circuit claimed in claim 23 wherein that mode is operable to detect a deadlock between said first processor and said second processor.

23B. The processor debug circuit claimed in claim 23 wherein said first sequence includes a get-resource operation by said first processor followed by a grant of a first resource to said first processor.

23BA. The processor debug circuit claimed in claim 23B wherein said mode includes further monitoring for another sequence including a get-resource operation by said first processor followed by grant of a second resource to said first processor, and said electronic circuit includes a counter and said first sequence further includes a timeout by said counter on the further monitoring.

23BB. The processor debug circuit claimed in claim 23B wherein said mode further includes monitoring for another sequence including a get-resource operation by said first processor followed by a grant of a second resource to said first processor, and upon detection of said another sequence after said first sequence then canceling detection of the first sequence.

23B1. The processor debug circuit claimed in claim 23B wherein said second sequence includes a get-resource operation by said second processor followed by grant of a second resource to said second processor.

23B1A. The processor debug circuit claimed in claim 23B1 wherein said mode includes further monitoring for another sequence including a get-resource operation by said first processor followed by grant of the second resource to said first processor, and said electronic circuit includes a counter and said first sequence further includes a timeout by said counter on the further monitoring.

24A. The processor debug circuit claimed in claim 24 wherein the mode identifiers represent one or more modes selected from the group consisting of: 1) a periodic sampling mode, 2) a shared data mode, 3) an event sampling mode, and 4) a simultaneous activity mode.

25A. The processor debug circuit claimed in claim 25 wherein said plural electronic processors include at least one program counter and wherein said electronic circuit is also operable to detect when any pair of said processors in a configurably-specified subset are concurrently executing operations in a configurably-specified program counter address range.

25B. The processor debug circuit claimed in claim 25 wherein the detection by said electronic circuit is based on any one or more occurrences of configurably specified activity by at least one of said processors associated with absence of a configurably specified activity by at least one other one of said processors.

25B1. The processor debug circuit claimed in claim 25B wherein said electronic circuit is operable in response to that detection to capture trace data from one or more selected processors among said plural electronic processors, as at least part of the debug-related response.

29A. The processor debug circuit claimed in claim 29 wherein said electronic circuit is operable in the same mode to ignore a sequence wherein the one said processor writes to the address and then the other said processor reads the data from that address before said counter can time out.

30A. The processor debug circuit claimed in claim 30 wherein said electronic circuit includes a counter and said electronic circuit is operable to monitor for a configurably-specified operation by at least one of the other processors subsequent to the configurably-specified sequence by said one processor, and said occurrence further includes a timeout by said counter on an interval while said electronic circuit is doing the monitoring for the configurably-specified operation by said at least one of the other processors subsequent to the configurably-specified sequence by said one processor.

32A. The processor debug circuit claimed in claim 32 wherein said configurably-specified operation includes a get-task operation.

33A. The telecommunications apparatus claimed in claim 33 further comprising a display coupled to said applications integrated circuit.

34A. The telecommunications apparatus claimed in claim 34 further comprising a host computer at least temporarily coupled to said electronic circuit and operable to analyze the captured trace data.

36A. The processor debug method claimed in claim 36 wherein the detecting includes detecting a sequence of operations of at least two of the processors indicative of a deadlock between said at least two of the processors, and the debug-related response includes capturing information from at least one of the at least two of the processors.

36B. The processor debug method claimed in claim 36 for use with program counters in the plural electronic processors and the detecting includes cross tracing, and the debug-related response includes providing simultaneous samples of values from said program counters.

36C. The processor debug method claimed in claim 36 wherein the debug-related response includes capturing only data from one or more selected processors when processors interact.

40A. The electronic circuit claimed in claim 40 wherein the debug condition includes an interprocessor deadlock condition.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable.

Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention can be made. The terms "including", "includes", "having", "has", "with", or variants thereof are used in the detailed description and/or the claims to denote non-exhaustive inclusion in a manner similar to the term "comprising". The appended claims and their equivalents cover any such embodiments, modifications, and embodiments as fall within the scope of the invention.

What is claimed is:

1. An electronic circuit comprising:
a first processor operable to perform processing operations;
a first trace buffer coupled to said first processor;
a first triggering circuit coupled to said first processor, said first triggering circuit operable to detect a specified sequence of particular processing operations in said first processor;
a second processor;
a second trace buffer coupled to said second processor;
a second triggering circuit coupled to said second processor, said second triggering circuit operable to detect at least one other processing operation in said second processor; and
a cross trace circuit having a trace output and having inputs coupled to said first triggering circuit and to said second triggering circuit, said cross trace circuit configurably operable to respond to a sequence including both a detection of the sequence of particular processing operations of said first processor by said first triggering circuit and a detection of the at least one other processing operation of said second processor by said second triggering circuit, to couple at least one of said first trace buffer and said second trace buffer to said trace output, wherein said first and second triggering circuits and said cross trace circuit each include a configurable state machine circuit.

2. An electronic circuit comprising:
a first processor operable to perform processing operations;
a first trace buffer coupled to said first processor;
a first triggering circuit coupled to said first processor, said first triggering circuit operable to detect a specified sequence of particular processing operations in said first processor;
a second processor;
a second trace buffer coupled to said second processor;
a second triggering circuit coupled to said second processor, said second triggering circuit operable to detect at least one other processing operation in said second processor; and
a cross trace circuit having a trace output and having inputs coupled to said first triggering circuit and to said second triggering circuit, said cross trace circuit configurably operable to respond to a sequence including both a detection of the sequence of particular processing operations of said first processor by said first triggering circuit and a detection of the at least one other processing operation of said second processor by said second triggering circuit, to couple at least one of said first trace buffer and said second trace buffer to said trace output, wherein said cross trace circuit includes a merge logic circuit coupled to said first triggering circuit and to said second triggering circuit, a state machine circuit coupled to said merge logic circuit, and a capture control circuit coupled to said state machine circuit and to said first trace buffer and said second trace buffer.

3. An electronic circuit comprising:
a first processor operable to perform processing operations;
a first trace buffer coupled to said first processor;
a first triggering circuit coupled to said first processor, said first triggering circuit operable to detect a specified sequence of particular processing operations in said first processor;
a second processor;
a second trace buffer coupled to said second processor;
a second triggering circuit coupled to said second processor, said second triggering circuit operable to detect at least one other processing operation in said second processor; and
a cross trace circuit having a trace output and having inputs coupled to said first triggering circuit and to said second triggering circuit, said cross trace circuit configurably operable to respond to a sequence including both a detection of the sequence of particular processing operations of said first processor by said first triggering circuit and a detection of the at least one other processing operation of said second processor by said second triggering circuit, to couple at least one of said first trace buffer and said second trace buffer to said trace output, wherein said cross trace circuit is further operable to isolate said first trace buffer and said second trace buffer from said trace output until there occur both the detection of the particular processing operations of said first processor and the detection of the another processing operation of said second processor.

4. an electronic circuit comprising:
a processing circuit including a plurality of processor cores and operable to perform processing operations and generate addresses and data;
a first storing circuit having a first configuration field for holding a reference value;
a comparing circuit responsive to said first storing circuit and to said processing circuit to generate a trigger signal depending on a comparison of an address from said processing circuit with the reference value;
a first state machine circuit operable in a given state among a plurality of possible states, and operable to transition from the given state to a previously presented state among said plurality of possible states in response to the trigger signal;
a second storing circuit having a second configuration field corresponding to the given state and the trigger signal, the second configuration field for holding a representation of the previously presented state to which said first state machine circuit can transition from the given state in response to the trigger signal, and said first and second storing circuits, said comparing circuit, and said first state machine circuit each have circuit portions corresponding to the processor cores respectively; and
a trace circuit that includes mask logic circuits respectively coupled to said first state machine circuit portions and further includes a second state machine circuit coupled to said mask logic circuits and operable to generate a trace capture signal upon an occurrence of a configurably-specified sequence of operations by at least two of said processor cores.

5. The electronic circuit claimed in claim 4 further comprising a third storing circuit having a third configuration field corresponding to a given state of said second state machine circuit and an input from at least one of said mask logic circuits, the third configuration field for holding a representation of a next state to which said second state machine circuit is to make the transition from its given state in response to the input from said mask logic.

6. A trace circuit comprising:
a plurality of trace buffers;
a plurality of trace trigger circuits;
a merge circuit that includes a sum-threshold circuit having a configurable threshold, and said merge circuit having inputs coupled to said plurality of trace trigger circuits and operable to form event signals in response to any subset of said plurality of said trigger circuits wherein the subset includes a number of said trigger circuits specified by the configurable threshold; and
a sequencer circuit operable to deliver a trace output from a selected one or more of said trace buffers in response to a configurable sequence of the event signals from the merge circuit.

7. The trace circuit claimed in claim 6 wherein said merge circuit includes an electronic neural network.

8. The trace circuit claimed in claim 6 further comprising a configurable time counter coupled with said sequencer circuit to configurably transition said sequencer circuit upon timeout of said counter.

9. The trace circuit claimed in claim 6 wherein said merge circuit includes a pattern recognition circuit.

10. The trace circuit claimed in claim 6 wherein said merge circuit further includes a mask circuit and a mask register coupled to said mask circuit.

11. The trace circuit claimed in claim 6 further comprising a capture circuit operable in association with the sequencer circuit to control delivery from at least two selected ones of said trace buffers consecutively as the trace output.

12. The trace circuit claimed in claim 11 further comprising an asynchronous interface coupled between at least one of said trace buffers and said capture circuit.

13. The trace circuit claimed in claim 6 wherein said sequencer circuit has a plurality of possible states and is operable to perform a transition from a current state among said plurality of possible states to a previously presented state among said plurality of possible states in response to at least one of the event signals from said merge circuit.

14. The trace circuit claimed in claim 13 further comprising a sequencer configuration register having a configuration field corresponding to the current state and a said event signal from said merge circuit, the configuration field for holding a representation of the previously presented state to which said sequencer circuit can make a transition from the current state in response to the said event signal from said merge circuit.

15. The trace circuit claimed in claim 6 wherein said trace circuit is integrated onto a single integrated circuit chip having pins and said trace circuit further comprising a trace export unit operable to communicate said trace output to at least one of said pins.

16. The trace circuit claimed in claim 6 wherein said trace circuit is integrated onto a single integrated circuit chip including an in-circuit emulator coupled with said trace circuit.

17. The trace circuit claimed in claim 6 wherein said trace circuit is integrated onto a single integrated circuit chip including a test access port coupled with said trace circuit.

18. The trace circuit claimed in claim 6 further comprising an asynchronous interface coupled between at least one of said trace buffers and said sequencer circuit.

19. The trace circuit claimed in claim 6 further comprising a plurality of processor circuits coupled to said trace buffers and to said trace trigger circuits.

20. The trace circuit claimed in claim 19 wherein at least one of said trace buffers is operable on a common clock with at least one of said processor circuits.

21. The trace circuit claimed in claim 6 wherein one or more of said processor circuits has a pipeline selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), and 10) multiple instruction multiple data (MIMD).

22. The trace circuit claimed in claim 6 further comprising at least one peripheral coupled to at least one of said trace trigger circuits and selected from the group consisting of 1) DMA circuit, 2) wireless modem, 3) wireline modem, 4) user interface, 5) camera circuit, 6) video circuit, 7) tuner circuit.

23. A buffer circuit comprising:
a plurality of processors;
trace circuitry for providing trace information with respect to processing activity of each processor, and in response to a trigger event for each processor, of said plurality of processors;
a dual port memory for receiving said trace information and having a write clock input and a read clock input;
a read circuit including a counter circuit coupled to read selected information from said dual port memory, said read circuit having an input and responsive to a signal at the input for actuating a read;
an offset register field coupled to said read circuit to configure a read of a first amount of information from said dual port memory, said first amount corresponding to an offset value in the offset register field and written over an interval prior to a trigger event giving rise to actuating the read; and
a post count register field coupled to said read circuit to configure a read of
a second amount of information from said dual port memory, said second amount corresponding to a post count value in the post count register field and written over an interval subsequent to a trigger event giving rise to actuating the read.

24. The buffer circuit claimed in claim 23 further comprising a write clock coupled to the write clock input and a read clock coupled to the read clock input wherein said write clock and said read clock have different clock rates.

25. The buffer circuit claimed in claim 23 further comprising a trace circuit operable to selectively actuate the read.

26. The buffer circuit claimed in claim 23 further comprising a processor circuit coupled to deliver a stream of information to said dual port memory.

27. The buffer circuit claimed in claim 23 further comprising a capture state machine operable to selectively actuate the read.

28. A trace combiner circuit for handling a cross trace event of multiple processors that produce signals, the trace combiner circuit comprising:
   plural buffers to hold at least some of the signals;
   a capture state machine coupled to sequentially drain said buffers when actuated;
   a cross trace circuit that includes a cross trace sequencer state machine operable to actuate said capture state machine in case of a cross trace event; and
   a multiplexing circuit having a trace output and responsive to said capture state machine to sequentially couple said buffers to the trace output in coordination with the sequential draining of said buffers.

29. The electronic circuit claimed in claim 28 wherein said capture state machine is operable to drain a buffer sequence of selected ones of fewer than all the plural buffers.

30. The electronic circuit claimed in claim 28 wherein said capture state machine is operable in a selected sequence to sequentially drain a first configurable amount of data from a first said buffer and then a second configurable amount of data from a second said buffer.

31. A processor debug circuit comprising:
   plural electronic processors for performing operations; and
   an electronic circuit operable to monitor the operations of said plural electronic processors, said electronic circuit configurable for multiple modes including at least one mode to detect a configurably-specified sequence pertaining to operations across at least two of said plural electronic processors and initiate a debug-related response wherein said electronic circuit in that at least one mode is operable on such detection to output information from any selected subset of one or more of said plural processors; and
   further comprising a mode decoder coupled to said electronic circuit and operable to convert mode identifiers representing the modes into configurations for said electronic circuit, whereby to implement the modes that the mode identifiers represent.

32. The processor debug circuit claimed in claim 31 wherein the mode identifiers represent one or more modes selected from the group consisting of: 1) a periodic sampling mode, 2) a shared data mode, 3) an event sampling mode, and 4) a simultaneous activity mode.

33. A processor debug circuit comprising:
   plural electronic processors for performing operations; and
   an electronic circuit operable to detect an instance when any processor in a configurably-specified subset of processors among said plurality is executing configurably-specified operations in excess of a configurably-specified amount of time, and further operable to initiate a debug-related response; and
   wherein said electronic circuit includes a configurable counter and is operable to monitor for a write to and a read from an address and detect a sequence wherein one said processor writes to the address and then said counter times out while said electronic circuit is monitoring for the read by another said processor from that address.

34. The processor debug circuit claimed in claim 33 wherein that detection is conditioned on an occurrence of at least one configurably-specified operation by another processor among said plurality.

35. The processor debug circuit claimed in claim 33 wherein said plural electronic processors include at least one program counter and wherein that detection includes detection of an instance when any processor in the configurably-specified subset of processors among said plurality is executing operations in a configurably-specified program counter address range in excess of the configurably-specified amount of time.

36. The processor debug circuit claimed in claim 33 wherein said electronic circuit is also operable to detect a sequence of operations of at least two of said processors indicative of a deadlock between said at least two of said processors, and wherein the debug-related response includes operation to capture information from at least one of said at least two of said processors.

37. The processor debug circuit claimed in claim 33 wherein said plural electronic processors include at least one program counter and wherein said electronic circuit is also operable to detect when any pair of said processors in a configurably-specified subset are concurrently executing operations in a configurably-specified program counter address range.

38. The processor debug circuit claimed in claim 33 wherein the detection by said electronic circuit is based on any one or more occurrences of configurably specified activity by at least one of said processors associated with absence of a configurably specified activity by at least one other one of said processors.

39. The processor debug circuit claimed in claim 33 wherein said electronic circuit is operable in the same mode to ignore a sequence wherein the one said processor writes to the address and then the other said processor reads the data from that address before said counter can time out.

40. A processor debug circuit comprising:
   plural electronic processors for performing operations; and
   an electronic circuit operable to monitor the operations of said plural electronic processors, said electronic circuit operable to detect an occurrence including a configurably-specified sequence of operations by a first one of said processors and then in response to detecting the occurrence to capture information from at least one of only the other processors among said plural electronic processors while for the occurrence not collecting information from the first one of said processors.

41. The processor debug circuit claimed in claim 40 wherein the occurrence further includes a configurably-specified operation by said at least one of the other processors subsequent to the configurably-specified sequence of operations by said one processor.

42. The processor debug circuit claimed in claim 40 wherein said electronic circuit includes a counter and said electronic circuit is operable to monitor for a configurably-specified operation by at least one of the other processors subsequent to the configurably-specified sequence by said one processor, and said occurrence further includes a timeout by said counter on an interval while said electronic circuit is doing the monitoring for the configurably-specified operation by said at least one of the other processors subsequent to the configurably-specified sequence by said one processor.

43. A processor debug circuit comprising:
   plural electronic processors for performing operations; and
   an electronic circuit operable to monitor the operations of said plural electronic processors, said electronic circuit operable to detect an occurrence including a configurably-specified sequence of operations by one of said processors and then to capture information from at least one of only the other processors among said plural electronic processors, wherein said configurably-specified sequence includes an interrupt service operation followed by a write-to-task-queue operation.

44. A telecommunications apparatus comprising:
a printed wiring board;
a modem;
an applications integrated circuit including plural electronic processors coupled to said modem, and said applications integrated circuit attached to said printed wiring board for performing operations, and said applications integrated circuit including an electronic circuit operable to monitor the operations of at least said plural electronic processors, said electronic circuit configurable for multiple modes including at least one mode to detect a configurably-specified sequence pertaining to operations across at least two of said plural electronic processors and initiate a debug-related response; and
wherein said modem and applications integrated circuit are together operable as a system selected from the group consisting of 1) cellular telephone handset, 2) camera, 3) location-based application device, 4) personal computer, 5) television-related module, 6) wireless gateway, 7) internet appliance, 8) automotive telecommunications apparatus, 9) wireless printer, 10) wireless image projector, 11) wireless scanner.

45. The telecommunications apparatus claimed in claim 44 wherein the debug-related response includes capture of trace data from one or more selected processors among said plural electronic processors.

46. The telecommunications apparatus claimed in claim 45 further comprising a host computer at least temporarily coupled to said electronic circuit and operable to analyze the captured trace data.

47. The telecommunications apparatus claimed in claim 44 further comprising a display coupled to said applications integrated circuit.

48. An electronic circuit comprising:
a first processor operable to perform processing operations;
a first trace buffer coupled to said first processor;
a first triggering circuit coupled to said first processor, said first triggering circuit operable to detect a specified sequence of particular processing operations in said first processor;
a second processor;
a second trace buffer coupled to said second processor;
a second triggering circuit coupled to said second processor, said second triggering circuit operable to detect at least one other processing operation in said second processor; and
a cross trace circuit having a trace output and having inputs coupled to said first triggering circuit and to said second triggering circuit, said cross trace circuit configurably operable to respond to a sequence including a detection of the sequence of particular processing operations of said first processor by said first triggering circuit and a detection of the at least one other processing operation of said second processor by said second triggering circuit wherein said detections are in response to an interaction between said first processor and said second processor, to couple at least one of said first trace buffer and said second trace buffer to said trace output; and
a pipeline flattener coupled between each said processor and each said trace buffer respectively.

49. A processor debug circuit comprising:
plural electronic processors for performing operations; and
an electronic circuit operable to monitor the operations of said plural electronic processors, said electronic circuit configurable for multiple modes including at least one mode to detect a configurably-specified sequence pertaining to interactive operations across at least two of said plural electronic processors and initiate a debug-related response wherein said electronic circuit in that at least one mode is operable on such detection to output information from any selected subset of one or more of said plural processors;
wherein the multiple modes include a mode for said electronic circuit to detect a first sequence of operations in a first processor among said processors followed by a second sequence of operations in a second processor among said processors, and upon such detection to capture information from at least one of only said first processor and said second processor; and
wherein said first sequence includes a get-resource operation by said first processor followed by a grant of a first resource to said first processor.

50. The processor debug circuit claimed in claim 49 wherein said multiple modes include a mode further for monitoring for another sequence including a get-resource operation by said first processor followed by grant of a second resource to said first processor, and said electronic circuit includes a counter and said first sequence further includes a timeout by said counter on the further monitoring.

51. The processor debug circuit claimed in claim 49 wherein said multiple modes include a mode further for monitoring for another sequence including a get-resource operation by said first processor followed by a grant of a second resource to said first processor, and upon detection of said another sequence after said first sequence then canceling detection of the first sequence.

52. The processor debug circuit claimed in claim 49 wherein said second sequence includes a get-resource operation by said second processor followed by grant of a second resource to said second processor.

53. The processor debug circuit claimed in claim 52 wherein said multiple modes include a mode further for monitoring for another sequence including a get-resource operation by said first processor followed by grant of the second resource to said first processor, and said electronic circuit includes a counter and said first sequence further includes a timeout by said counter on the further monitoring.

* * * * *